(12) United States Patent
Kim et al.

(10) Patent No.: US 11,838,435 B2
(45) Date of Patent: Dec. 5, 2023

(54) FOLDABLE ELECTRONIC DEVICE FOR DISPLAYING MULTI-WINDOW AND METHOD FOR OPERATING SAME

(71) Applicant: SAMSUNG ELECTRONICS CO., LTD., Suwon-si (KR)

(72) Inventors: Joonhwan Kim, Suwon-si (KR); Sangeun Lee, Suwon-si (KR); Jisu Kim, Suwon-si (KR); Kyungwook Ro, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/948,163

(22) Filed: Sep. 19, 2022

(65) Prior Publication Data

US 2023/0015672 A1    Jan. 19, 2023

Related U.S. Application Data

(63) Continuation of application No. PCT/KR2021/003200, filed on Mar. 16, 2021.

(30) Foreign Application Priority Data

Mar. 19, 2020  (KR) .................. 10-2020-0034024

(51) Int. Cl.
*H04M 1/72403*  (2021.01)
*H04M 1/02*  (2006.01)
*H04M 1/72454*  (2021.01)

(52) U.S. Cl.
CPC ..... *H04M 1/72403* (2021.01); *H04M 1/0216* (2013.01); *H04M 1/0268* (2013.01);
(Continued)

(58) Field of Classification Search
CPC ........... H04M 1/72403; H04M 1/0216; H04M 1/0268; H04M 1/72454; H04M 1/0214;
(Continued)

(56) References Cited

U.S. PATENT DOCUMENTS

2015/0309691 A1* 10/2015 Seo ................. G06F 3/1438
345/173
2015/0338888 A1* 11/2015 Kim ................. G06F 1/1643
345/156
(Continued)

FOREIGN PATENT DOCUMENTS

KR  10-2014-0073396   6/2014
KR  10-2014-0105340   9/2014
(Continued)

*Primary Examiner* — Farid Seyedvosoghi
(74) *Attorney, Agent, or Firm* — Nixon & Vanderhye P.C.

(57) ABSTRACT

An apparatus and/or method for displaying a multi-window on a foldable electronic device may be provided. The electronic device may include a display device having a display area having a shape that varies depending on first and second housing structures connected to a hinge structure, and a processor operatively connected to the display device, in which the processor may divide a first type display area into a plurality of areas and display information related to a plurality of applications when the electronic device is in an unfolded state, the processor may check at least one application set to be continuously used among the plurality of applications when the electronic device switches to a folded state, and the processor may set up a screen constitution in the folded state based on the at least one application and output information related to the at least one application through a second type display area based on the screen constitution. Other embodiments may also be possible.

16 Claims, 71 Drawing Sheets

(52) U.S. Cl.
CPC .... *H04M 1/72454* (2021.01); *H04M 2201/38* (2013.01); *H04M 2201/42* (2013.01)

(58) Field of Classification Search
CPC ........... H04M 1/0245; H04M 2201/38; H04M 2201/42; G06F 1/16; G06F 1/1616; G06F 3/14; G06F 3/1431; G06F 9/451
See application file for complete search history.

(56) References Cited

U.S. PATENT DOCUMENTS

| | | |
|---|---|---|
| 2016/0132074 A1 | 5/2016 | Kim et al. |
| 2016/0274676 A1 | 9/2016 | Jung et al. |
| 2017/0109025 A1* | 4/2017 | Hwang ................. G06F 3/0488 |
| 2018/0374411 A1 | 12/2018 | Yang et al. |
| 2019/0042066 A1 | 2/2019 | Kim et al. |
| 2019/0187758 A1 | 9/2019 | Lee et al. |
| 2019/0324603 A1 | 10/2019 | Shin et al. |
| 2020/0326900 A1 | 10/2020 | Kwon et al. |
| 2020/0333932 A1 | 10/2020 | Lee et al. |
| 2021/0325930 A1* | 10/2021 | Gupta ................... G06F 3/0487 |
| 2022/0005340 A1* | 1/2022 | Han ....................... G06F 3/147 |

FOREIGN PATENT DOCUMENTS

| | | |
|---|---|---|
| KR | 10-2015-0135038 | 12/2015 |
| KR | 10-2016-0055646 | 5/2016 |
| KR | 10-2017-0093658 | 8/2017 |
| KR | 10-2019-0001389 | 1/2019 |
| KR | 10-2020-0006484 | 1/2020 |
| KR | 10-2020-0119020 | 10/2020 |
| KR | 10-2020-0122725 | 10/2020 |
| KR | 10-2021-0092089 | 7/2021 |
| KR | 10-2368689 | 3/2022 |

* cited by examiner

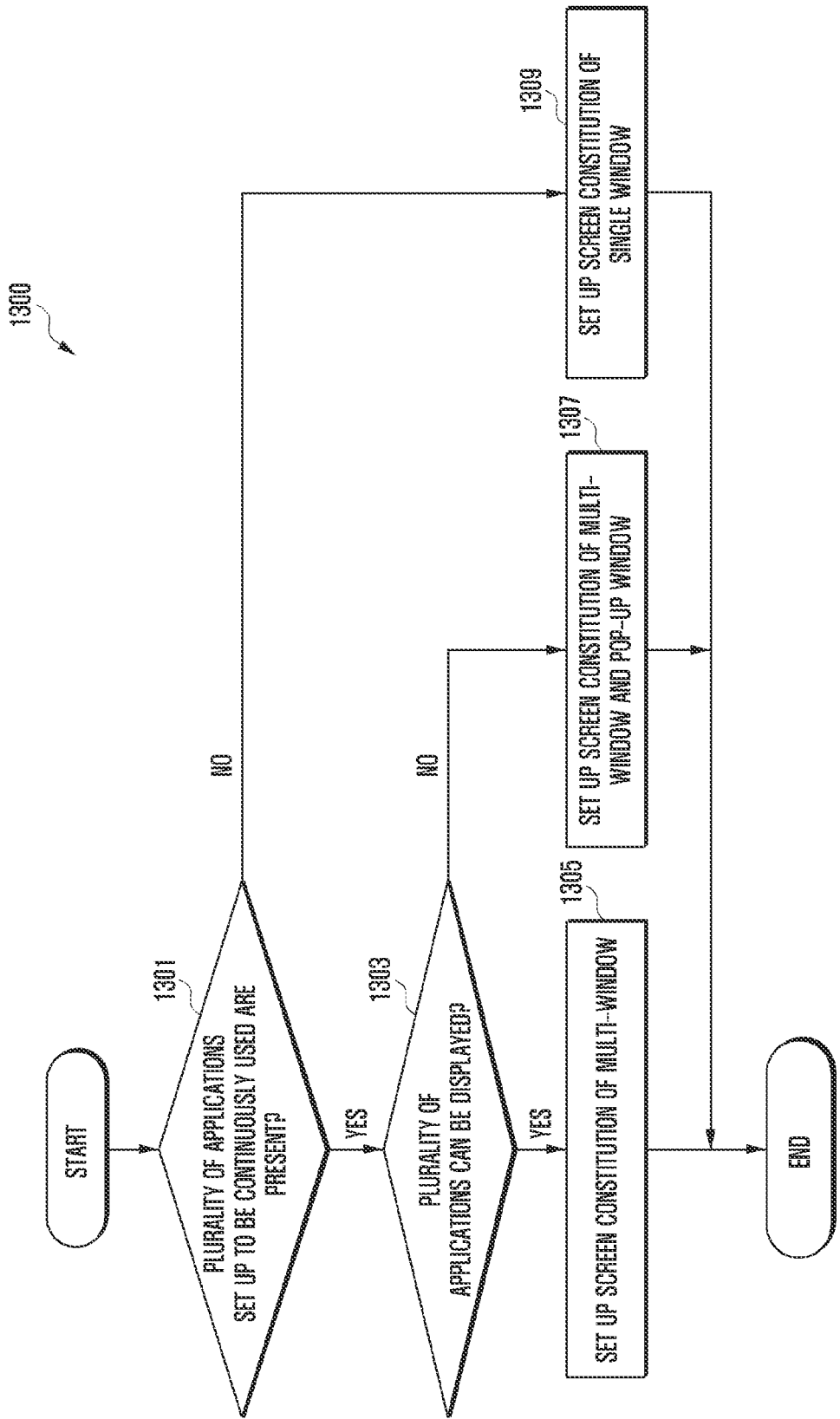

FOLDABLE ELECTRONIC DEVICE FOR DISPLAYING MULTI-WINDOW AND METHOD FOR OPERATING SAME

CROSS-REFERENCE TO RELATED APPLICATIONS

This application is a continuation of International Application No. PCT/KR2021/003200, filed Mar. 16, 2021, designating the United States, in the Korean Intellectual Property Receiving Office, and claiming priority to KR Patent Application No. 10-2020-0034024, filed Mar. 19, 2020, the disclosures of which are all hereby incorporated by reference herein in their entireties.

BACKGROUND

Field

Various example embodiments relate to an apparatus and method for displaying a multi-window on a foldable electronic device.

Description of Related Art

An electronic device gradually becomes slimmer, and the design factors of the electronic device are being enhanced and improved so that the electronic device has distinct functional elements. The electronic device may have various shapes departing from a uniform rectangular shape. For example, the electronic device may have a deformable structure capable of adjusting a size of a display to meet portability and usability of the electronic device. The electronic device having the deformable structure may include a foldable electronic device having at least two housing that operate while being folded or unfolded with respect to one another.

SUMMARY

A foldable electronic device may be deformed in various shapes by using a plurality of housing structures. For example, the foldable electronic device may operate in an in-folding and/or out-folding manner in which a first housing structure and a second housing structure rotate relative to each other about a hinge structure. As another example, the foldable electronic device may operate in a sliding manner in which the second housing structure slides relative to the first housing structure.

A display of the foldable electronic device may be deformed in various shapes in accordance with a structural change of the foldable electronic device. For example, the display may be configured in a first shape in which the display is disposed to transverse the first and second housing structures in a state in which the first and second housing structures of the foldable electronic device are in an unfolded state. For example, the display may be configured in a second shape in which the display disposed on the first or second housing structure in a state in which the first and second housing structures of the foldable electronic device are in a folded state.

The foldable electronic device requires a solution for providing a graphic user interface (GUI) corresponding to displays having various shapes (e.g., sizes).

Various example embodiments provide an apparatus and method for displaying a multi-window on a foldable electronic device.

According to various example embodiments, an electronic device may include: a foldable housing including a hinge structure comprising a hinge, a first housing structure, comprising at least a first housing, connected to the hinge structure, and a second housing structure, comprising at least a second housing, connected to the hinge structure and configured to be folded with respect to the first housing structure about the hinge structure; a display device having a display area having a shape that varies depending on the first housing structure and the second housing structure; and a processor operatively connected to the display device, in which the processor divides a first type display area into a plurality of areas and displays information related to a plurality of applications when the electronic device is in an unfolded state, in which the processor checks at least one application set to be continuously used among the plurality of applications when the electronic device switches to a folded state, in which the processor sets up a screen constitution in the folded state based on the at least one application, and in which the processor outputs information related to the at least one application through a second type display area based on the screen constitution.

According to various example embodiments, a method of operating the foldable electronic device may include an operation of dividing the first type display area into the plurality of areas and displaying information related to the plurality of applications when the electronic device is in the unfolded state, an operation of identifying at least one application set to be continuously used among the plurality of applications when the electronic device switches to the folded state, an operation of setting up the screen constitution in the folded state based on the at least one application, and an operation of outputting information related to the at least one application through the second type display area based on the screen constitution.

According to various example embodiments, the electronic device includes: the foldable housing including the hinge structure, the first housing structure connected to the hinge structure, and the second housing structure connected to the hinge structure and configured to be folded with respect to the first housing structure about the hinge structure; the display device having the display area having the shape that varies depending on the first housing structure and the second housing structure; and the processor operatively connected to the display device. When the electronic device is in the folded state, the processor may display information related to at least one application through the second type display area. When the electronic device switches to the unfolded state, the processor may determine whether to use the multi-window. When the processor determines that the multi-window is to be used, the processor may set up the screen constitution of the multi-window, divide first type display area into a plurality of areas based on the screen constitution, and output information related to the plurality of applications.

According to various example embodiments, when the structure of the foldable electronic device changes from the unfolded state to the folded state, the screen constitution (e.g., the size and/or arrangement) corresponding to the folded state may be set based on at least one application set to be continuously used. Therefore, the foldable electronic device may provide the graphic user interface capable of coping with a change in shape of the display.

According to various example embodiments, when the structure of the foldable electronic device changes from the folded state to the unfolded state, the screen constitution (e.g., the size and/or arrangement) corresponding to the unfolded state is set up to additionally display at least one application selected based on the use history of the application. Therefore, the foldable electronic device may provide the graphic user interface capable of coping with a change in shape of the display.

BRIEF DESCRIPTION OF DRAWINGS

The above and other aspects, features, and advantages of certain example embodiments will be more apparent from the following detailed description, taken in conjunction with the accompanying drawings, in which:

FIG. 13 is a flowchart for setting up a screen constitution in a folded state by using a pop-up window of the electronic device according to various example embodiments.

DETAILED DESCRIPTION

Hereinafter, various example embodiments will be described in detail with reference to the accompanying drawings.

Figure 1:
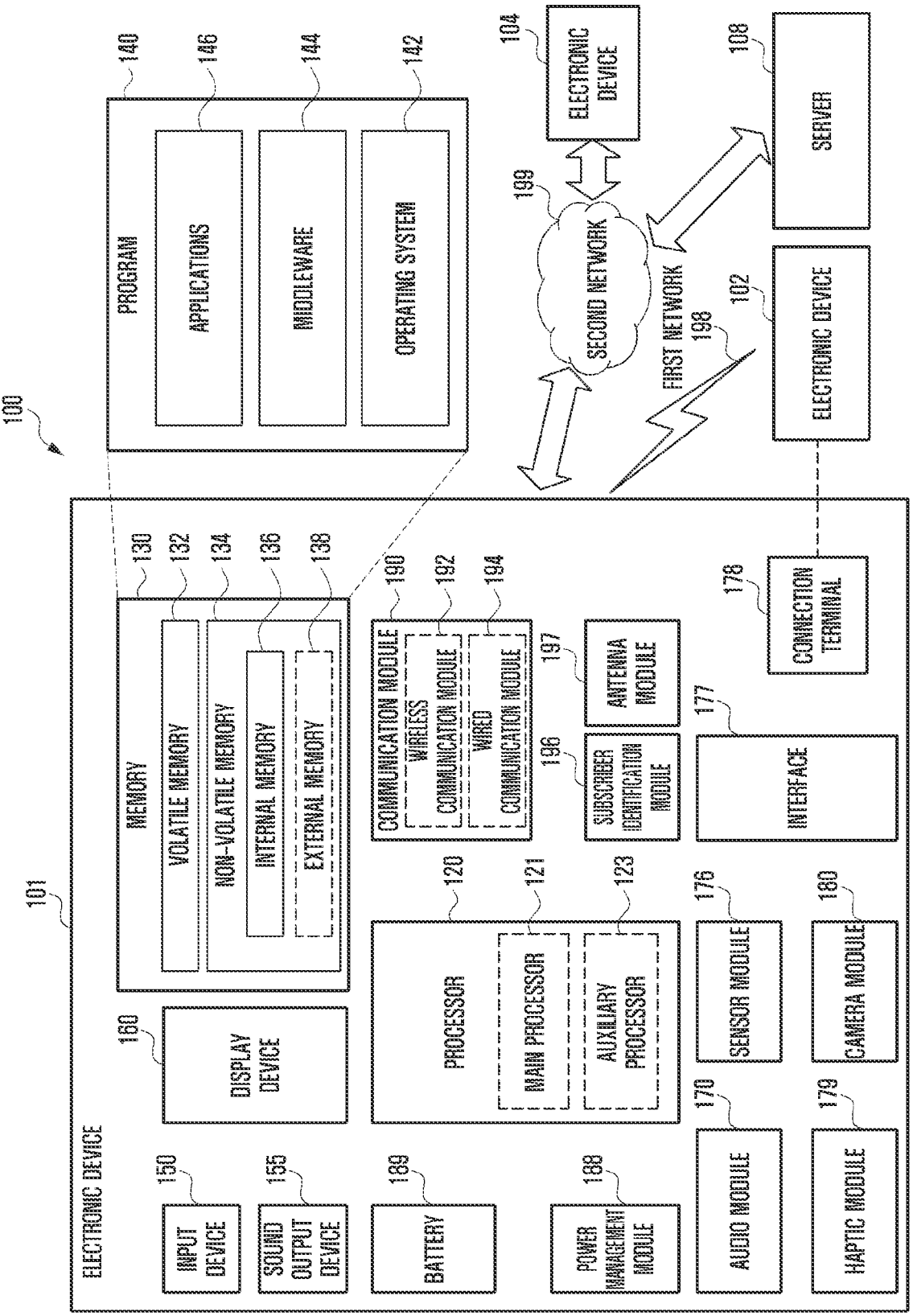
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an example embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via at least a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
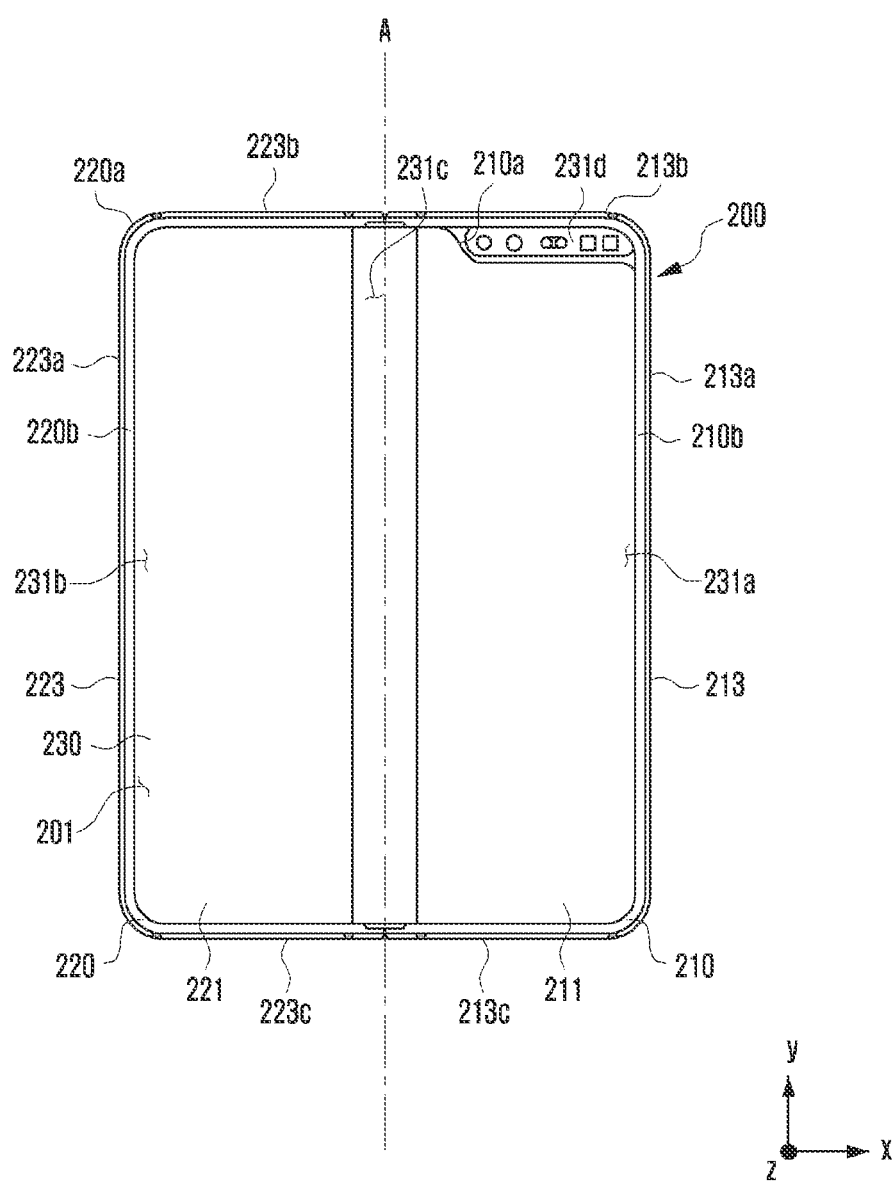
FIG. 2A is a top plan view illustrating a front surface of the electronic device in an unfolded state in a first direction according to various example embodiments.
Figure 2B:
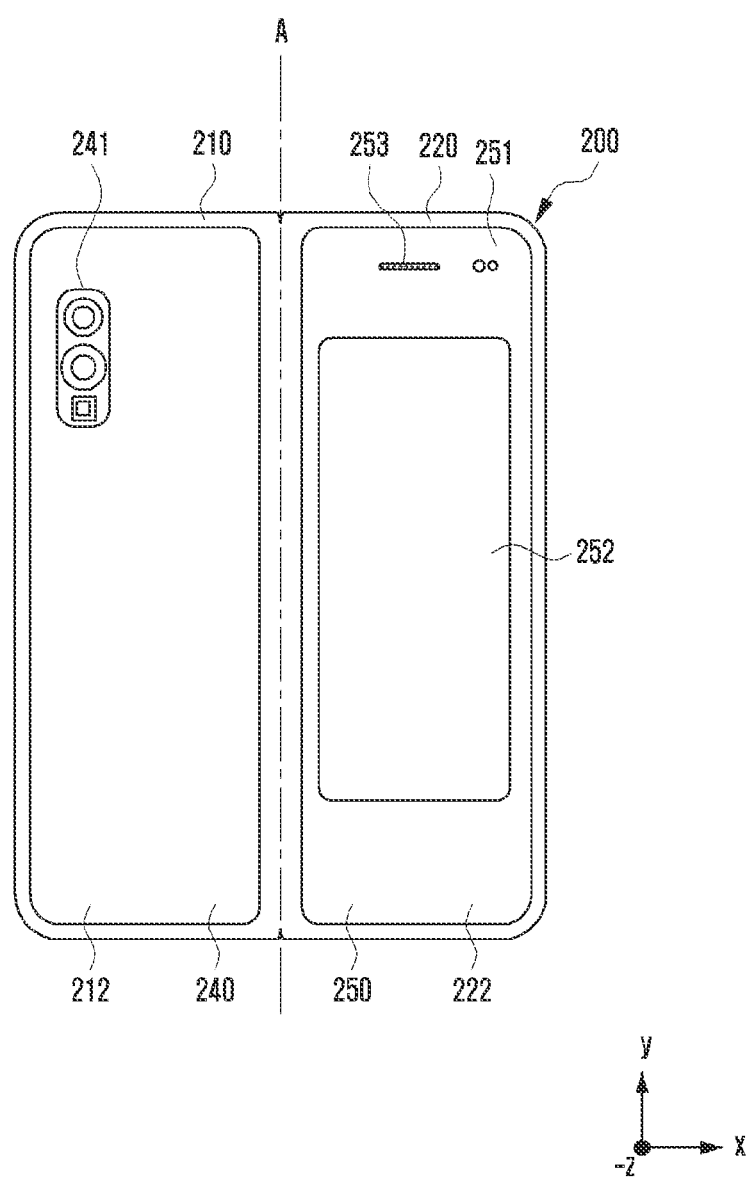
FIG. 2B is a top plan view illustrating a rear surface of the electronic device in the unfolded state in the first direction according to various example embodiments.

FIG. 2A is a top plan view illustrating a front surface of a electronic device 200 in an unfolded state (or a flat stage) in a first direction according to various embodiments. FIG. 2B is a top plan view illustrating a rear surface of the electronic device 200 in the unfolded state in the first direction according to various embodiments. For example, the electronic device 200 illustrated in FIGS. 2A and 2B may be at least partially similar to the electronic device 100 illustrated in FIG. 1 or include another embodiment of the electronic device.

Referring to FIGS. 2A and 2B, the electronic device 200 may include: a pair of housing structures (e.g., foldable housing structures) 210 and 220 rotatably coupled to each other via a hinge structure so as to be folded with respect to each other; a hinge cover configured to cover portions of the pair of housing structures 210 and 220 that may be folded; and a display 230 (e.g., a flexible display, a foldable display, or a first display) disposed in a space defined by the pair of housing structures 210 and 220. A surface of which the display 230 disposed may be defined as a front surface of the electronic device 200, and a surface opposite to the front surface may be defined as a rear surface of the electronic device 200. In addition, a surface, which surrounds a space between the front surface and the rear surface, may be defined as a side surface of the electronic device 200.

In the embodiment, the pair of housing structures 210 and 220 may include a first housing structure 210 including a sensor area 231*d*, a second housing structure 220, a first rear surface cover 240, and a second rear surface cover 250. The pair of housing structures 210 and 220 of the electronic device 200 is not limited by shapes and coupling illustrated in FIGS. 2A and 2B and may be implemented by combination and/or coupling of other shapes or components. For example, in another embodiment, the first housing structure 210 and the first rear surface cover 240 may be integrated, and the second housing structure 220 and the second rear surface cover 250 may be integrated.

According to the embodiment, the first and second housing structures 210 and 220 may be disposed at two opposite sides based on a folding axis (axis A) and have an entirely symmetric with respect to the folding axis (axis A). According to the embodiment, an angle or distance defined between the first and second housing structures 210 and 220 may vary depending on whether a state of the electronic device 200 is an unfolded state (or a flat stage), a folded state, or an intermediate state. According to the embodiment, the first housing structure 210 may additionally include the sensor area 231*d* in which various sensors are disposed, unlike the second housing structure 220. In an area except for the sensor area, the first housing structure 210 may have a symmetric shape. As another embodiment, the sensor area 231*d* may be additionally disposed in at least a partial area of the second housing structure 220 or replaced.

In the embodiment, in the unfolded state of the electronic device 200, the first housing structure 210 may include: a first surface 211 connected, directly or indirectly, to the hinge structure and disposed to be directed toward the front surface of the electronic device 200; a second surface 212 directed in a direction opposite to the first surface 211; and a first side member 213 configured to surround at least a part of a space between the first and second surfaces 211 and 212. In the embodiment, the first side member 213 may include: a first side surface 213*a* disposed in parallel with the folding axis (axis A); a second side surface 213*b* extending in a direction perpendicular to the folding axis from one end of the first side surface 213*a*; and a third side surface 213*c* extending in the direction perpendicular to the folding axis (axis A) from the other end of the first side surface 213*a*.

In the embodiment, in the unfolded state of the electronic device 200, the second housing structure 220 may include: a third surface 221 connected, directly or indirectly, to the hinge structure and disposed to be directed toward the front surface of the electronic device 200; a fourth surface 222 directed in a direction opposite to the third surface 221; and a second side member 223 configured to surround at least a part of a space between the third and fourth surfaces 221 and 222. In the embodiment, the second side member 223 may include: a fourth side surface 223*a* disposed in parallel with the folding axis (axis A); a fifth side surface 223*b* extending in the direction perpendicular to the folding axis (axis A) from one end of the fourth side surface 223*a*; and a sixth side surface 223*c* extending in the direction perpendicular to the folding axis (axis A) from the other end of the fourth side surface 223a. In the embodiment, the third surface 221 may face the first surface 211 in the folded state.

In the embodiment, the electronic device 200 may include a recess 201 formed to accommodate the display 230 by coupling structural shapes of the first and second housing structures 210 and 220. The recess 201 may have substantially the same size as the display 230. In the embodiment, because of the sensor area 231d, the recess 201 may have two or more different widths in the direction perpendicular to the folding axis (axis A). In the embodiment, first and second portions 210a and 210b of the first housing structure 210 may have different distances from the folding axis (axis A). In the embodiment, third and fourth portions 220a and 220b of the second housing structure 220 may have different distances from the folding axis (axis A). The width of the recess 201 is not limited to the illustrated example. In various embodiments, the recess 201 may have two or more different widths by the shape of the sensor area 231d or the portion having the asymmetric shape of the first and second housing structures 210 and 220.

In the embodiment, the sensor area 231d may be disposed adjacent to one side corner of the first housing structure 210 and have a predetermined area. However, the arrangement, shape, or size of the sensor area 231d is not limited to the illustrated example. For example, in another embodiment, the sensor area 231d may be provided in any area between other corners of the first housing structure 210 or between an upper end corner and a lower end corner of the first housing structure 210. As another embodiment, the sensor area 231d may be disposed in at least a partial area of the second housing structure 220. As another embodiment, the sensor area 231d may be disposed to extend in the first and second housing structures 210 and 220. In the embodiment, the electronic device 200 may have components for performing various functions disposed to be exposed on the front surface of the electronic device 200 through the sensor area 231d or through one or more openings disposed in the sensor area 231d. In various embodiments, the components may include, for example, at least one of a front camera device, a receive, a proximity sensor, an illuminance sensor, an iris recognition sensor, an ultrasonic sensor, or an indicator.

In the embodiment, the first rear surface cover 240 may be disposed on the second surface 212 of the first housing structure 210 and have a substantially rectangular periphery. In the embodiment, at least a part of the periphery may be surrounded by the first housing structure 210. The second rear surface cover 250 may be disposed on the fourth surface 222 of the second housing structure 220. At least a part of the periphery of the second rear surface cover 250 may be surrounded by the second housing structure 220.

In the illustrated embodiment, the first and second rear surface covers 240 and 250 may have a substantially symmetric shape with respect to the folding axis (axis A). As another embodiment, the first and second rear surface covers 240 and 250 may have various different shapes. As another embodiment, the first rear surface cover 240 may be integrated with the first housing structure 210, and the second rear surface cover 250 may be integrated with the second housing structure 220.

In the embodiment, the structure made by coupling the first rear surface cover 240, the second rear surface cover 250, the first housing structure 210, and the second housing structure 220 may provide a space in which various components (e.g., a printed circuit board, an antenna module comprising at least one antenna, a sensor module comprising at least one sensor, or a battery) of the electronic device 200 may be disposed. In the embodiment, one or more components may be disposed or visually exposed on the rear surface of the electronic device 200. For example, one or more components or sensors may be visually exposed through the first rear surface area 241 of the first rear surface cover 240. In various embodiments, the sensor may include a proximity sensor, a rear camera device, and/or a flash. In another embodiment, at least a part of a sub-display 252 (e.g., a second display) may be visually exposed through the second rear surface area 251 of the second rear surface cover 250. In another embodiment, the electronic device 200 may include a speaker module 253 disposed through at least a partial area of the second rear surface cover 250.

The display 230 may be disposed in a space defined by the pair of housing structures 210 and 220. For example, the display 230 may be seated in the recess 201 defined by the pair of housing structures 210 and 220 and disposed to occupy substantially most part of the front surface of the electronic device 200. Therefore, the front surface of the electronic device 200 may include: the display 230; a partial area (e.g., a peripheral area) of the first housing structure 210 and a partial area (e.g., a peripheral area) of the second housing structure 220 that are disposed adjacent to the display 230. In the embodiment, the rear surface of the electronic device 200 may include: the first rear surface cover 240; a partial area (e.g., a peripheral area) of the first housing structure 210 disposed adjacent to the first rear surface cover 240; the second rear surface cover 250; and a partial area (e.g., peripheral area) of the second housing structure 220 disposed adjacent to the second rear surface cover 250.

In the embodiment, the display 230 may indicate a display having at least a partial area that may be deformed to a flat or curved surface. In the embodiment, the display 230 may include: a folding area 231c; a first area 231a disposed at one side (e.g., in the right area of the folding area 231c) based on the folding area 231c; a second area 231b disposed at the other side (e.g., in the left area of the folding area 231c). For example, the first area 231a may be disposed on the first surface 211 of the first housing structure 210, and the second area 231b may be disposed on the third surface 221 of the second housing structure 220. In the embodiment, the division of the area of the display 230 is illustrative. The display 230 may be divided into a plurality of areas (e.g., four or more areas or two areas) in accordance with the structure or function. For example, in the embodiment illustrated in FIGS. 2A and 2B, the area of the display 230 may be divided by a folding area 231c extending in parallel with a y-axis or the folding axis (axis A). In another embodiment, the area of the display 230 may be divided based on another folding area (e.g., a folding area parallel to an x-axis) or another folding axis (e.g., a folding axis parallel to the x-axis). The division of the area of the display is physical division made by the pair of housing structures 210 and 220 and the hinge structure. The display 230 may substantially display a single entire screen through the pair of housing structures 210 and 220 and the hinge structure. In the embodiment, the first area 231a and the second area 231b may have an entirely symmetric shape with respect to the folding area 231c. However, unlike the second area 231b, the first area 231a may include a notch area cut by the presence of the sensor area 231d, and the area, except for the notch area, may have a symmetric shape symmetric together with the second area 231b. For example, the first and second areas 231a and 231b may include a portion having a symmetric shape and a portion having an asymmetric shape.

Figure 3A:
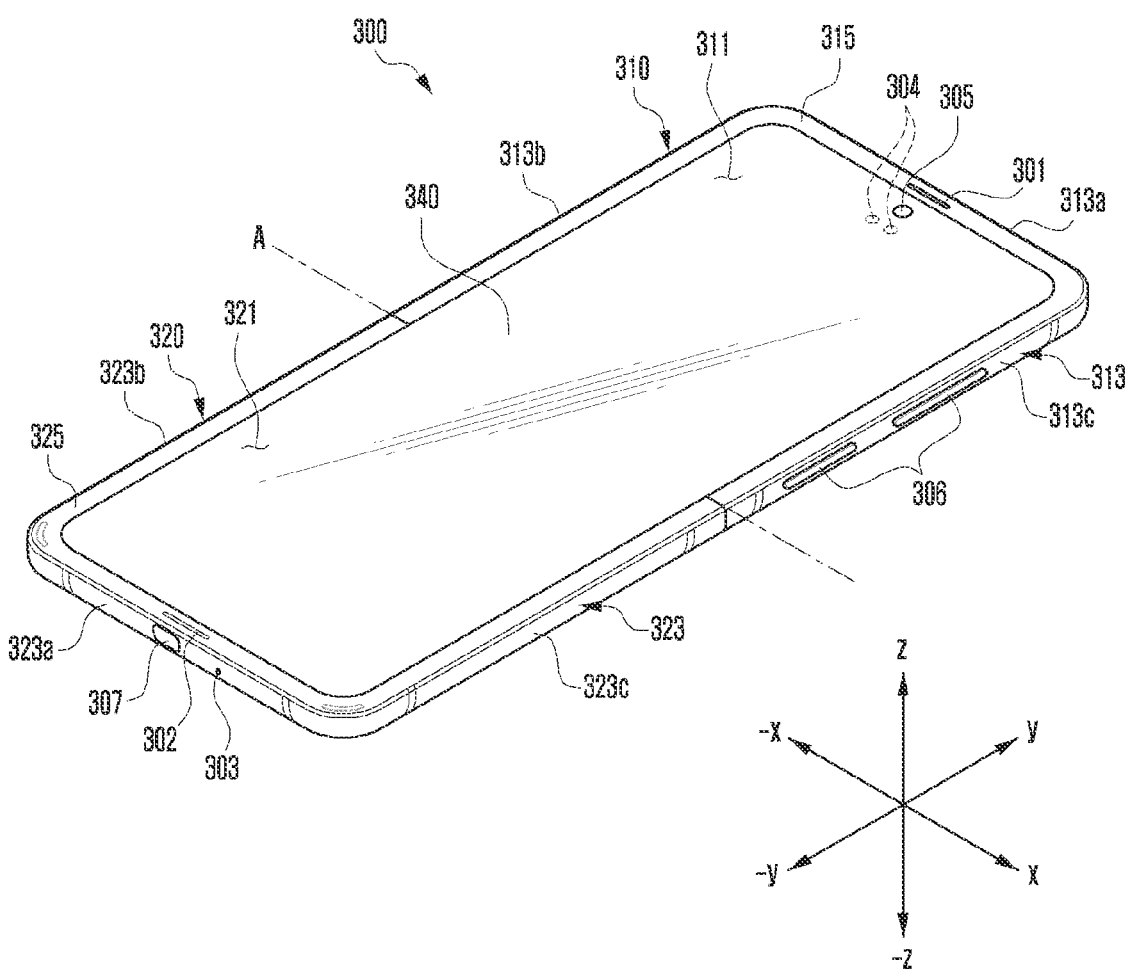
FIG. 3A is a perspective view of the electronic device in an unfolded state in a second direction according to various example embodiments.
Figure 3B:
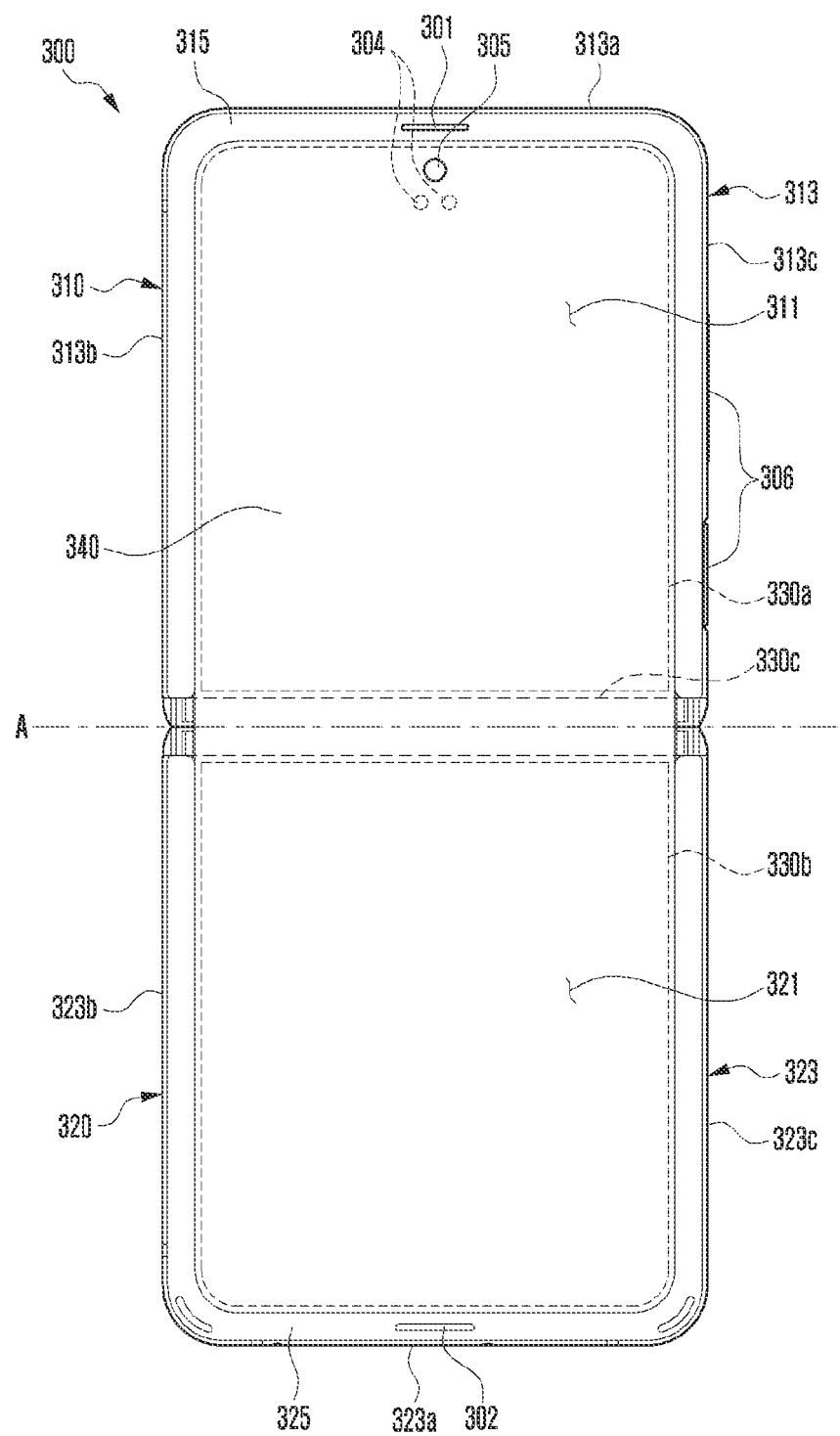
FIG. 3B is a top plan view illustrating the front surface of the electronic device in the unfolded state in the second direction according to various example embodiments.
Figure 3C:
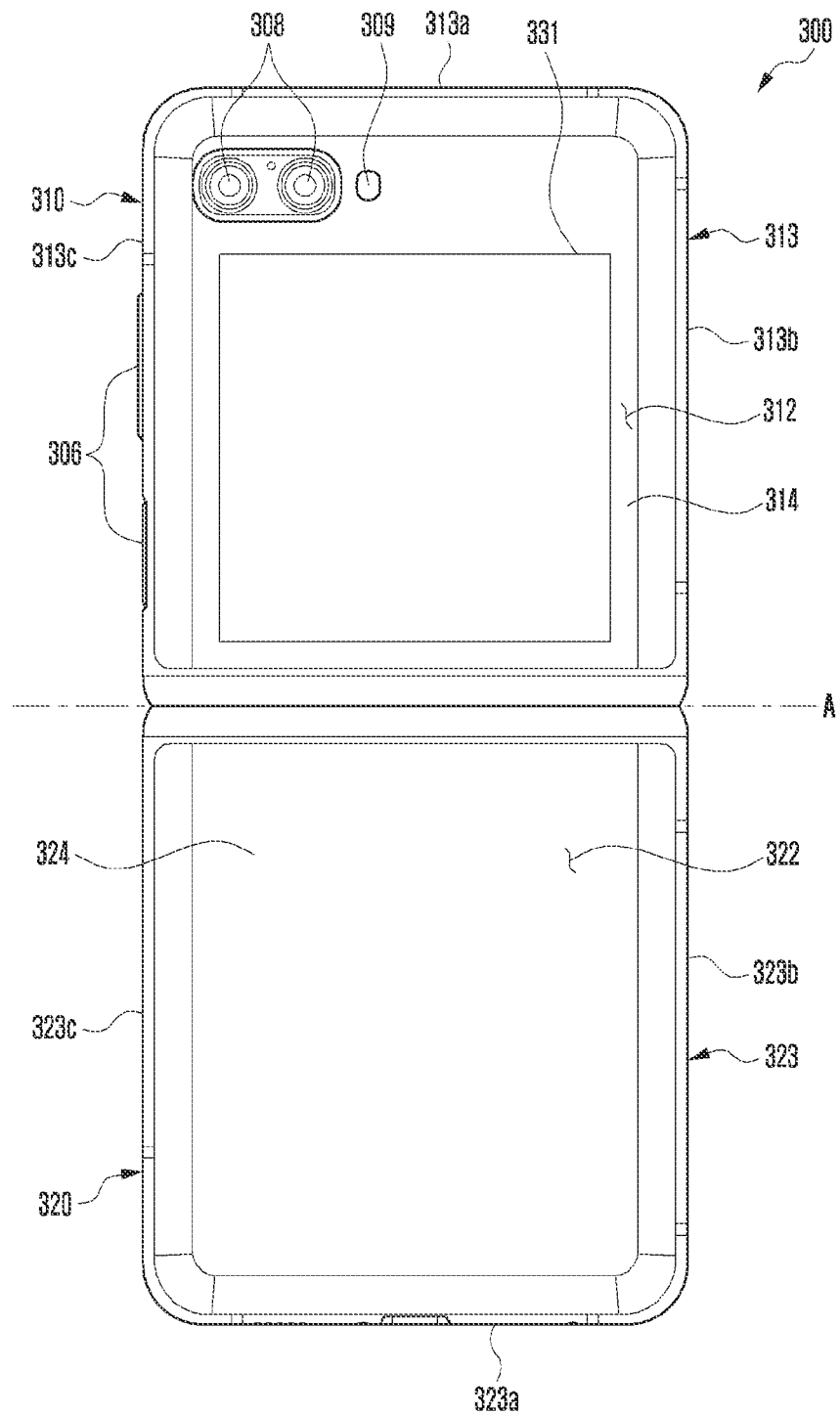
FIG. 3C is a top plan view illustrating the rear surface of the electronic device in the unfolded state in the second direction according to various example embodiments.

FIG. 3A is a perspective view of an electronic device 300 in an unfolded state in a second direction according to various embodiments. FIG. 3B is a top plan view illustrating a front surface of the electronic device 300 in the unfolded state in the second direction according to various embodiments. FIG. 3C is a top plan view illustrating a rear surface of the electronic device 300 in the unfolded state in the second direction according to various embodiments. For example, the electronic device 300 illustrated in FIGS. 3A, 3B, and 3C may be at least partially similar to the electronic device 100 illustrated in FIG. 1 or include another embodiment of the electronic device.

Referring to FIGS. 3A, 3B, and 3C, the electronic device 300 may include a pair of housing structures (e.g., foldable housings) 310 and 320 rotatably coupled to each other so as to be folded while facing each other with respect to a hinge module comprising at least one hinge. According to the embodiment, the electronic device 300 may include a flexible display 340 (e.g., a foldable display) disposed in an area defined by the pair of housing structures 310 and 320. According to the embodiment, the first and second housing structures 310 and 320 may be disposed at two opposite sides based on a folding axis (axis A) and have a substantially symmetric with respect to the folding axis (axis A). According to the embodiment, an angle or distance defined between the first and second housing structures 310 and 320 may vary depending on whether a state of the electronic device 300 is an unfolded state (or a flat stage), a folded state, or an intermediate state.

According to various embodiments, the pair of housing structures 310 and 320 may include a first housing structure 310 coupled to the hinge module, and a second housing structure 320 coupled to the hinge module. According to the embodiment, in the unfolded state, the first housing structure 310 may include: a first surface 311 directed in a first direction (e.g., a forward direction, i.e., a z-axis direction); and a second surface 312 directed in a second direction (e.g., a rearward direction i.e., a −z-axis direction) opposite to the first surface 311. According to the embodiment, in the unfolded state, the second housing structure 320 may include: a third surface 321 directed in the first direction (z-axis direction); and a fourth surface 322 directed in the second direction (−z-axis direction). According to the embodiment, the electronic device 300 may operate such that the first surface 311 of the first housing structure 310 and the third surface 321 of the second housing structure 320 are directed in substantially the same first direction (z-axis direction) in the unfolded state, the first surface 311 and the third surface 321 face each other in the folded state. According to the embodiment, the electronic device 300 may operate such that the second surface 312 of the first housing structure 310 and the fourth surface 322 of the second housing structure 320 are directed toward substantially the same second direction (−z-axis direction) in the unfolded state, and the second surface 312 and the fourth surface 322 are directed in the opposite directions in the folded state For example, in the folded state, the second surface 312 may be directed in the first direction (z-axis direction), and the fourth surface 322 may be directed in the second direction (−z-axis direction).

According to various embodiments, the first housing structure 310 may include: a first side frame 313 configured to at least partially define an external appearance of the electronic device 300; and a first rear cover 314 coupled to the first side frame 313 and configured to define at least a part of the second surface 312 of the electronic device 300. According to the embodiment, the first side frame 313 may include: a first side surface 313a; a second side surface 313b extending from one end of the first side surface 313a; and a third side surface 313c extending from the other end of the first side surface 313a. According to the embodiment, the first side frame 313 may have a rectangular shape (e.g., a square shape) defined by the first side surface 313a, the second side surface 313b, and the third side surface 313c.

According to various embodiments, the second housing structure 320 may include: a second side frame 323 configured to at least partially define the external appearance of the electronic device 300; and a second rear surface cover 324 coupled to the second side frame 323 and configured to define at least a part of the fourth surface 322 of the electronic device 300. According to the embodiment, the second side frame 323 may include: a fourth side surface 323a; a fifth side surface 323b extending from one end of the fourth side surface 323a; and a sixth side surface 323c extending from the other end of the fourth side surface 323b. According to the embodiment, the second side frame 323 may have a rectangular shape defined by the fourth side surface 323a, the fifth side surface 323b, and the sixth side surface 323c.

According to various embodiments, the pair of housing structures 310 and 320 is not limited by illustrated shapes and coupling and may be implemented by combination and/or coupling of other shapes or components. For example, the first side frame 313 may be integrated with the first rear cover 314, and the second side frame 323 may be integrated with the second rear surface cover 324.

According to various embodiments, in the unfolded state of the electronic device 300, the second side surface 313b of the first side frame 313 and the fifth side surface 323b of the second side frame 323 may be connected without any gap. According to the embodiment, in the unfolded state of the electronic device 300, the third side surface 313c of the first side frame 313 and the sixth side surface 323c of the second side frame 323 may be connected without any gap. According to the embodiment, in the unfolded state of the electronic device 300, a length made by summing up a length of the second side surface 313b and a length of the fifth side surface 323b may be longer than a length of the first side surface 313a and/or the fourth side surface 323a. In addition, a length made by summing up a length of the third side surface 313c and a length of the sixth side surface 323c may be longer than a length of the first side surface 313a and/or the fourth side surface 323a.

According to various embodiments, the flexible display 340 may be disposed to extend to at least a part of the third surface 321 of the second housing structure 320 from the first surface 311 of the first housing structure 310 while traversing the hinge module. For example, the flexible display 340 may include: a first planar portion 330a substantially corresponding to the first surface 311; a second planar portion 330b corresponding to the second surface 321; and a bendable portion 330c corresponding to the hinge module and configured to connect, directly or indirectly, the first and second planar portions 330a and 330b. According to the embodiment, the electronic device 300 may include a first protective cover 315 (e.g., a first protective frame or a first decorative member) coupled along a periphery of the first housing structure 310. According to the embodiment, the electronic device 300 may include a second protective cover 325 (e.g., a second protective frame or a second decorative member) coupled along a periphery of the second housing structure 320. According to the embodiment, the flexible display 340 may be positioned so that a periphery of the first planar portion 330a is interposed between the first housing structure 310 and the first protective cover 315. According to the embodiment, the flexible display 340 may be positioned so that a periphery of the second planar portion 330*b* is interposed between the second housing structure 320 and the second protective cover 325. According to the embodiment, the flexible display 340 may be positioned so that a protective cap disposed in the area corresponding to the hinge module protects a periphery of the flexible display 340 corresponding to the protective cap. Therefore, the periphery of the flexible display 340 may be substantially protected from the outside. According to the embodiment, the electronic device 300 may include a hinge housing (e.g., a hinge cover) configured to support the hinge module and be exposed to the outside when the electronic device 300 is in the folded state and disposed to be invisible from the outside by being retracted into the first and second spaces when the electronic device 300 is in the unfolded state.

According to various embodiments, the electronic device 300 may include a sub-display 331 disposed separately from the flexible display 340. According to the embodiment, the sub-display 331 may be disposed to be at least partially exposed to the second surface 312 of the first housing structure 310. Therefore, in the folded state, it is possible to display state information of the electronic device 300 that is substituted for a display function of the flexible display 340. According to the embodiment, the sub-display 331 may be disposed to be visible from the outside through at least a partial area of the first rear surface cover 314. According to the embodiment, the sub-display 331 may be disposed on the fourth surface 324 of the second housing structure 320. In this case, the sub-display 331 may be disposed to be visible from the outside through at least a partial area of the second rear surface cover 324.

According to various embodiments, the electronic device 300 may include at least one of an input device 303 (e.g., a microphone), sound output devices 301 and 302, a sensor module 304 comprising at least one sensor, camera devices 305 and 308, a key input device 306, and a connector port 307. In the illustrated embodiment, the input device 303 (e.g., microphone), the sound output devices 301 and 302, the sensor module 304 comprising at least one sensor, the camera devices 305 and 308, the key input device 306, or the connector port 307 is indicated by a hole or shape formed in the first housing structure 310 or the second housing structure 320. However, the input device 303 (e.g., microphone), the sound output devices 301 and 302, the sensor module 304, the camera devices 305 and 308, the key input device 306, or the connector port 307 may be defined as including a substantial electronic component (an input device, a sound output device, a sensor module, or a camera device) disposed in the electronic device 300 and configured to operate through the hole or shape.

According to various embodiments, the input device 303 may include at least one microphone 303 disposed on the second housing structure 320. According to the embodiment, the input device 303 may include a plurality of microphones 303 disposed to detect a direction of sound. According to the embodiment, the plurality of microphones 303 may be disposed at appropriate positions on the first housing structure 310 and/or the second housing structure 320.

According to various embodiments, the sound output devices 301 and 302 may include speakers 301 and 302. According to the embodiment, the speakers 301 and 302 may include: a telephone receiver 301 disposed on the first housing structure 310; and a speaker 302 disposed on the second housing structure 320. According to the embodiment, the input device 303, the sound output devices 301 and 302, and the connector port 307 may be disposed in the spaces provided in the first housing structure 310 and/or the second housing structure 320 of the electronic device 300 and exposed to the external environment through at least one hole formed in the first housing structure 310 and/or the second housing structure 320. According to the embodiment, the at least one connector port 307 may be used to receive and/or transmit electric power and/or data from and/or to an external electronic device. In any embodiment, at least one connector port (e.g., an earphone jack hole) may accommodate a connector (e.g., an earphone jack) for receiving and/or transmitting audio signals from and/or to the external electronic device. According to the embodiment, the hole formed in the first housing structure 310 and/or the second housing structure 320 may be used in common for the input device 303 and the sound output devices 301 and 302. According to the embodiment, the sound output devices 301 and 302 may include speakers (e.g., piezoelectric speakers) without the hole formed in the first housing structure 310 and/or the second housing structure 320.

According to various embodiments, the sensor module 304 may generate electrical signals or data values corresponding to an internal operating state of the electronic device 300 or the external environment state. According to the embodiment, the sensor module 304 may detect an external environment through the first surface 311 of the first housing structure 310. According to the embodiment, the electronic device 300 may further include at least one sensor module disposed to detect the external environment through the second surface 312 of the first housing structure 310. According to the embodiment, the sensor module 304 (e.g., the illuminance sensor) may be disposed below the flexible display 340 and detect the external environment through the flexible display 340. According to the embodiment, the sensor module 304 may include at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, an illuminance sensor, a proximity sensor, a biosensor, an ultrasonic sensor, and the illuminance sensor 304.

According to various embodiments, the camera devices 305 and 308 may include: a first camera device 305 (e.g., a front camera device) disposed on the first surface 311 of the first housing structure 310; and a second camera device 308 disposed on the second surface 312 of the first housing structure 310. The electronic device 300 may include a flash 309 disposed in the vicinity of the second camera device 308. According to the embodiment, the camera devices 305 and 308 may include one or more lens, an image sensor, and/or an image signal processor. For example, the flash 309 may include a light-emitting diode or a xenon lamp. According to the embodiment, the camera devices 305 and 308 may be disposed so that two or more lenses (wide angle lenses, ultrawide angle lenses, or telephoto lenses) and image sensors are positioned on one surface (e.g., the first surface 311, the second surface 312, the third surface 321, or the fourth surface 322) of the electronic device 300. In any embodiment, the camera devices 305 and 308 may include time-of-flight (TOF) lenses and image sensors. Each "processor" herein comprises processing circuitry.

According to various embodiments, the key input device 306 (e.g., a key button) may be disposed on the third side surface 313*c* of the first side frame 313 of the first housing structure 310. In any embodiment, the key input device 306 may be disposed on at least one of the other side surfaces 313*a* and 313*b* of the first housing structure 310 and/or the side surfaces 323a, 323b, and 323c of the second housing structure 320. In any embodiment, the electronic device 300 may exclude some or all of the key input devices 306, the excluded key input device 306 may be implemented as other types such as a soft key on the flexible display 340. In any embodiment, the key input device 306 may be implemented by using a pressure sensor included in the flexible display 340.

According to various embodiments, some of the camera devices 305 and 308, e.g., the camera device 305 or the sensor module 304 may be disposed to be exposed through the flexible display 340. For example, the first camera device 305 or the sensor module 304 may be disposed in the internal space of the electronic device 300 so as to adjoin the external environment through an opening (e.g., a through-hole) at least partially formed in the flexible display 340. As another embodiment, some sensor modules 304 may be disposed in the internal space of the electronic device 300 and perform the function thereof without being visually exposed through the flexible display 340. For example, in this case, an area of the flexible display 340, which faces the sensor module, may not require the opening.

According to various embodiments, the electronic device may include the second housing structure configured to be folded to face the first housing structure via the hinge module for out-folding. According to the embodiment, the electronic device may be disposed so that the display area supported by the first and second housing structures is exposed to the outside in the unfolded state. According to the embodiment, the electronic device may be disposed so that at least a partial area of the display area supported by the first and second housing structures is exposed to the outside in the folded state. For example, referring to FIG. 3C, the electronic device 300 may operate such that the second surface 312 and the fourth surface 322 face each other in the folded state.

According to various embodiments, the electronic device may be disposed such that the display area may be changed by way of the plurality of (e.g., three) housing structures that are folded to face one another. According to the embodiment, electronic device may include: the first housing structure; the second housing structure configured to be folded to face the first housing structure via a first hinge module (e.g., a two-axis hinge module) for in-folding; and a third housing structure configured to be folded to face the second housing structure by way of a second hinge module (e.g., an articulated hinge module) for out-folding. Each "hinge module" herein comprises at least one hinge. For example, when the electronic device is completely folded, the display area supported by the first and second housing structures may be disposed so as not to be exposed to the outside (e.g., in an in-folding manner). For example, when the electronic device is completely folded, the display area supported by the third housing structure may be disposed to be exposed to the outside (e.g., in an out-folding manner).

According to various embodiments, the electronic device may include the first housing structure, and the second housing structure configured to slide so as to be at least partially expanded from the internal space of the first housing structure. According to the embodiment, the display of the electronic device may include the display area having a first size when the second housing structure is retracted into the first housing structure. According to the embodiment, the display of the electronic device may be changed to have the display area having a second size relatively larger than the first size when the second housing structure is extended from the first housing structure.

Figure 4:
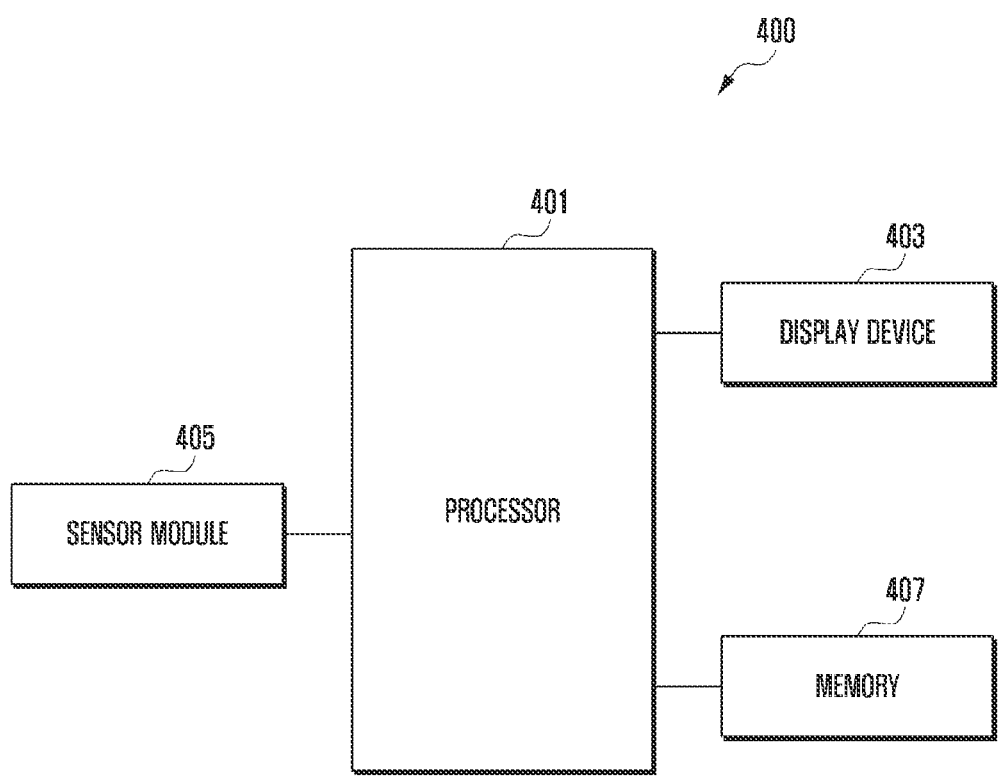
FIG. 4 is a block diagram of the electronic device for displaying a multi-window according to various example embodiments.
Figure 5A:
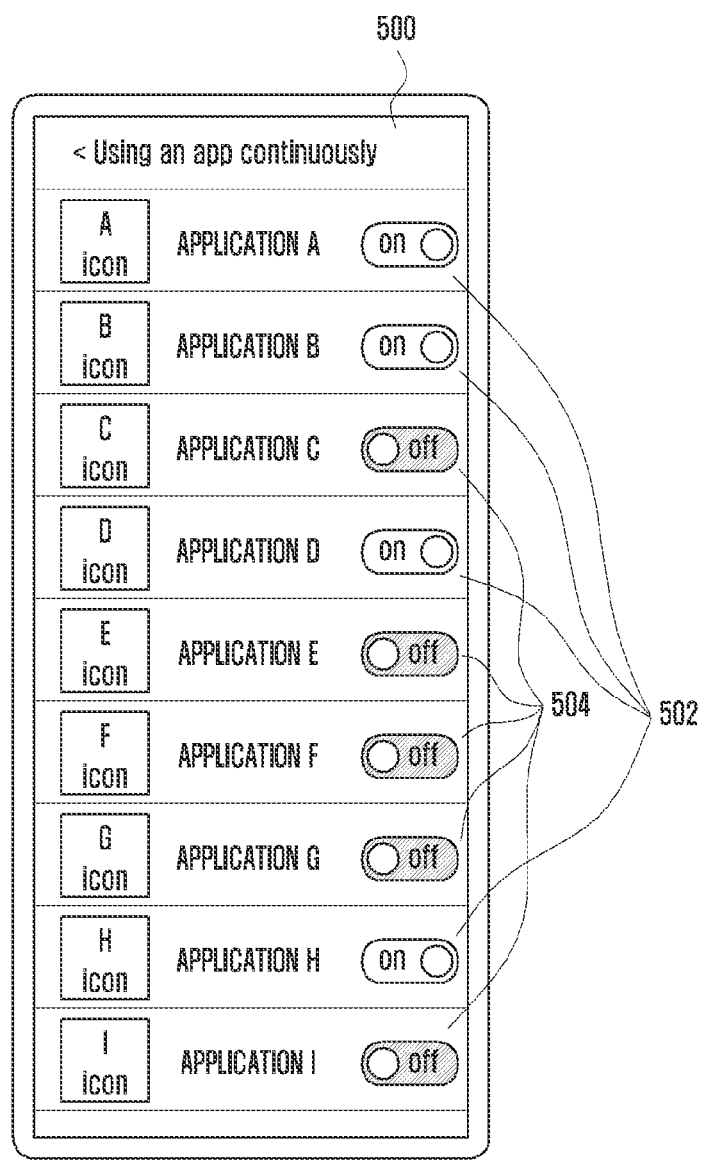
FIGS. 5A, 5B, and 5C are views illustrating screen constitutions of menus for setting up continuous uses of applications according to various example embodiments.
Figure 5B:
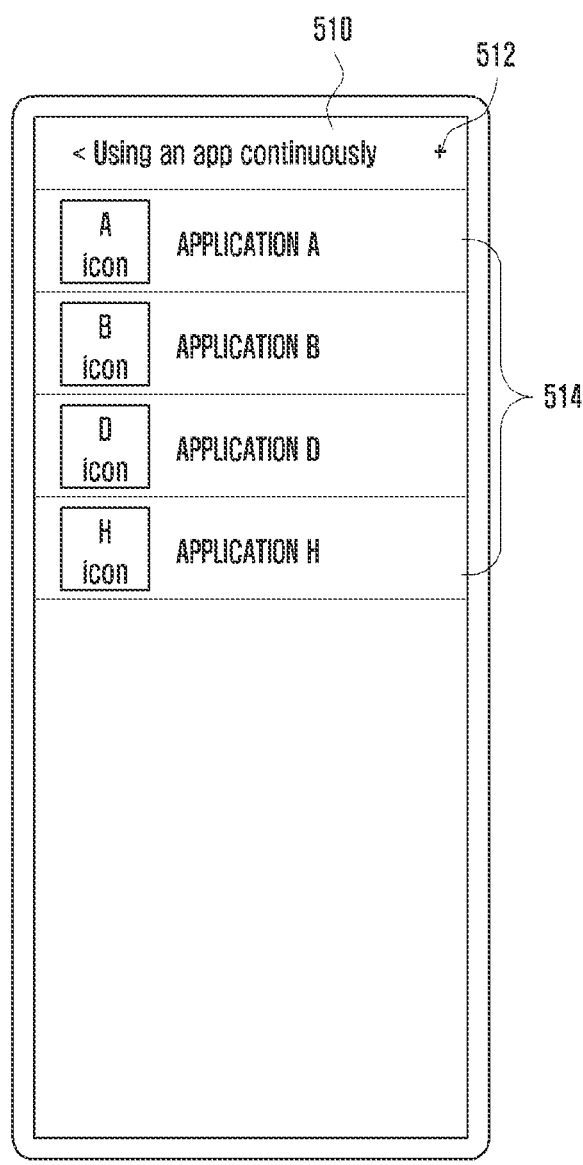
Figure 5C:
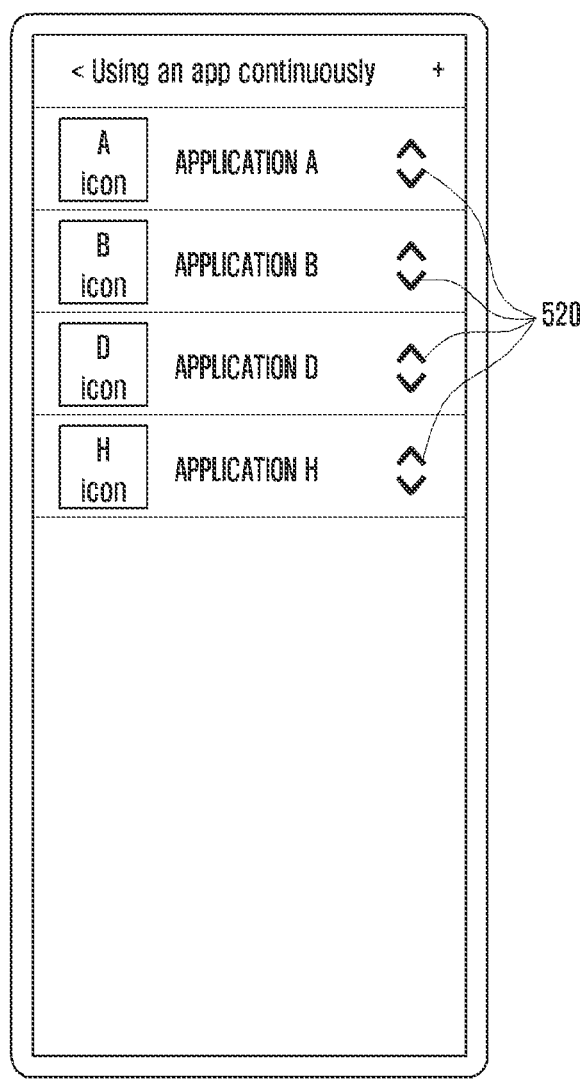
Figure 6A:
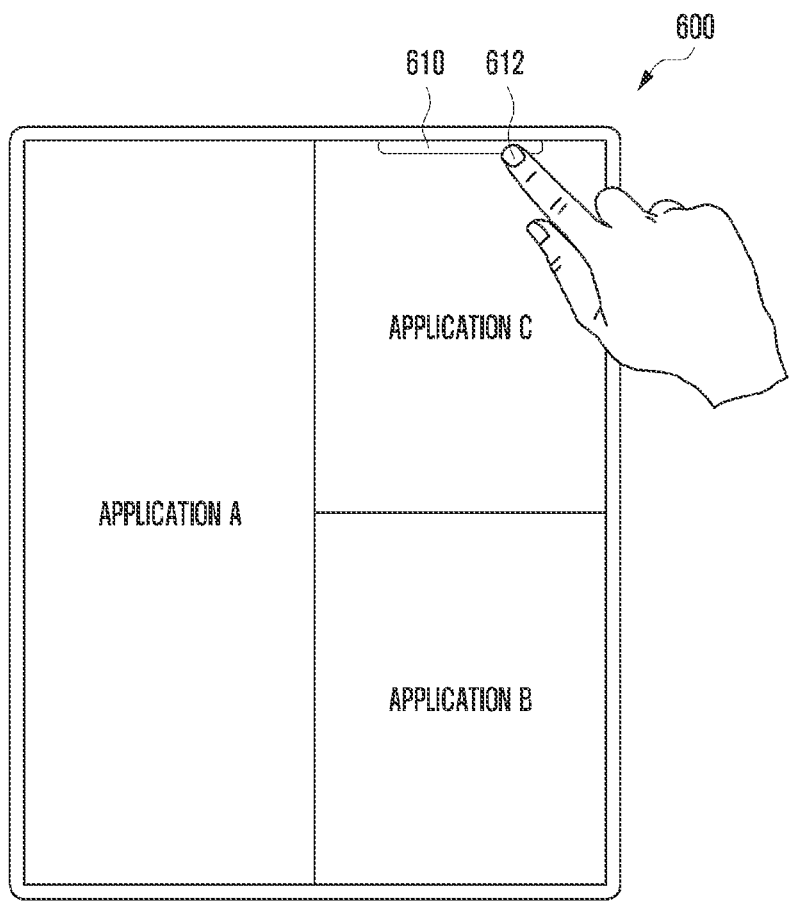
FIGS. 6A, 6B, and 6C are views illustrating screen constitutions of the multi-window for setting up continuous uses of applications according to various example embodiments.
Figure 6B:
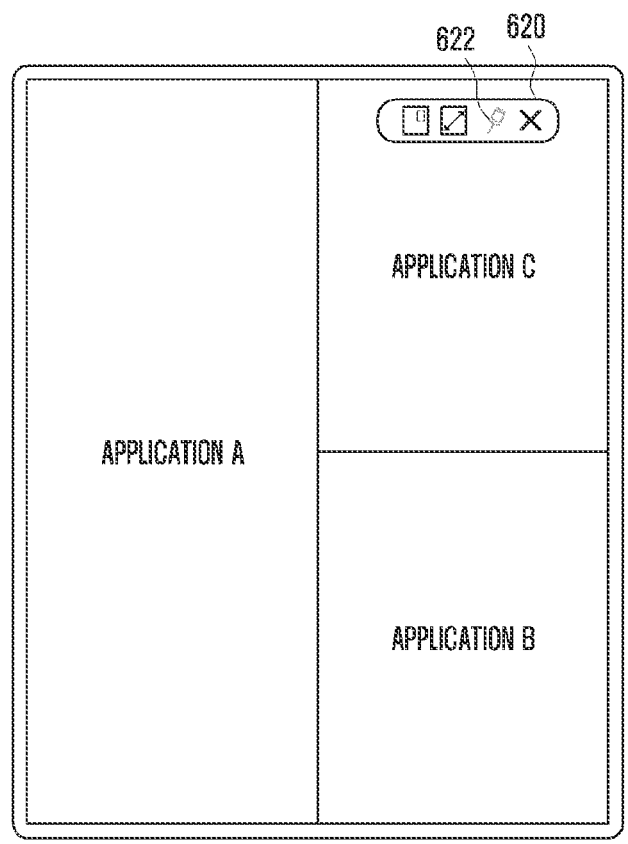
Figure 6C:
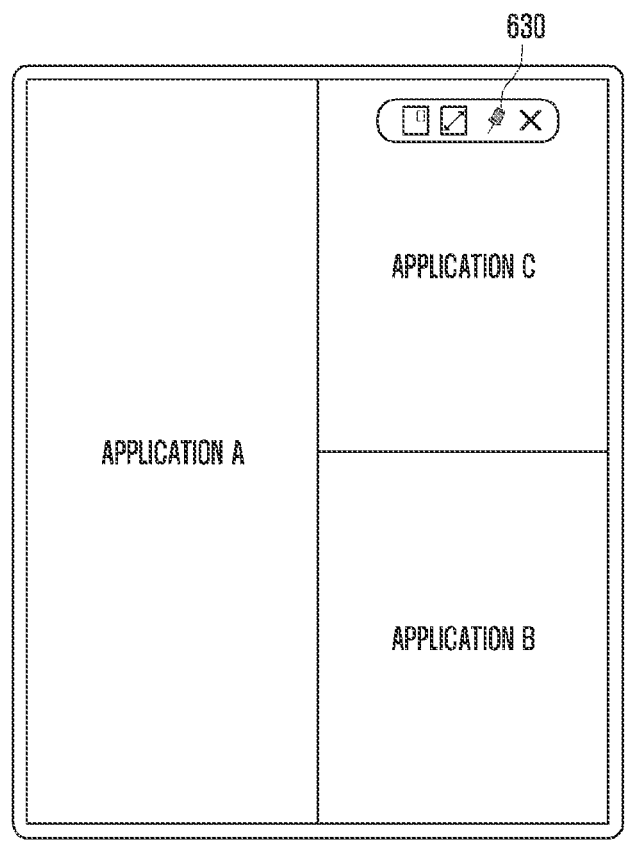

FIG. 4 is a block diagram of an electronic device 400 for displaying a multi-window according to various embodiments. For example, the electronic device 400 illustrated in FIG. 4 may be at least partially similar to the electronic device 100 illustrated in FIG. 1, the electronic device 200 illustrated in FIGS. 2A and 2B, or the electronic device 300 illustrated in FIGS. 3A, 3B, and 3C or include another embodiment of the electronic device. For example, at least some components illustrated in FIG. 4 will be described with reference to FIGS. 5A to 5C and 6A to 6C. FIGS. 5A, 5B, and 5C are views illustrating screen constitutions of menus for setting up continuous uses of applications according to various embodiments. FIGS. 6A, 6B, and 6C are views illustrating screen constitutions of the multi-window for setting up continuous uses of applications according to various embodiments.

Referring to FIG. 4, the electronic device 400 may include a processor 401, a display device 403, a sensor module 405, and/or a memory 407. For example, the processor 401 may be substantially identical to the processor 120 illustrated in FIG. 1 or included in the processor 120. For example, the display device 403 may be substantially identical to the display device 160 illustrated in FIG. 1 or included in the display device 160. For example, the sensor module 405 may be substantially identical to the sensor module 176 illustrated in FIG. 1 or included in the sensor module 176. For example, the memory 407 may be substantially identical to the memory 130 illustrated in FIG. 1 or included in the memory 130.

According to various embodiments, the processor 401 may control the display device 403 to display a multi-window when the electronic device 400 is in the unfolded state. According to the embodiment, the processor 401 may control the display device 403 to divide the display area of the display device 403 into the plurality of areas and display information related to at least one application through the areas. For example, as illustrated in FIG. 6A, the processor 401 may control the display device 403 to display information related to Application A (e.g., an Internet application) in a first area among the plurality of areas, display information related to Application C (e.g., a telephone application) in a second area, and display information related to Application B (e.g., a calendar application) in a third area. For example, the processor 401 may control the display device 403 to display first information related to the Application D (e.g., a messenger application) in the first area among the plurality of areas and display second information related to Application D in the second area. For example, the information related to the application may include a service screen of the application and/or a graphic user interface related to the application.

According to various embodiments, when the electronic device 400 switches from the unfolded state to the folded state, the processor 401 may check at least one application set to be continuously used. According to the embodiment, the processor 401 may detect the switching of the electronic device 400 to the folded state based on the sensor data of the sensor module 405. According to the embodiment, when the electronic device 400 switches to the folded state, the processor 401 may check the application set to be continuously used among the one or more applications displayed on the display device 403 through the multi-window. For example, the folded state may include a state in which an angle between one surface (e.g., the first surface 211) of the first housing structure (e.g., the first housing structure 210 in FIG. 2A) and one surface (e.g., the third surface 221) of the second housing structure (e.g., the second housing structure 220 in FIG. 2A) is a predetermined first angle or less.

According to various embodiments, the processor 401 may set up the screen constitution in the folded state based on the at least one application set to be continuously used. According to the embodiment, the processor 401 may set up the screen constitution in the folded state for displaying the information related to the at least one application set to be continuously used in the folded state based on the type of the at least one application set to be continuously used and/or the number of applications set to be continuously used. The processor 401 may control the display device 403 to display the information related to the at least one application set to be continuously used based on the screen constitution in the folded state. For example, the screen constitution in the folded state may include the number of areas for displaying the information related to the application, a size of the area, and/or an arrangement of the area.

According to the embodiment, the processor 401 may check whether the information related to the at least one application set to be continuously used may be displayed based on the size of the display device 403 (or the display area of the display device 403) (e.g., the sub-display 251 in FIG. 2A) in the folded state. For example, when the processor 401 determines that the information related to the at least one application set to be continuously used may be displayed, the processor 401 may set up the screen constitution in the folded state based on the type of at least one application set to be continuously used and/or the number of applications set to be continuously used.

According to the embodiment, when the processor 401 determines that the information related to the at least one application set to be continuously used cannot be displayed, the processor 401 may select an application to be displayed in a pop-up window among the one or more applications set to be continuously used. The processor 401 may control the display device 403 to display the information related to the application by using the pop-up window. For example, the remaining application, except for the application displayed in the pop-up window among the one or more applications set to be continuously used, may be displayed on the display device 403 through at least one area (e.g., a single window or a multi-window). For example, the pop-up window may include a separate window that is displayed while at least partially overlapping the information displayed on the display device 403. For example, the pop-up window on the display device 403 may include a second display layer disposed at an upper end of a first display layer including information. For example, the application to be displayed in the pop-up window may be selected based on a display order, an execution point in time, and a priority of the at least one application set to be continuously used, a size of the display area, and/or preset information of the application related to the pop-up window.

According to the embodiment, when the processor 401 determines that the information related to the at least one application set to be continuously used cannot be displayed, the processor 401 may select an application to be displayed on the display device 403 (e.g., the sub-display 251 in FIG. 2A) in the folded state among the one or more applications set to be continuously used. The processor 401 may control the display device 403 to display the information related to the application to be displayed on the display device 403 (e.g., the sub-display 251 in FIG. 2A) in the folded state. For example, the application to be displayed on the display device 403 (e.g., the sub-display 251 in FIG. 2A) in the folded state may be selected based on a display order, an execution point in time, and a priority of the at least one application set to be continuously used, a size of the display area, and/or preset information of the application related to the pop-up window.

According to various embodiments, when the electronic device 400 switches from the folded state to the unfolded state, the processor 401 may set up the screen constitution in the unfolded state. According to the embodiment, the processor 401 may detect the switching of the electronic device 400 to the unfolded state based on the sensor data of the sensor module 405. According to the embodiment, when the electronic device 400 switches to the unfolded state, the processor 401 may check history information of the screen constitution related to the unfolded state stored in the memory 407. For example, when the processor 401 supports the multi-window in the unfolded state based on the history information of the screen constitution related to the unfolded state, the processor 401 may control the display device 403 to display the information related to the at least one application through the multi-window. According to the embodiment, when the electronic device 400 switches to the unfolded state, the processor 401 may determine whether the multi-window is supported. For example, when the processor 401 determines that the multi-window is supported, the processor 401 may control the display device 403 to display the information related to the at least one application through the multi-window. For example, whether the multi-window is supported may be determined based on preset information related to whether the multi-window is used in the unfolded state and/or on user's usage pattern in the unfolded state. For example, the unfolded state may include a state in which the angle between one surface (e.g., the first surface 211) of the first housing structure (e.g., the first housing structure 210 in FIG. 2A) and one surface (e.g., the third surface 221) of the second housing structure (e.g., the second housing structure 220 in FIG. 2A) is a predetermined second angle or more. For example, the predetermined second angle may be relatively larger than the predetermined first angle.

According to various embodiments, the processor 401 may control the display device 403 to realign a plurality of pop-up windows displayed on the display device 403 based on a structural change of the electronic device 400. According to the embodiment, the structural change of the electronic device 400 may be detected based on the sensor data of the sensor module 405. For example, the structural change of the electronic device 400 may include the switching from the unfolded state to the folded state, the switching from the folded state to the unfolded state, the switching from the unfolded state to the intermediate state, the switching from the folded state to the intermediate state, the switching from the intermediate state to the folded state, and/or the switching from the intermediate state to the unfolded state.

According to the embodiment, when the structure of the electronic device 400 is changed, the processor 401 may determine whether to realign the plurality of pop-up windows based on a ratio and/or size of the display device 403 (or the display area of the display device 403). The processor 401 determine that the plurality of pop-up windows is to be realigned, the processor 401 may control the display device 403 to realign the plurality of pop-up windows. According to the embodiment, when the structure of the electronic device 400 is changed, the processor 401 may determine whether to realign the plurality of pop-up windows based on preset information related to the pop-up window. When the processor 401 determines that the plurality of pop-up windows is to be realigned, the processor 401 may control the display device 403 to realign the plurality of pop-up windows. For example, the preset information related to the pop-up window may be set based on a user input. According to the embodiment, when the structure of the electronic device 400 is changed, the processor 401 may determine whether to realign the plurality of pop-up windows based on a use history related to realignment of the pop-up window. When the processor 401 determines that the plurality of pop-up windows is to be realigned, the processor 401 may control the display device 403 to realign the plurality of pop-up windows. For example, the use history related to the realignment of the pop-up window may include information indicating whether the realignment of the pop-up window stored most recently in the memory 407 has been performed based on the structural change of the electronic device 400. For example, the realignment of the pop-up window may include a series of operations of changing a method of arranging the pop-up window. For example, the ratio of the display device 403 may be a ratio between a horizontal length and a vertical length of the display device 403 (or the display area of the display device 403).

According to various embodiments, the processor 401 may adjust a size of the pop-up window displayed on the display device 403. According to the embodiment, when the structure of the electronic device 400 is changed, the processor 401 may determine whether to adjust the size of the pop-up window based on the ratio and/or size of the display device 403 (or the display area of the display device 403). When the processor 401 determines that the size of the pop-up window is to be adjusted, the processor 401 may adjust the size of the pop-up window displayed on the display device 403 based on the ratio and/or size of the display device 403 (or the display area of the display device 403). According to the embodiment, when the structure of the electronic device 400 is changed, the processor 401 may determine whether to adjust the size of the pop-up window based on preset information related to the pop-up window. When the processor 401 determines that the size of the pop-up window is to be adjusted, the processor 401 may adjust the size of the pop-up window displayed on the display device 403 based on the ratio and/or size of the display device 403 (or the display area of the display device 403). For example, the preset information related to the pop-up window may be set based on the user input. According to the embodiment, when the structure of the electronic device 400 is changed, the processor 401 may determine whether to adjust the size of the pop-up window based on the use history related to the adjustment of the size of the pop-up window. When the processor 401 determines that the size of the pop-up window is to be adjusted, the processor 401 may adjust the size of the pop-up window displayed on the display device 403 based on the ratio and/or size of the display device 403 (or the display area of the display device 403). For example, the use history related to the adjustment of the size of the pop-up window may include information indicating whether the adjustment of the size of the pop-up window stored most recently in the memory 407 has been performed based on the structural change of the electronic device 400.

According to various embodiments, the processor 401 may set up the continuous use of the at least one application installed in the electronic device 400. According to the embodiment, referring to FIG. 5A, when the menu related to setting of the continuous use is executed, the processor 401 may control the display device 403 to display an application list 500. The processor 401 may set up whether to continuously use the corresponding applications based on an input related to the application included in the application list 500. For example, Application A, Application B, Application D, and Application H 502, which are set to be 'ON' in the application list 500, may be set to be continuously used. For example, Application C, Application E, Application F, Application G, and Application I 504, which are set to be 'OFF' in the application list 500, may not set to be continuously used. For example, the application list 500 may include at least one application that may be set up to be continuously used among the plurality of applications installed in the electronic device 400.

According to the embodiment, referring to FIG. 5B, when the menu related to the setting of the continuous use is executed, the processor 401 may control the display device 403 to display an additional screen 510 of the application set to be continuously used. The processor 401 may control the display device 403 to display the application list including at least one application that may be set to be continuously used based on an input related to an additional object 512 included in the additional screen 510 of the application. The processor 401 may set up the continuous use of at least one application selected based on the user input in the application list displayed on the display device 403. For example, Application A, Application B, Application D, and Application H 514 displayed on the additional screen 510 of the application may be set to be continuously used. For example, the order of the applications displayed on the additional screen 510 of the application may indicate the priority of the applications. For example, as illustrated in FIG. 5C, the additional screen 510 of the application may include an object 520 for changing the priority of the applications set to be continuously used.

According to the embodiment, the display device 403 may display an object 610 related to a control menu in an area (e.g., the second area) in which information related to the application (e.g., Application C) that may be set to be continuously used in the multi-window 600 is displayed. For example, when the processor 401 receives an input 612 related to an object 610 related to a control menu illustrated in FIG. 6A, the processor 401 may control the display device 403 to display a control menu 620 (e.g., a notification bar) related to the application displayed on the corresponding area (e.g., the second area), as illustrated in FIG. 6B. For example, the control menu 620 may include an object 622 related to the setting of the continuous use of the application. For example, when the processor 401 receives an input related to the object 622 related to the setting of the continuous use of the application illustrated in FIG. 6B, the processor 401 may determine that the corresponding application is set to be continuously used. As illustrated in FIG. 6C, the processor 401 may control the display device 403 to update 630 a visual effect (e.g., a shadow, a color, and/or brightness) of the object 622 related to the setting of the continuous use of the application in order to indicate that the corresponding application is set to be continuously used.

According to various embodiments, the display device 403 may display information to be processed by the electronic device 400. According to the embodiment, the display device 403 may be deformed to various shapes in accordance with the structural change of the electronic device 400. For example, when the electronic device 400 is in the unfolded state, the display device 403 may include a display area having a first size. For example, when the electronic device 400 is in the unfolded state, the display device 403 may include a display 230 disposed in the space defined by the first and second housing structures 210 and 220. For example, when the electronic device 400 is in the unfolded state, the display device 403 may activate the display 230 disposed in the space defined by the pair of housing structures 210 and 220 in FIG. 2A and deactivate the sub-display 252. For example, when the electronic device 400 is in the folded state, the display device 403 may include a display area having a second size relatively smaller than the first size. For example, when the electronic device 400 is in the folded state, the display device 403 may include the sub-display 252 exposed through the second rear area 251 of the second housing structure 220. For example, when the electronic device 400 is in the folded state, the display device 403 may deactivate the display 230 disposed in the space defined by the pair of housing structures 210 and 220 in FIG. 2A and activate the sub-display 252.

According to various embodiments, the sensor module 405 may acquire motion information of the electronic device 400. According to the embodiment, the sensor module 405 may include a gyro sensor, an atmospheric pressure sensor, a magnetic sensor, and/or an acceleration sensor.

According to various embodiments, the memory 407 may store various data used by at least one constituent element (e.g., the processor 401, the display device 403, and/or the sensor module 405) of the electronic device 400. For example, the data may include information related to a predetermined first angle for determining the folded state of the electronic device 400, a predetermined second angle for determining the unfolded state of the electronic device 400, a history of the screen constitution in the folded state, a history of the screen constitution in the unfolded state, and/or a use history of the application.

According to various embodiments, the electronic device includes: the foldable housing including the hinge structure, the first housing structure connected, directly or indirectly, to the hinge structure, and the second housing structure connected, directly or indirectly, to the hinge structure and configured to be folded with respect to the first housing structure about the hinge structure; the display device having the display area having the shape that varies depending on the first housing structure and the second housing structure; and the processor operatively connected to the display device. The processor may divide a first type display area into a plurality of areas and display information related to a plurality of applications when the electronic device is in the unfolded state. The processor may check at least one application set to be continuously used among the plurality of applications when the electronic device switches to the folded state. The processor may set up the screen constitution in the folded state based on the at least one application and output information related to the at least one application through a second type display area based on the screen constitution.

According to various embodiments, the display device may include the first display disposed in the space defined by at least the first housing structure and the second housing structure based on the unfolded state of the electronic device. The first type display area may include the display area of the first display.

According to various embodiments, the second type display area may include at least a partial area of the first display based on the folded state of the electronic device.

According to various embodiments, the display device may include the second display disposed in the space defined by at least the first housing structure and/or the second housing structure based on the folded state of the electronic device. The second type display area may include the display area of the second display. "Based on" as used herein covers based at least on.

According to various embodiments, the processor may set up the number of times the display area is divided in the folded state, a size of the divided area, and/or an arrangement of the divided areas based on the number of one or more applications.

According to various embodiments, when the plurality of applications is set to be continuously used, the processor may control the display device to divide the second type display area into a plurality of sub-areas and display information related to the application set to be continuously used through the sub-areas.

According to various embodiments, when the plurality of applications is set to be continuously used, the processor may control the display device to select at least one application to be displayed through the pop-up window among the plurality of applications set to be continuously used, divide the second type display area into at least one sub-area based on the number of one or more applications remaining except for at least one application to be displayed through the pop-up window, display information related to at least one remaining application through the sub-areas, and display at least one pop-up window including information related to the at least one application.

According to various embodiments, the processor may realign the at least one pop-up window when the electronic device switches to the unfolded state.

According to various embodiments, the processor may select at least one application to be displayed through the pop-up window based on a display order, an execution point in time, and a priority of the application, a size of the display area, and/or preset information of the application related to the pop-up window.

According to various embodiments, the electronic device includes: the foldable housing including the hinge structure, the first housing structure connected to the hinge structure, and the second housing structure connected to the hinge structure and configured to be folded with respect to the first housing structure about the hinge structure; the display device having the display area having the shape that varies depending on the first housing structure and the second housing structure; and the processor operatively connected to the display device. When the electronic device is in the folded state, the processor may display information related to at least one application through the second type display area. When the electronic device switches to the unfolded state, the processor may determine whether to use the multi-window. When the processor determines that the multi-window is to be used, the processor may set up the screen constitution of the multi-window, divide first type display area into a plurality of areas based on the screen constitution, and output information related to the plurality of applications.

According to various embodiments, the first type display area may include the display area of the first display disposed in the space defined by at least the first housing structure and the second housing structure. The second type display area may include the display area of the second display disposed in the space defined by the first housing structure or the second housing structure.

Figure 7:
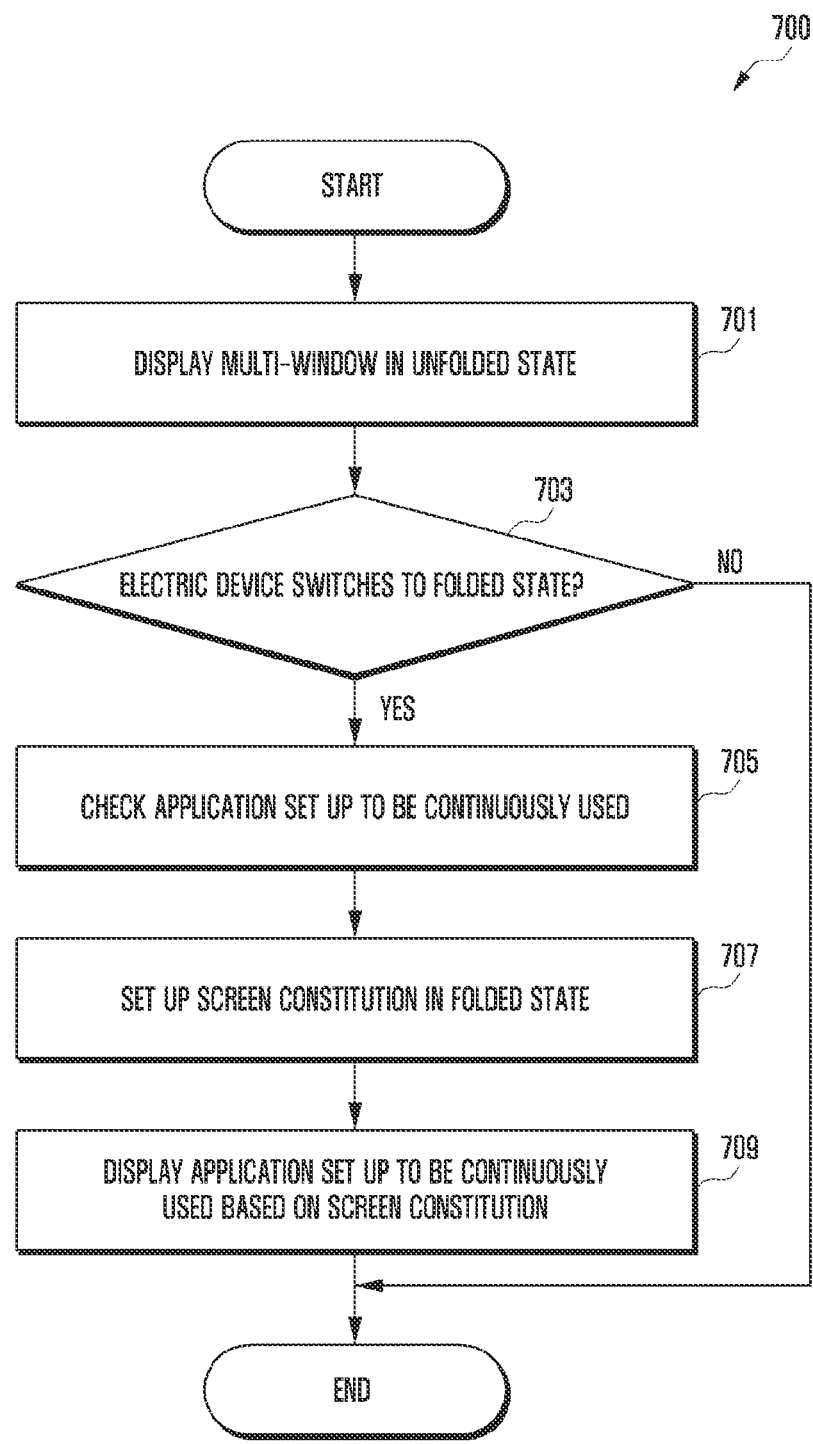
FIG. 7 is a flowchart for setting up a screen constitution in a folded state of the electronic device according to various example embodiments.

FIG. 7 is a flowchart 700 for setting up a screen constitution in a folded state of the electronic device according to various embodiments. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 7 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 7 will be described with reference to FIGS. 8A to 8D, 9A to 9F, 10A to 10C, and 11A to 11E. FIGS. 8A, 8B, 8C, and 8D are views illustrating screen constitutions for indicating, in a folded state, a multi-window divided into two areas in an unfolded state according to various embodiments. FIGS. 9A, 9B, 9C, 9D, 9E, and 9F are views illustrating screen constitutions for indicating, in a folded state, a multi-window divided into three areas in an unfolded state according to various embodiments. FIGS. 10A, 10B, and 10C are views illustrating screen constitutions for indicating, in a folded state, a multi-window divided into four areas in an unfolded state according to various embodiments. FIGS. 11A, 11B, 11C, 11D, and 11E are views illustrating screen constitutions for indicating, in a folded state, the multi-window divided into five areas in an unfolded state according to various embodiments.

Referring to FIG. 7, according to various embodiments, in operation 701, the electronic device (e.g., the processor 120 in FIG. 1, the display device 160, the processor 401 in FIG. 4, or the display device 403) may display the multi-window in the unfolded state of the electronic device. According to the embodiment, referring to FIG. 8A, the processor 401 may control the display device 403 to display information related to Application A in the unfolded state 800 of the electronic device 400. When the processor 401 receives an input related to the screen division, the processor 401 may divide the display area of the display device 403 into two areas. In this case, the first area of the display device 403 may display information related to Application A, and the second area may display information related to Application B.

According to various embodiments, in operation 703, the electronic device (e.g., the processor 120 or 401 or the sensor module 176 or 403) may check whether the structure of the electronic device (e.g., the electronic device 400) switches to the folded state. According to the embodiment, the processor 401 may check whether the electronic device 400 switches to the folded state based on motion information of one surface (e.g., the third surface 221) of the first housing structure (e.g., the first housing structure 210 in FIG. 2A) and the second housing structure (e.g., the second housing structure 220 in FIG. 2A) provided through the sensor module 405. For example, the folded state may include a state in which an angle between one surface (e.g., the first surface 211) of the first housing structure (e.g., the first housing structure 210 in FIG. 2A) and one surface (e.g., the third surface 221) of the second housing structure (e.g., the second housing structure 220 in FIG. 2A) is a predetermined first angle or less. According to the embodiment, when the structure of the electronic device (e.g., the electronic device 400) is maintained in the unfolded state (e.g., 'NO' in operation 703), the electronic device (e.g., the processor 120 or 401) may end the operation.

According to various embodiments, when the structure of the electronic device (e.g., the electronic device 400) switches to the folded state (e.g., 'YES' in operation 703), the electronic device (e.g., the processor 120 or 401) may check the application set to be continuously used in operation 705. According to the embodiment, when the electronic device 400 switches to the folded state, the processor 401 may check the application set to be continuously used among the one or more applications displayed on the display device 403 through the multi-window in the unfolded state. For example, the application set to be continuously used may display a visual effect (e.g., an object) for indicating the setting of continuous use. For example, the visual effect for indicating the setting of the continuous use may be selectively displayed based on the user's setting.

According to various embodiments, in operation 707, the electronic device (e.g., the processor 120 or 401) may set up the screen constitution in the folded state based on the application set to be continuously used. According to the embodiment, the processor 401 may set up the screen constitution in the folded state for displaying the information related to the at least one application set to be continuously used in the folded state based on the type of the at least one application set to be continuously used and/or the number of applications set to be continuously used. For example, the processor 401 may divide the display area in the folded state based on the number of applications set to be continuously used. For example, when the number of applications set to be continuously used is two, the processor 401 may divide the display area in the folded state into two areas. For example, when the number of applications set to be continuously used is one, a single area may be used without dividing the display area in the folded state. For example, the screen constitution in the folded state may include the number of areas for displaying the information related to the application, a size of the area, and/or an arrangement of the area. According to the embodiment, when the plurality of applications is set to be continuously used, the processor 401 may set up the arrangement of information related to the applications. For example, the arrangement of information related to the applications may be set based on a display order, an execution point in time, and a priority of the application, and/or a size of the display area.

Figure 8A:
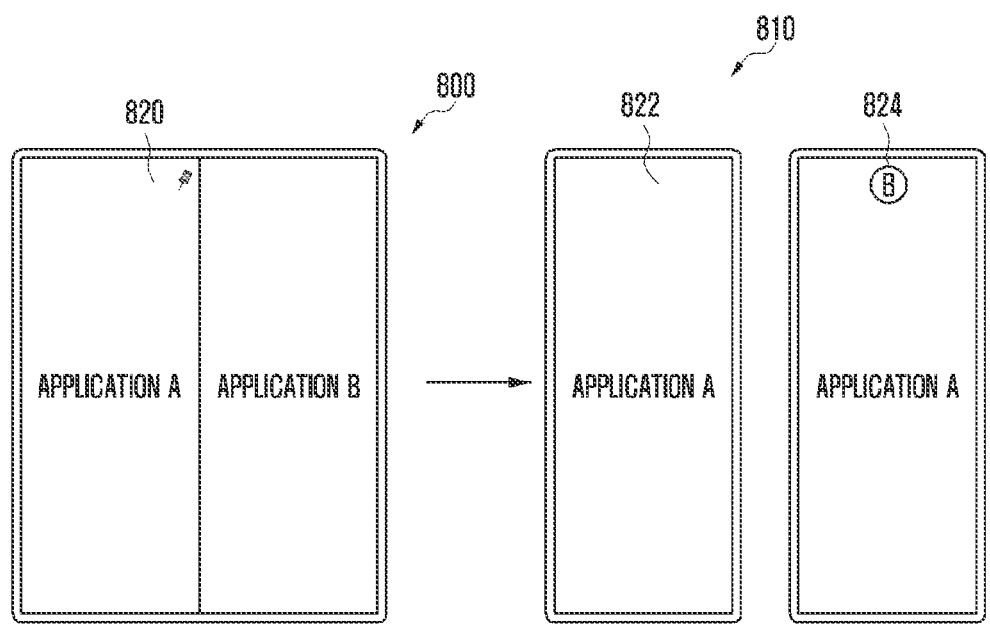
FIGS. 8A, 8B, 8C, and 8D are views illustrating screen constitutions for indicating, in a folded state, a multi-window divided into two areas in an unfolded state according to various example embodiments.

According to various embodiments, in operation 709, the electronic device (e.g., the processor 120 or 401) may display information related to the application set to be continuously used based on the screen constitution in the folded state. According to the embodiment, as illustrated in FIG. 8A, when Application A 820 of Applications A and B displayed in the multi-window 800 in the unfolded state is set to be continuously used, the display device 403 (e.g., the sub-display 252 in FIG. 2B) in the folded state 810 may display information 822 related to Application A. For example, the display device 403 in the folded state 810 may display, in at least a partial area, an object 824 indicating that Application B, which has been displayed in the multi-window in the unfolded state 800, is not displayed in the folded state.

Figure 8B:
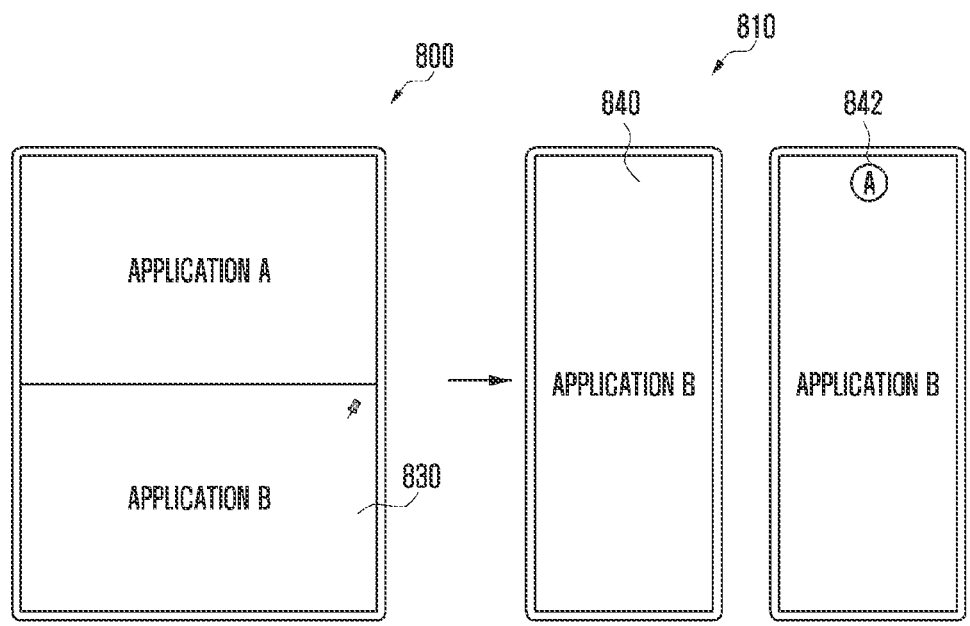

According to the embodiment, as illustrated in FIG. 8B, when Application B 830 of Applications A and B displayed in the multi-window 800 in the unfolded state is set to be continuously used, the display device 403 (e.g., the sub-display 252 in FIG. 2B) in the folded state 810 may display information 840 related to Application B. For example, the display device 403 in the folded state 810 may display, in at least a partial area, an object 842 indicating that Application A, which has been displayed in the multi-window in the unfolded state 800, is not displayed in the folded state.

Figure 8C:
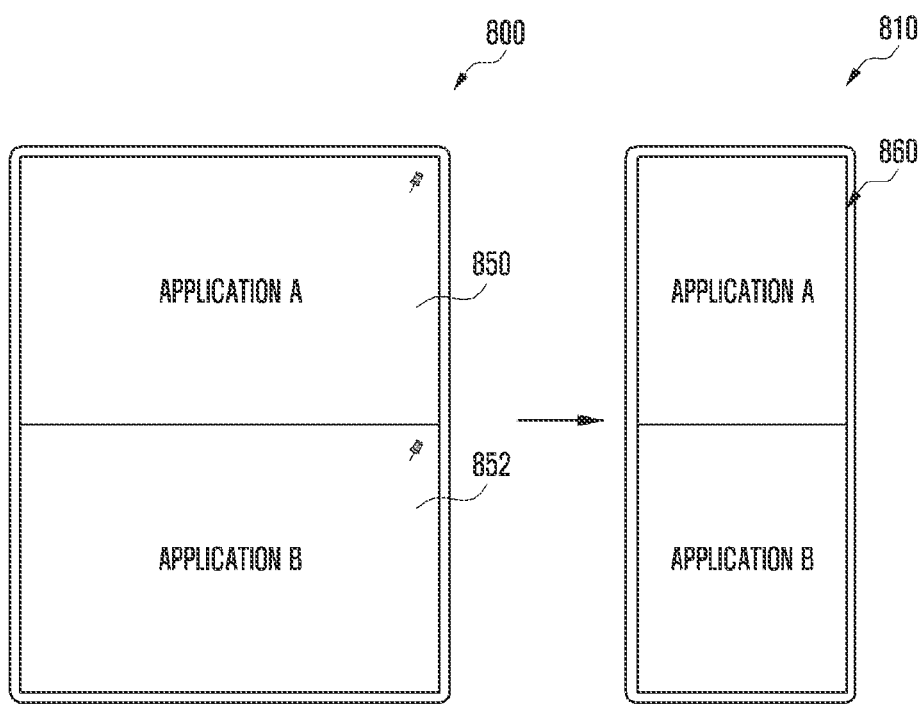

According to the embodiment, as illustrated in FIG. 8C, when Application A 850 and Application B 852, which are displayed in the multi-window vertically divided in the unfolded state 800, are set to be continuously used, the display device 403 (e.g., the sub-display 252 in FIG. 2B) in the folded state 810 may divide the display area into two areas and display information 860 related to Application A and Application B. In this case, the first area of the display device 403 in the folded state 810 may display information related to Application A, and the second area may display information related to Application B. For example, like the unfolded state 800, the first and second areas in the folded state 810 may be vertically divided from the display area.

Figure 8D:
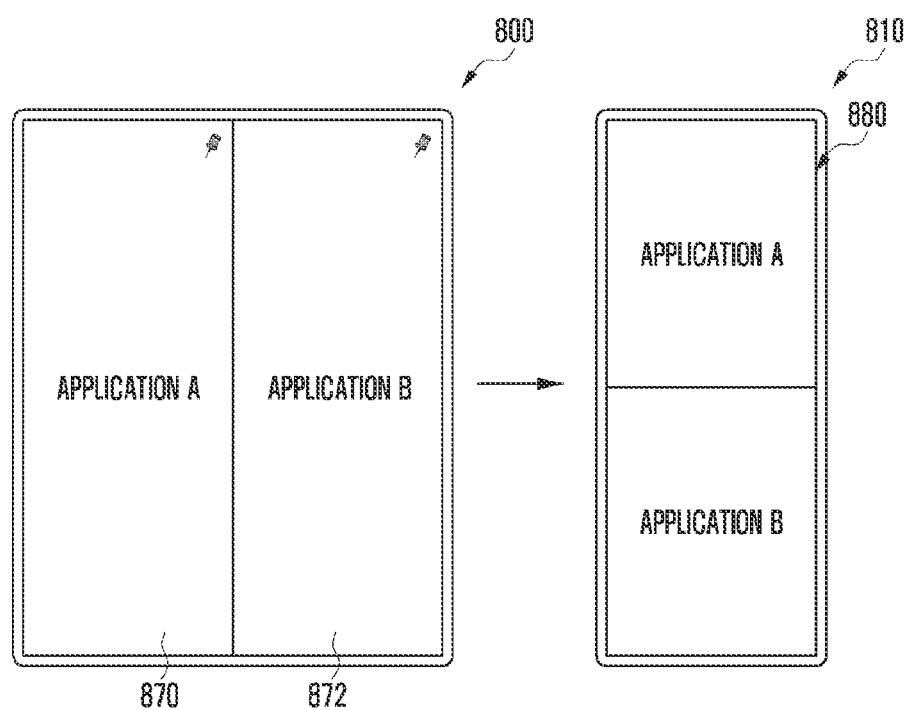

According to the embodiment, as illustrated in FIG. 8D, when Application A 870 and Application B 872, which are displayed in the multi-window horizontally divided in the unfolded state 800, are set to be continuously used, the display device 403 (e.g., the sub-display 252 in FIG. 2B) in the folded state 810 may divide the display area into two areas and display information 880 related to Application A and Application B. For example, the display device 403 in the folded state 810 may vertically divide the display area into two areas based on the size and/or ratio of the display device 403 in the folded state 810.

Figure 9A:
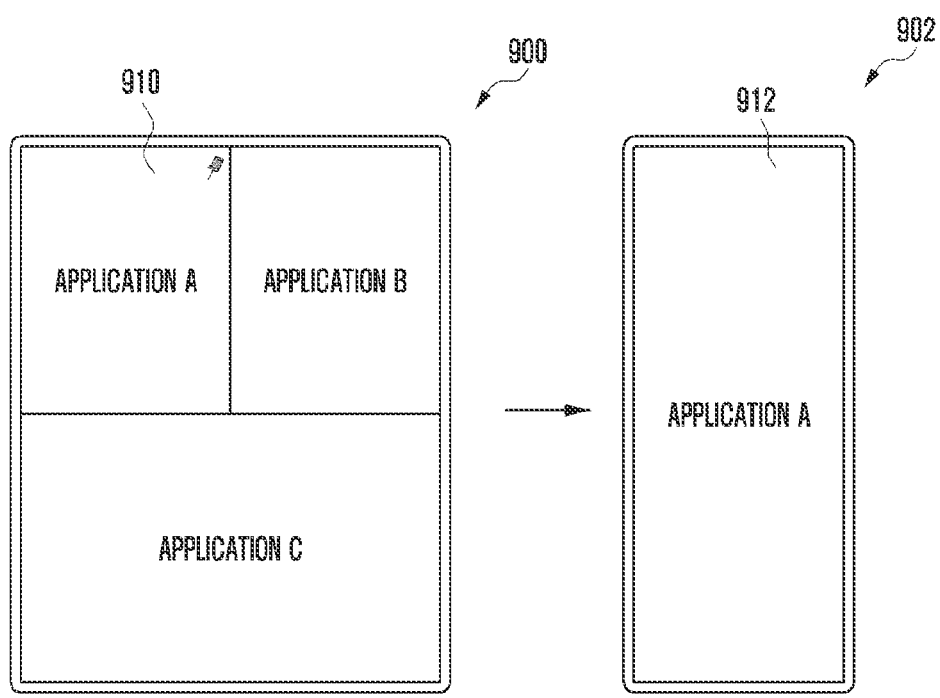
FIGS. 9A, 9B, 9C, 9D, 9E, and 9F are views illustrating screen constitutions for indicating, in a folded state, a multi-window divided into three areas in an unfolded state according to various example embodiments.
Figure 9B:
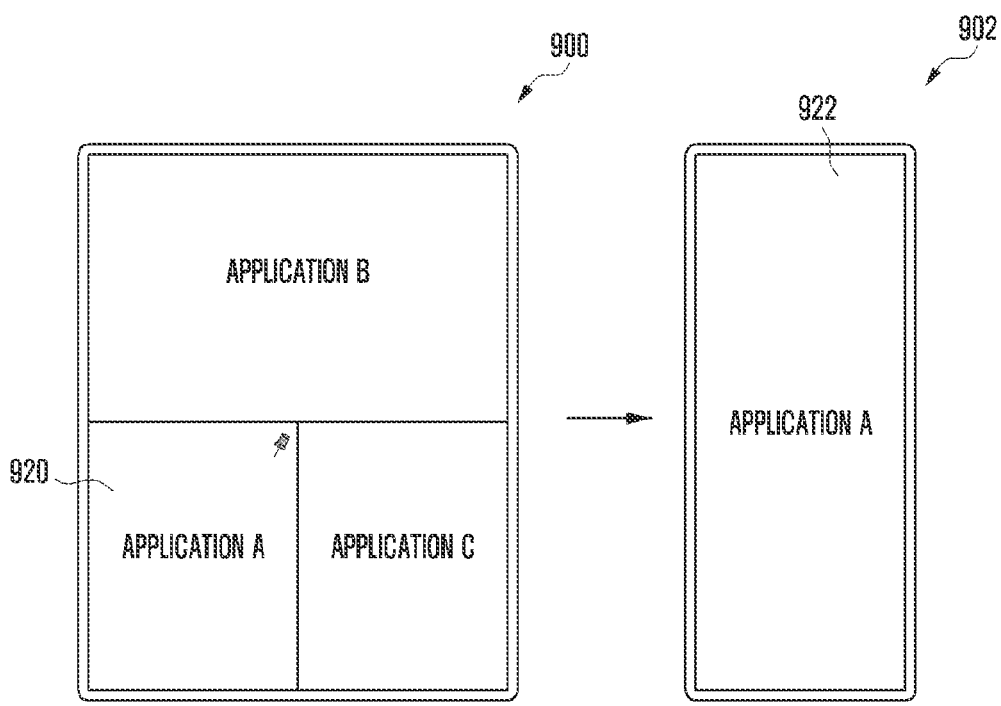
Figure 9C:
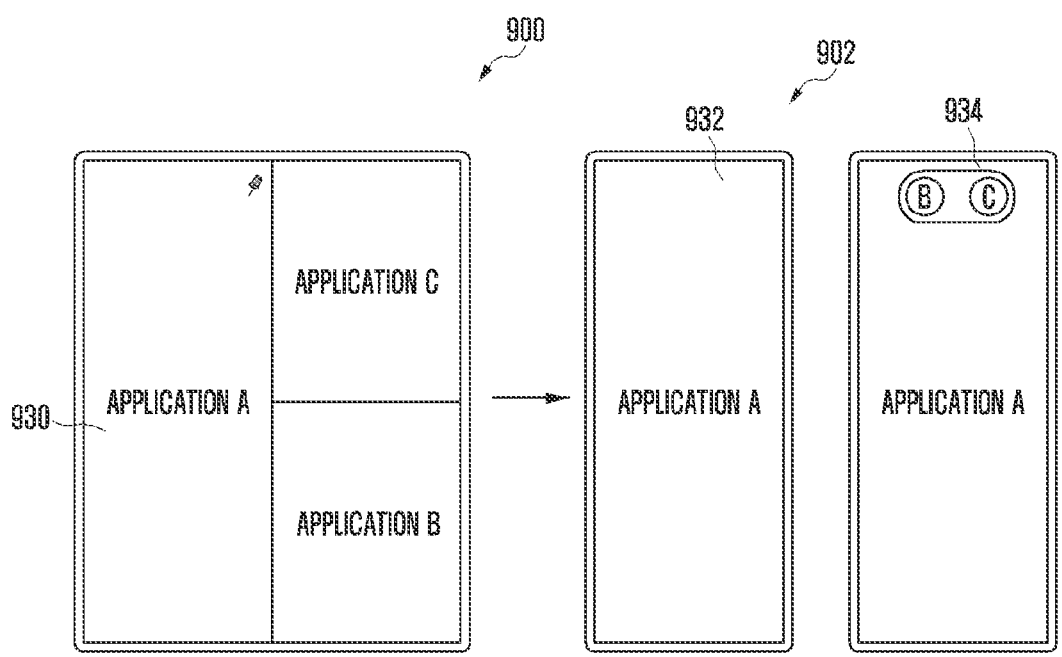
Figure 9D:
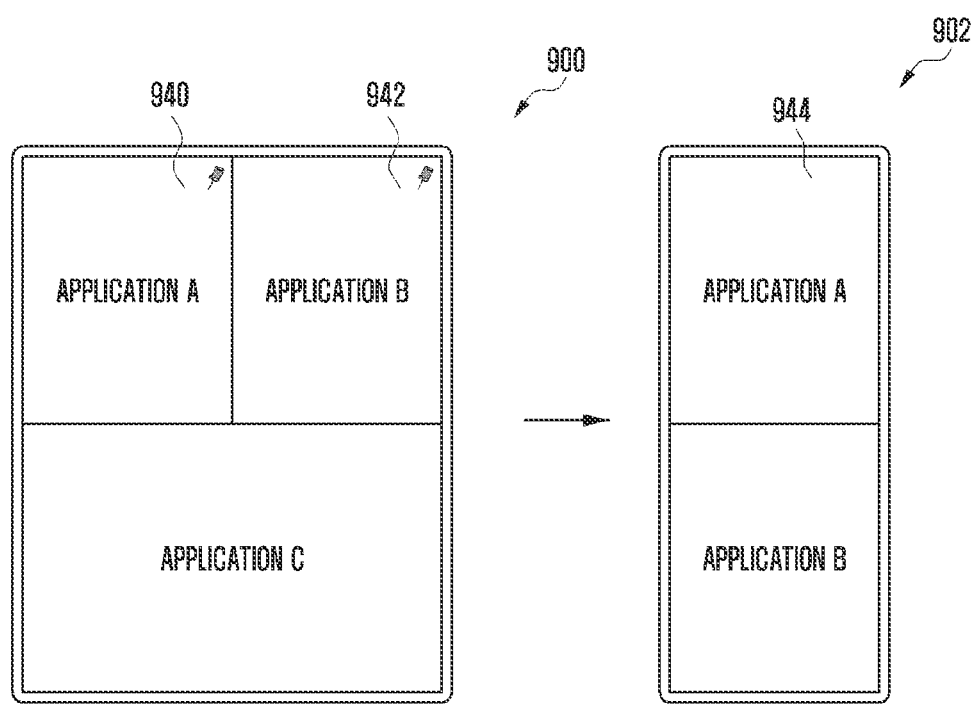
Figure 9E:
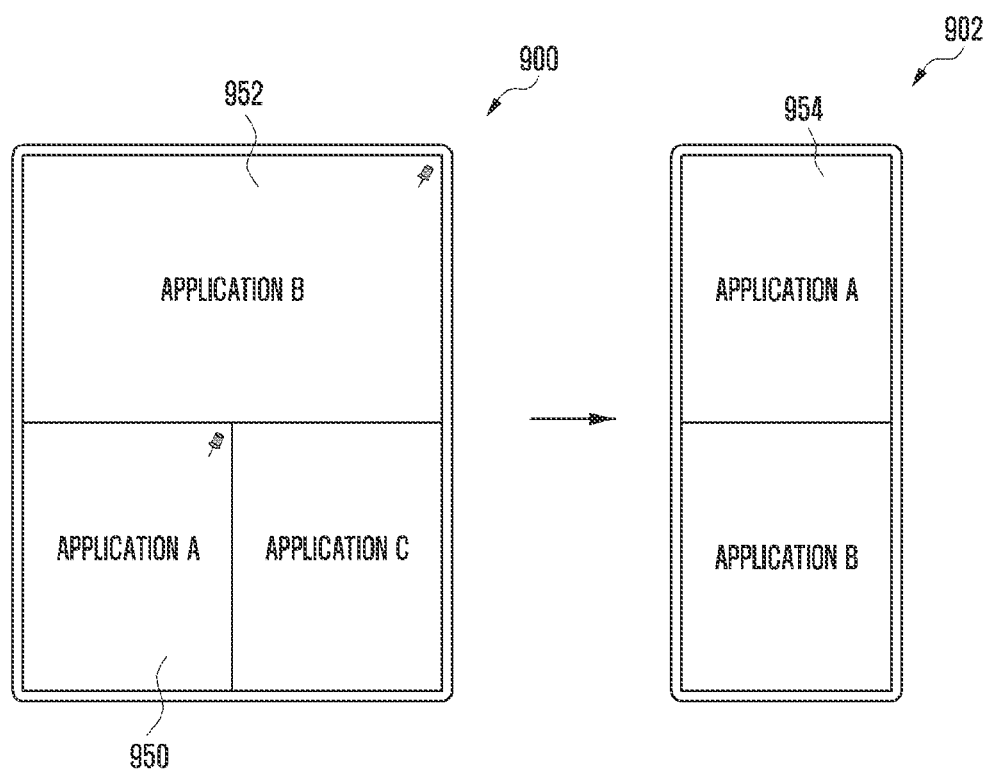
Figure 9F:
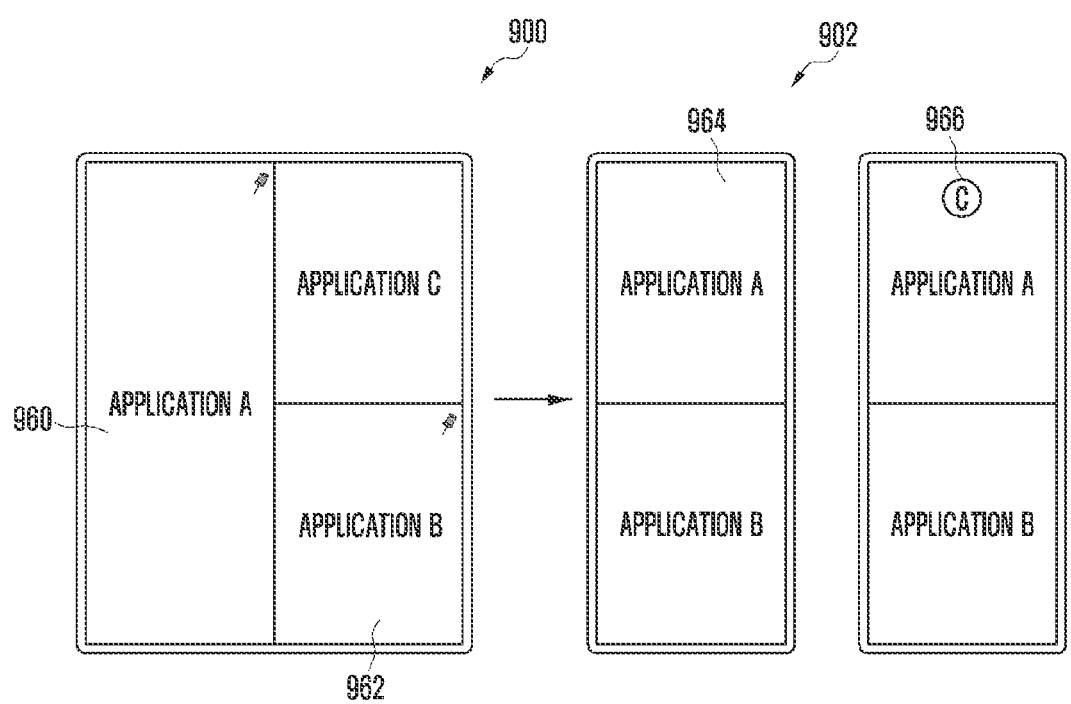
Figure 10A:
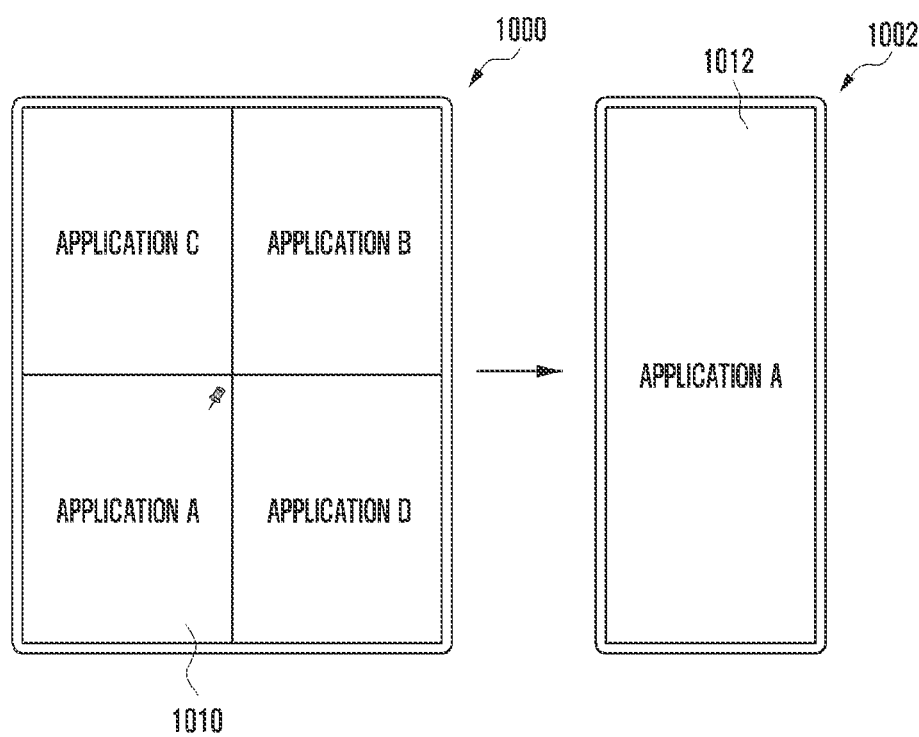
FIGS. 10A, 10B, and 10C are views illustrating screen constitutions for indicating, in a folded state, a multi-window divided into four areas in an unfolded state according to various example embodiments.
Figure 10B:
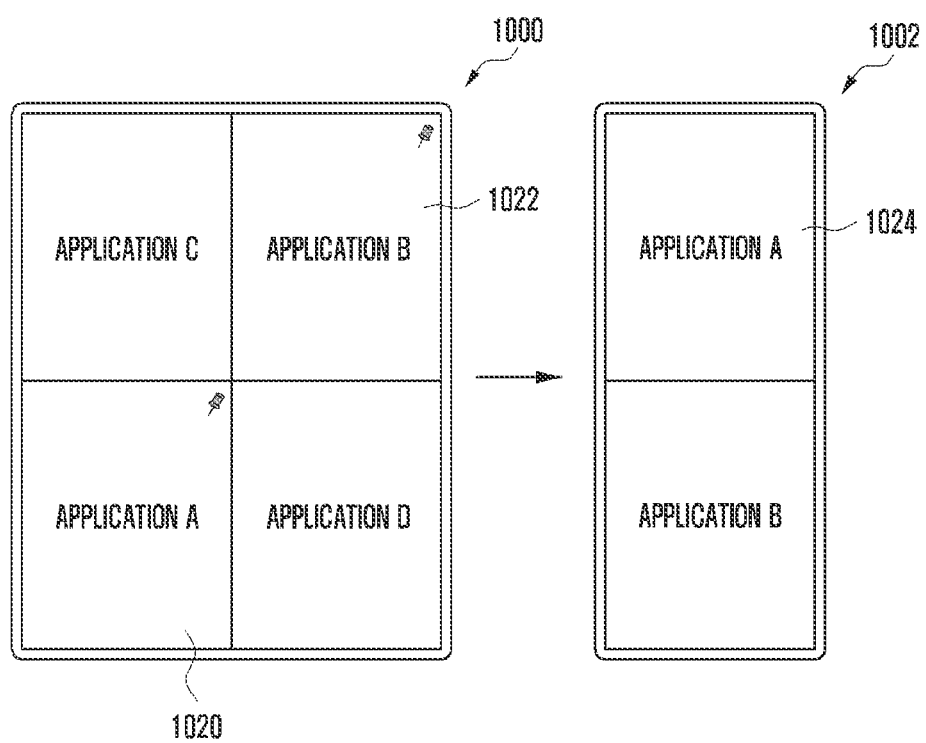
Figure 10C:
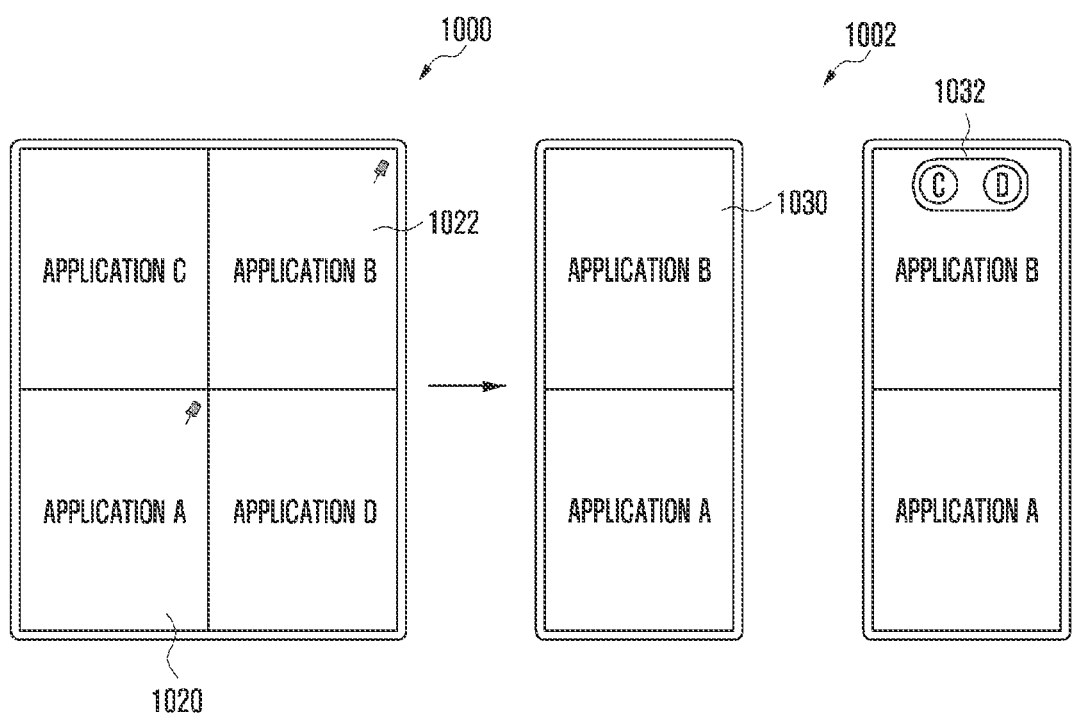

According to various embodiments, as illustrated in FIGS. 9A to 9F, the display device 403 (e.g., the display 230 in FIG. 2A) in the unfolded state 900 may display the multi-window divided into three areas. According to the embodiment, as illustrated in FIG. 9A or 9D, the display device 403 (e.g., the display 230 in FIG. 2A) in the unfolded state 900 may display information related to Application C. The display device 403 (e.g., the display 230 in FIG. 2A) in the unfolded state 900 may divide the display area into two areas based on a first input related to the screen division and additionally display information related to Application A. The display device 403 (e.g., the display 230 in FIG. 2A) in the unfolded state 900 may additionally divide the display area into three areas based on a second input related to the screen division and additionally display information related to Application B. According to the embodiment, as illustrated in FIG. 9B or 9E, the display device 403 (e.g., the display 230 in FIG. 2A) in the unfolded state 900 may divide the display area into three areas based on an input related to the screen division and display information related to Application B, Application A, and Application C in different divided areas. According to the embodiment, as illustrated in FIG. 9C or 9F, the display device 403 (e.g., the display 230 in FIG. 2A) in the unfolded state 900 may divide the display area into three areas based on an input related to the screen division and display information related to Application A, Application C, and Application B in different divided areas.

According to the embodiment, as illustrated in FIG. 9A, 9B, or 9C, when the Application A 910, 920, or 930 displayed in the multi-window in the unfolded state 900 is set to be continuously used, the display device 403 (e.g., the sub-display 252 in FIG. 2B) in the folded state 902 may display information 912, 922, or 932 related to Application A. For example, the display device 403 in the folded state 902 may display, in at least a partial area, an object 934 indicating that Applications B and C, which have been displayed in the multi-window in the unfolded state 900, are not displayed in the folded state.

According to the embodiment, as illustrated in FIG. 9D, 9E, or 9F, when Application A 940, 950, or 960 and Application B 942, 952, or 962, which are displayed in the multi-window in the unfolded state 900, are set to be continuously used, the display device 403 (e.g., the sub-display 252 in FIG. 2B) in the folded state 902 may divide the display area into two areas and display information 944, 954, or 964 related to Application A and Application B. For example, as illustrated in FIG. 9D or 9F, based on the display order of the applications, the display device 403 (e.g., the sub-display 252 in FIG. 2B) in the folded state 902 may display information related to Application A in the first area (e.g., the upper end area) and display information related to Application B in the second area (e.g., the lower end area). For example, as illustrated in FIG. 9E, based on the priority of the applications, the display device 403 (e.g., the sub-display 252 in FIG. 2B) in the folded state 902 may display information related to Application A in the first area (e.g., the upper end area) and display information related to Application B in the second area (e.g., the lower end area). For example, the display device 403 in the folded state 902 may display, in at least a partial area, an object 966 indicating that Application C, which has been displayed in the multi-window 900 in the unfolded state, is not displayed in the folded state. For example, a division direction (e.g., a vertical direction or a horizontal direction) of the display area may be determined based on the size and/or ratio of the display device 403 in the folded state 902.

According to various embodiments, as illustrated in FIGS. 10A to 10C, the display device 403 (e.g., the display 230 in FIG. 2A) in the unfolded state 1000 may display the multi-window divided into four areas. According to the embodiment, as illustrated in FIG. 10A, 10B, or 10C, the display device 403 (e.g., the display 230 in FIG. 2A) in the unfolded state 1000 may divide the display area into four areas based on at least one input related to the screen division and display information related to Application A, Application B, Application C, and Application D in different divided areas.

According to the embodiment, as illustrated in FIG. 10A, when Application A 1010 displayed in the multi-window in the unfolded state 1000 is set to be continuously used, the display device 403 (e.g., the sub-display 252 in FIG. 2B) in the folded state 1002 may display information 1012 related to Application A.

According to the embodiment, as illustrated in FIG. 10B or 10C, when Application A 1020 and Application B 1022, which are displayed in the multi-window in the unfolded state 1000, are set to be continuously used, the display device 403 (e.g., the sub-display 252 in FIG. 2B) in the folded state 1002 may divide the display area into two areas and display information 1024 or 1030 related to Application A and Application B. For example, as illustrated in FIG. 10B, based on the display order of the applications, the display device 403 (e.g., the sub-display 252 in FIG. 2B) in the folded state 1002 may display information related to Application A in the first area (e.g., the upper end area) and display information related to Application B in the second area (e.g., the lower end area). For example, as illustrated in FIG. 10C, based on the arrangement of the multi-window in the unfolded state 1000, the display device 403 (e.g., the sub-display 252 in FIG. 2B) in the folded state 1002 may display information related to Application B in the first area (e.g., the upper end area) and display information related to Application A in the second area (e.g., the lower end area). For example, the display device 403 in the folded state 1002 may display, in at least a partial area, an object 1032 indicating that Applications C and D, which have been displayed in the multi-window in the unfolded state 1000, are not displayed in the folded state.

Figure 11A:
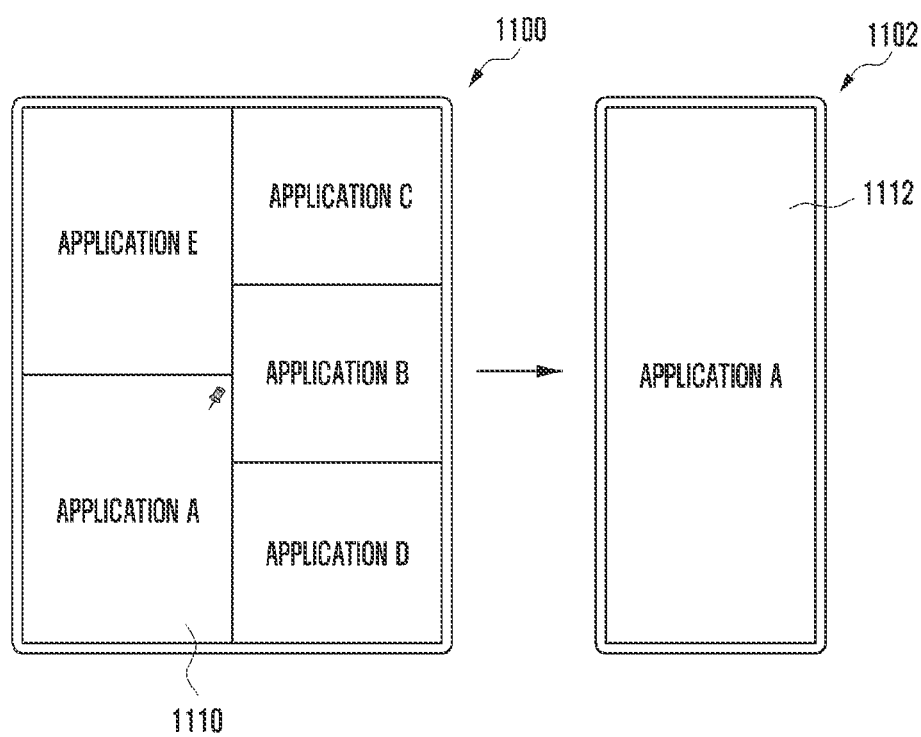
FIGS. 11A, 11B, 11C, 11D, and 11E are views illustrating screen constitutions for indicating, in a folded state, the multi-window divided into five areas in an unfolded state according to various example embodiments.
Figure 11B:
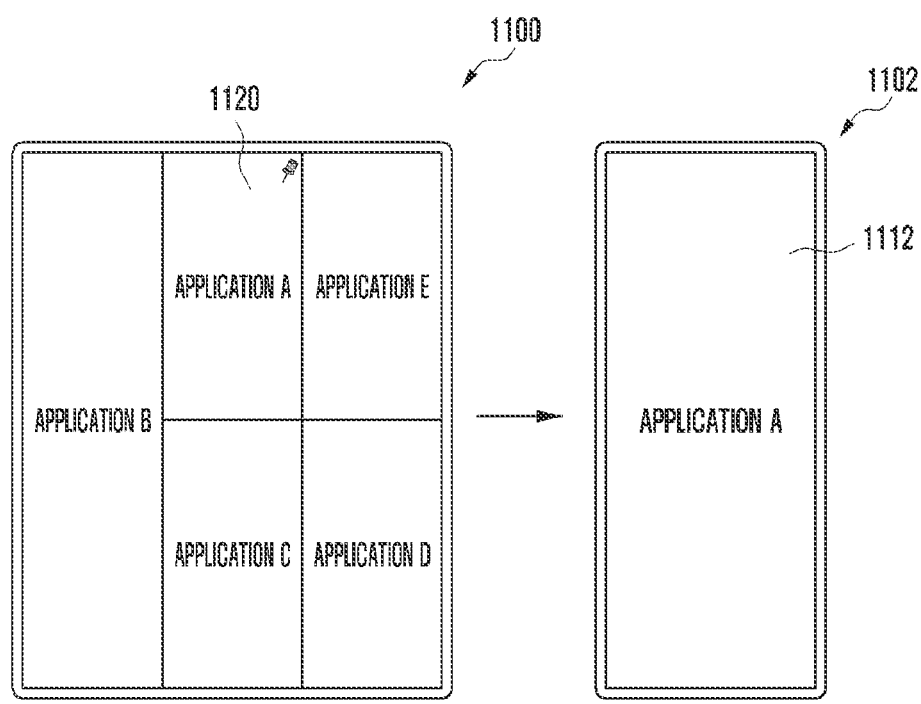
Figure 11C:
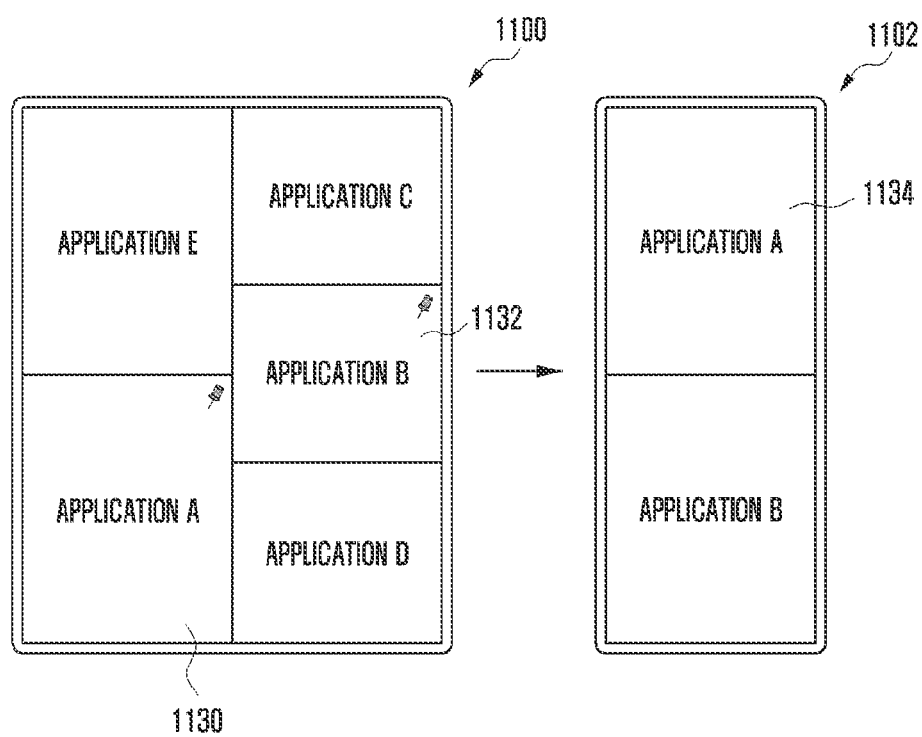
Figure 11D:
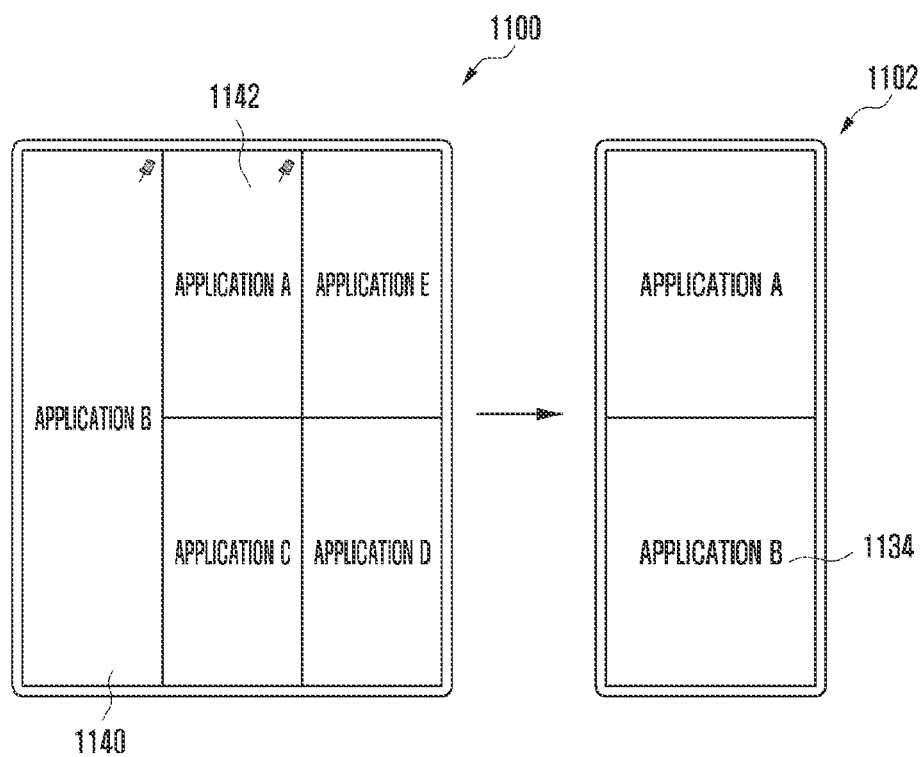
Figure 11E:
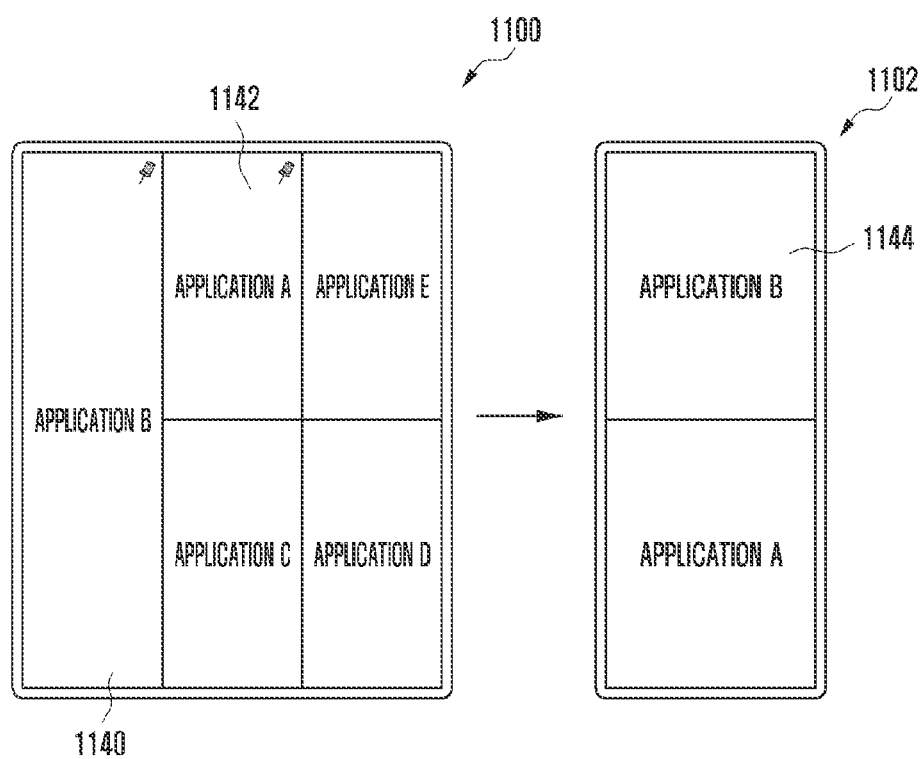

According to various embodiments, as illustrated in FIGS. 11A to 11E, the display device 403 (e.g., the display 230 in FIG. 2A) in the unfolded state 1100 may display the multi-window divided into five areas. According to the embodiment, as illustrated in FIGS. 11A to 11E, the display device 403 (e.g., the display 230 in FIG. 2A) in the unfolded state 1100 may divide the display area into five areas based on at least one input related to the screen division and display information related to Application A, Application B, Application C, Application D, and Application E in different divided areas. For example, as illustrated in FIG. 11A or 11C, the display device 403 (e.g., the display 230 in FIG. 2A) in the unfolded state 1100 may sequentially display information related to Application E, Application A, Application C, Application B, and Application D based on at least one input related to the screen division. For example, as illustrated in FIG. 11B, 11D, or 11E, the display device 403 (e.g., the display 230 in FIG. 2A) in the unfolded state 1100 may sequentially display information related to Application B, Application A, Application E, Application C, and Application D based on at least one input related to the screen division. For example, Application A, Application B, Application C, Application D, and/or Application E may include applications (e.g., the Internet, a telephone, a messenger, a calendar, or a calculator) installed in the electronic device 400.

According to the embodiment, as illustrated in FIG. 11A or 11B, when Application A 1110 or 1120 displayed in the multi-window in the unfolded state 1100 is set to be continuously used, the display device 403 (e.g., the sub-display 252 in FIG. 2B) in the folded state 1102 may display information 1112 related to Application A.

According to the embodiment, as illustrated in FIG. 11C, 11D, or 11E, when Application A 1130 or 1142 and Application B 1132 or 1140, which are displayed in the multi-window in the unfolded state 1100, are set to be continuously used, the display device 403 (e.g., the sub-display 252 in FIG. 2B) in the folded state 1102 may divide the display area into two areas and display information 1134 or 1144 related to Application A and Application B. For example, as illustrated in FIG. 11C, based on the display order of the applications, the display device 403 (e.g., the sub-display 252 in FIG. 2B) in the folded state 1102 may display information related to Application A in the first area (e.g., the upper end area) and display information related to Application B in the second area (e.g., the lower end area). For example, as illustrated in FIG. 11D, based on the arrangement of the multi-window in the unfolded state 1100, the display device 403 (e.g., the sub-display 252 in FIG. 2B) in the folded state 1102 may display information related to Application A in the first area (e.g., the upper end area) and display information related to Application B in the second area (e.g., the lower end area). For example, as illustrated in FIG. 11E, based on the display order of the applications, the display device 403 (e.g., the sub-display 252 in FIG. 2B) in the folded state 1102 may display information related to Application B in the first area (e.g., the upper end area) and display information related to Application A in the second area (e.g., the lower end area). For example, the display device 403 in the folded state 1102 may display, in at least a partial area, an object indicating that Applications C, D, and E, which have been displayed in the multi-window in the unfolded state 1100, are not displayed in the folded state.

According to various embodiments, when the electronic device 400 switches to the folded state, the electronic device (e.g., the processor 120 or 401) may identify whether information related to at least one application set to be continuously used may be displayed based on the size of the display (e.g., the sub-display 251 in FIG. 2A) in the folded state.

According to the embodiment, when the processor 401 determines that the information related to the at least one application set to be continuously used may be displayed, the processor 401 may set up the screen constitution in the folded state based on the type of at least one application set to be continuously used and/or the number of applications set to be continuously used.

According to the embodiment, when the processor 401 determines that the information related to the at least one application set to be continuously used cannot be displayed, the processor 401 may control the display device 403 to display at least one application, among the applications set to be continuously used, through the pop-up window.

According to the embodiment, when the processor 401 determines that the information related to the at least one application set to be continuously used cannot be displayed, the processor 401 may control the display device 403 to display information related to at least one application selected from the applications set to be continuously used.

According to various embodiments, when the electronic device 400 switches to the folded state, the electronic device 400 may display information related to the application based on a direction (orientation) of the electronic device, as illustrated in FIGS. 12A to 12E.

FIGS. 12A, 12B, 12C, 12D, and 12E are views illustrating screen constitutions in a folded state based on a direction of the electronic device according to various embodiments.

Figure 12A:
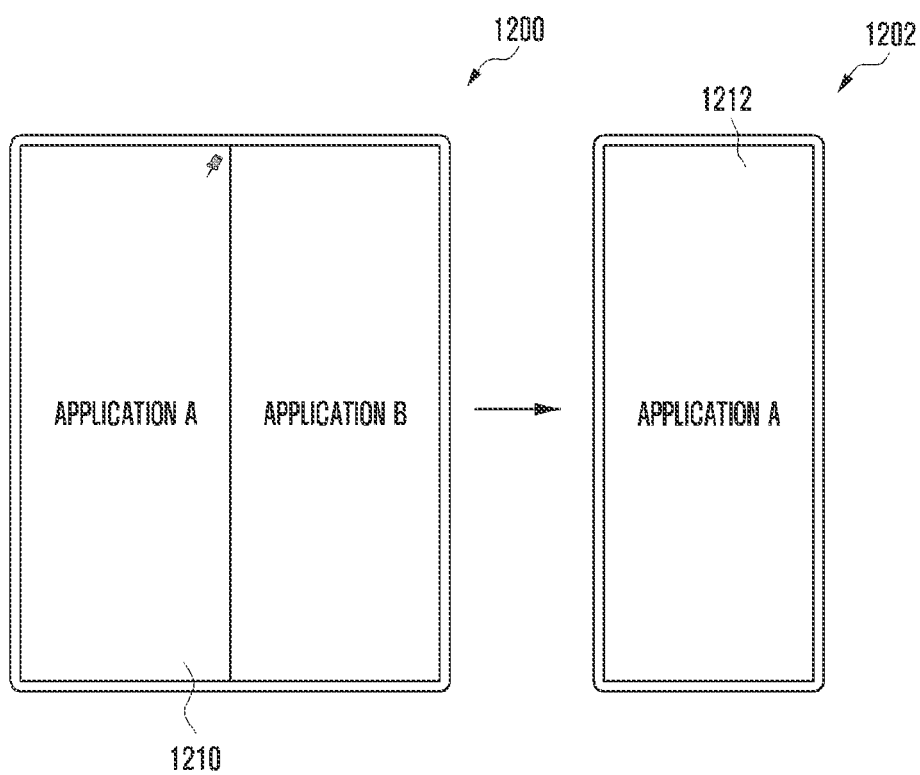
FIGS. 12A, 12B, 12C, 12D, and 12E are views illustrating screen constitutions in a folded state based on a direction of the electronic device according to various example embodiments.
Figure 12B:
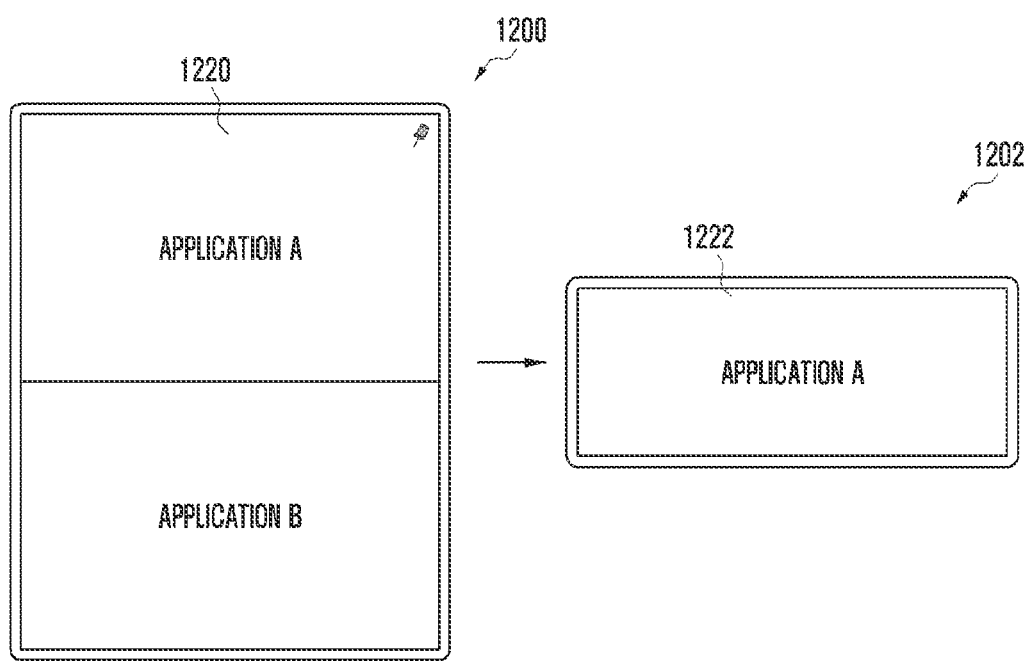

According to various embodiments, as illustrated in FIG. 12A or 12B, the display device 403 (e.g., the display 230 in FIG. 2A) in the unfolded state 1200 may display the multi-window divided into two areas. According to the embodiment, as illustrated in FIG. 12A or 12B, the display device 403 (e.g., the display 230 in FIG. 2A) in the unfolded state 1200 may divide the display area into two areas based on an input related to the screen division and display information related to Application A and Application B. For example, as illustrated in FIG. 12A, the display device 403 (e.g., the display 230 in FIG. 2A) in the unfolded state 1200 may horizontally divide the display area and display information related to Application A and Application B. For example, as illustrated in FIG. 12B, the display device 403 (e.g., the display 230 in FIG. 2A) in the unfolded state 1200 may vertically divide the display area and display information related to Application A and Application B.

According to various embodiments, as illustrated in FIG. 12A or 12B, when Application A 1210 or 1220 displayed in the multi-window in the unfolded state 1200 is set to be continuously used, the display device 403 (e.g., the sub-display 252 in FIG. 2B) in the folded state 1202 may display information 1212 or 1222 related to Application A. According to the embodiment, as illustrated in FIG. 12A, when the electronic device 400 is in a first direction (e.g., the vertical direction), the display device 403 (e.g., the sub-display 252 in FIG. 2B) in the folded state 1202 may display information 1212 related to Application A in a first form (e.g., portrait) in the first direction. According to the embodiment, as illustrated in FIG. 12B, when the electronic device 400 is in a second direction (e.g., the horizontal direction), the display device 403 (e.g., the sub-display 252 in FIG. 2B) in the folded state 1202 may display information 1222 related to Application A in a second form (e.g., landscape) based on the second direction.

Figure 12C:
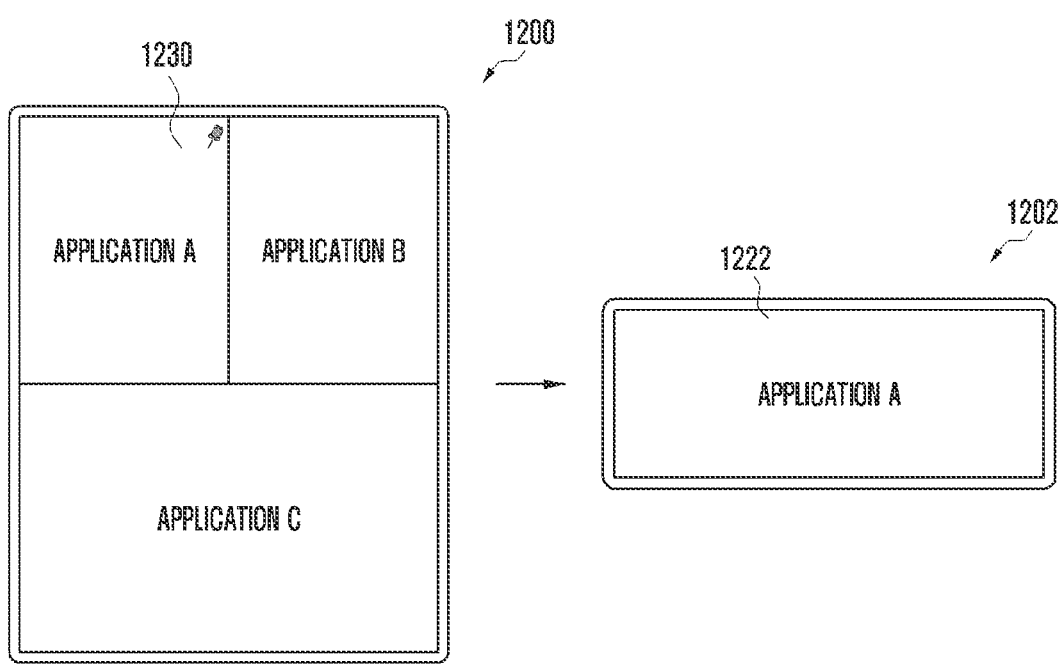
Figure 12D:
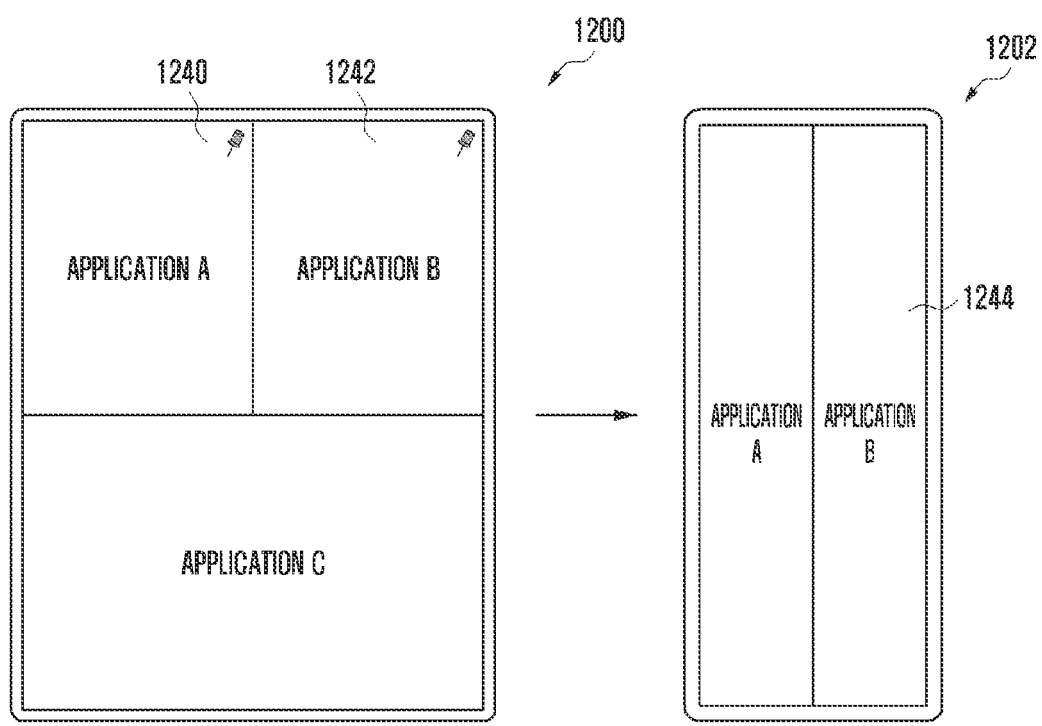
Figure 12E:
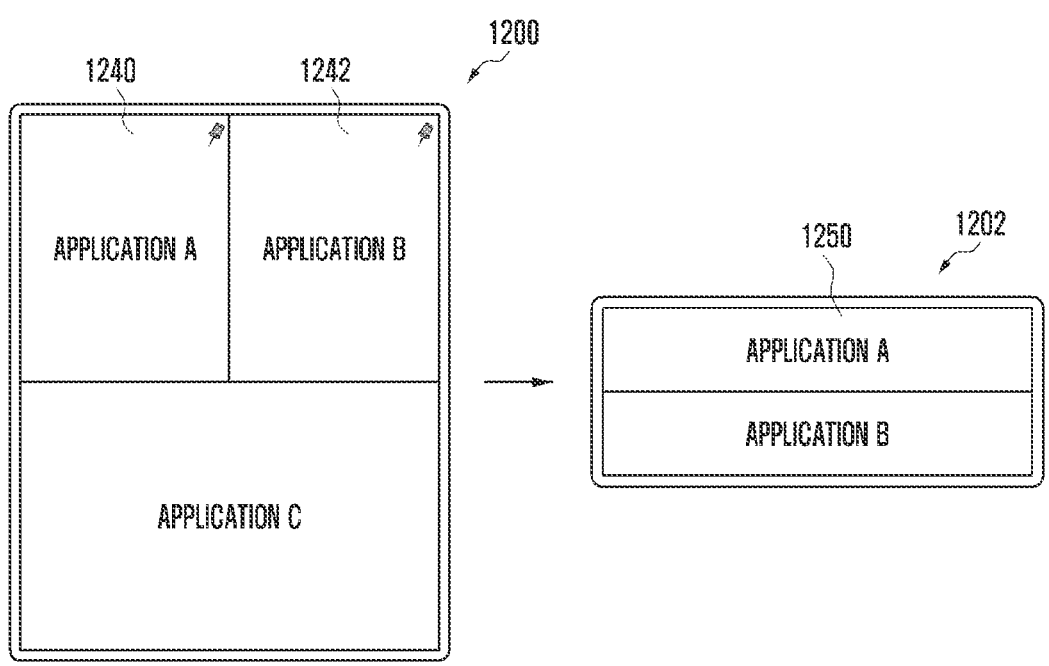

According to various embodiments, as illustrated in FIG. 12C, 12D, or 12E, the display device 403 (e.g., the display 230 in FIG. 2A) in the unfolded state 1200 may display the multi-window divided into three areas. According to the embodiment, as illustrated in FIG. 12C, 12D, or 12E, the display device 403 (e.g., the display 230 in FIG. 2A) in the unfolded state 1200 may divide the display area into three areas based on an input related to the screen division and display information related to Application A, Application B, and Application C.

According to various embodiments, as illustrated in FIG. 12C, when Application A 1230 displayed in the multi-window in the unfolded state 1200 is set to be continuously used, the display device 403 (e.g., the sub-display 252 in FIG. 2B) in the folded state 1202 may display information 1222 related to Application A. According to the embodiment, as illustrated in FIG. 12C, when the electronic device 400 is in the second direction (e.g., the horizontal direction), the display device 403 (e.g., the sub-display 252 in FIG. 2B) in the folded state 1202 may display information 1222 related to Application A in the second form (e.g., landscape) based on the second direction.

According to various embodiments, as illustrated in FIG. 12D or 12E, when Application A 1240 and Application B 1242 displayed in the multi-window in the unfolded state 1200 are set to be continuously used, the display device 403 (e.g., the sub-display 252 in FIG. 2B) in the folded state 1202 may display information 1244 or 1250 related to Application A and Application B. According to the embodiment, as illustrated in FIG. 12D, when the electronic device 400 is in the first direction (e.g., the vertical direction), the display device 403 (e.g., the sub-display 252 in FIG. 2B) in the folded state 1202 may divide the display area into two areas based on the first way (e.g., the left/right, horizontal direction) and display information 1244 related to Application A and Application B. According to the embodiment, as illustrated in FIG. 12E, when the electronic device 400 is in the second direction (e.g., the horizontal direction), the display device 403 (e.g., the sub-display 252 in FIG. 2B) in the folded state 1202 may divide the display area into two areas based on the second way (e.g., the up/down, vertical direction) and display information 1250 related to Application A and Application B.

FIG. 13 is a flowchart for setting up a screen constitution in a folded state by using a pop-up window of the electronic device according to various embodiments. According to the embodiment, the operations illustrated in FIG. 13 may be one embodiment of operation 707 in FIG. 7. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 13 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 13 will be described with reference to FIGS. 14A to 14E and 15A to 15E. FIGS. 14A, 14B, 14C, 14D, and 14E are views illustrating screen constitutions indicating a multi-window in an unfolded state by using a pop-up window in a folded state according to various embodiments. FIGS. 15A, 15B, 15C, 15D, and 15E are views illustrating screen constitutions for indicating a multi-window divided into five areas in an unfolded state by using a pop-up window in a folded state according to various embodiments.

Referring to FIG. 13, according to various embodiments, in operation 1301, the electronic device (e.g., the processor 120 in FIG. 1 or the processor 401 in FIG. 4) may check whether the plurality of applications set to be continuously used is present. According to the embodiment, when the electronic device 400 switches to the folded state, the processor 401 may check whether the plurality of applications is set to be continuously used among the plurality of applications displayed on the display device 403 through the multi-window in the unfolded state.

According to various embodiments, when the plurality of applications set to be continuously used is present (e.g., 'YES' in operation 1301), the electronic device (e.g., the processor 120 or 401) may check, in operation 1303, whether information related to the plurality of applications set to be continuously used may be displayed on the display device (e.g., the sub-display 252 in FIG. 2B) in the folded state. According to the embodiment, whether the information related to the plurality of applications set to be continuously used may be displayed on the display device in the folded state may be determined based on a size (e.g., a minimum size) for displaying information related to the application and/or a size of the display device (e.g., the sub-display 252 in FIG. 2B) in the folded state.

According to various embodiments, when the plurality of applications set to be continuously used may be displayed (e.g., 'YES' in operation 1303), the electronic device (e.g., the processor 120 or 401) may set up, in operation 1305, a screen constitution of the multi-window for displaying information related to the plurality of applications set to be continuously used. According to the embodiment, the processor 401 may set up the screen constitution of the multi-window in the folded state based on the type and/or the number of applications set to be continuously used. For example, the processor 401 may determine the number of times the display area is divided in the folded state based on the number of applications set to be continuously used. For example, when the number of applications set to be continuously used is two, the processor 401 may divide the display area in the folded state into two areas. For example, the screen constitution of the multi-window may include the number of areas for displaying the information related to the application, a size of the area, and/or an arrangement of the area.

According to various embodiments, when the plurality of applications set to be continuously used cannot be displayed (e.g., 'NO' in operation 1303), the electronic device (e.g., the processor 120 or 401) may set up, in operation 1307, screen constitutions of the multi-window and pop-up window for displaying information related to the plurality of applications set to be continuously used. According to the embodiment, the processor 401 may select at least one application to be displayed in the pop-up window among the plurality of applications set up to be continuously used. For example, at least one application to be displayed in the pop-up window may be selected based on a display order, an execution point in time, and a priority of the application, a size of the display area, and/or preset information of the application related to the pop-up window. According to the embodiment, the processor 401 may set up the screen constitution of the multi-window in the folded state based on the type and/or the number of one or more remaining applications except for at least one application to be displayed in the pop-up window among the applications set to be continuously used.

According to various embodiments, when one application set to be continuously used is present (e.g., 'NO' in operation 1301), the electronic device (e.g., the processor 120 or 401) may set up, in operation 1309, a screen constitution of a single window for displaying information related to the application set to be continuously used. According to the embodiment, the screen constitution of the single window may include the size and/or position of the area for displaying information related to the application.

Figure 14A:
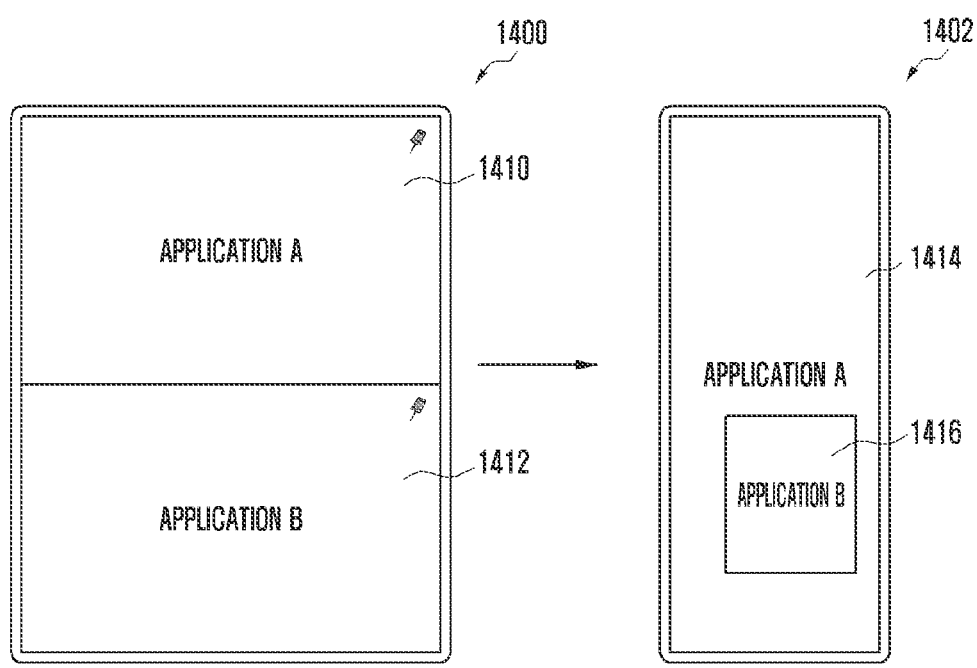
FIGS. 14A, 14B, 14C, 14D, and 14E are views illustrating screen constitutions indicating a multi-window in an unfolded state by using a pop-up window in a folded state according to various example embodiments.

According to various embodiments, as illustrated in FIG. 14A, the display device 403 (e.g., the display 230 in FIG. 2A) in the unfolded state 1400 may display the multi-window divided into two areas. According to the embodiment, the display device 403 (e.g., the display 230 in FIG. 2A) in the unfolded state 1400 may divide the display area into two areas based on an input related to the screen division and display information related to Application A and Application B in different divided areas.

According to the embodiment, as illustrated in FIG. 14A, when Application A 1410 and Application B 1412 displayed in the multi-window in the unfolded state 1400 are set to be continuously used, the display device 403 (e.g., the sub-display 252 in FIG. 2B) in the folded state 1402 may check whether the display device may divide the display area and display information related to Application A and Application B in different areas. For example, when it is determined that the information related to applications may be displayed, the display device 403 (e.g., the sub-display 252 in FIG. 2B) in the folded state 1402 may divide the display area into two areas and display information related to Application A and Application B in different areas.

According to the embodiment, if it is determined that the information related to the applications cannot be displayed, the display device 403 (e.g., the sub-display 252 in FIG. 2B) in the folded state 1402 may select at least one application to be displayed through the pop-up window. For example, when the Application B is selected to be displayed through the pop-up window, the display device 403 (e.g., the sub-display 252 in FIG. 2B) in the folded state 1402 may display information 1414 related to Application A in the display area and display information 1416 related to Application B through the pop-up window, as illustrated in FIG. 14A. For example, the pop-up window may be displayed in at least a partial area of the display area while at least partially overlapping the information 1414 related to Application A.

Figure 14B:
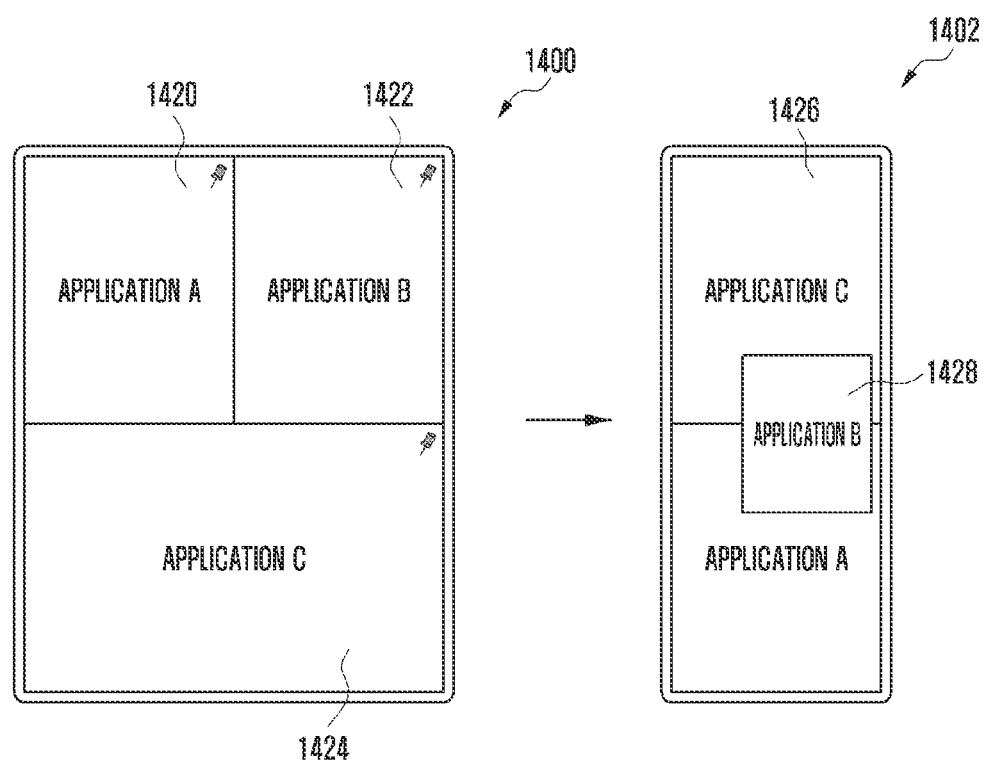
Figure 14C:
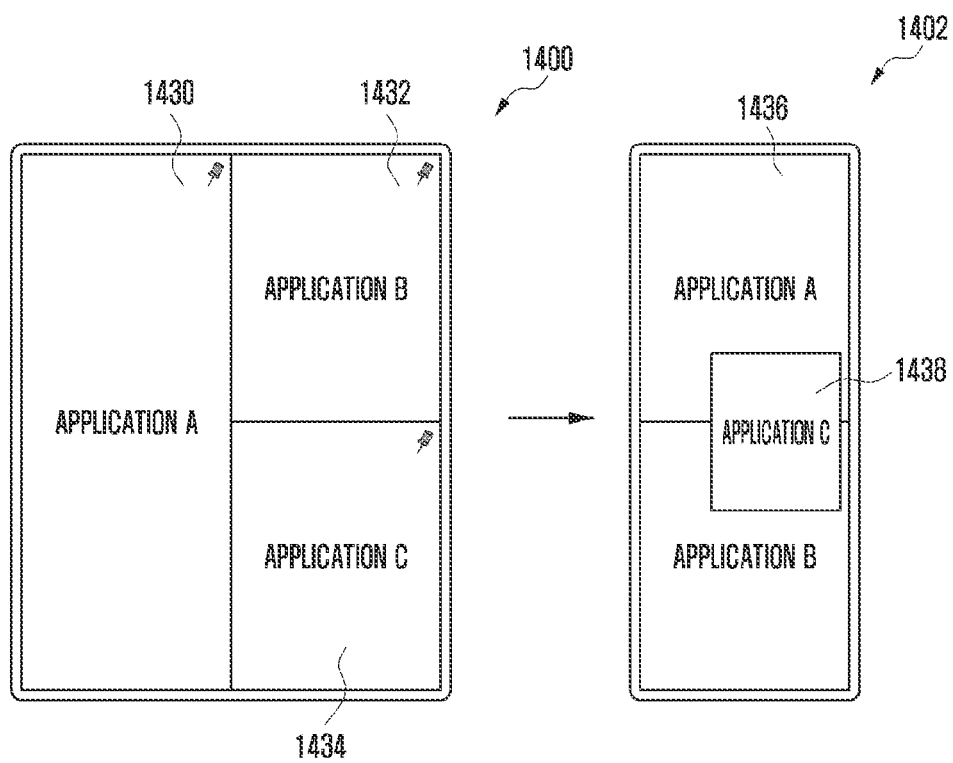

According to various embodiments, as illustrated in FIG. 14B or 14C, the display device 403 (e.g., the display 230 in FIG. 2A) in the unfolded state 1400 may display the multi-window divided into three areas. According to the embodiment, the display device 403 (e.g., the display 230 in FIG. 2A) in the unfolded state 1400 may divide the display area into three areas based on an input related to the screen division and display information related to Application A, Application B, and Application C in different divided areas.

According to the embodiment, as illustrated in FIG. 14B or 14C, when Application A 1420 or 1430, Application B 1422 or 1432, and Application C 1424 or 1434 displayed in the multi-window in the unfolded state 1400 are set to be continuously used, the display device 403 (e.g., the sub-display 252 in FIG. 2B) in the folded state 1402 may check whether the display device may divide the display area and display information related to Application A, Application B, and Application C in different areas. For example, when it is determined that the information related to applications may be displayed, the display device 403 (e.g., the sub-display 252 in FIG. 2B) in the folded state 1402 may divide the display area into three areas and display information related to Application A, Application B, and Application C in different areas.

According to the embodiment, when it is determined that the information related to the applications cannot be displayed, the display device 403 (e.g., the sub-display 252 in FIG. 2B) in the folded state 1402 may select at least one application to be displayed through the pop-up window. For example, when the Application B is selected to be displayed in the pop-up window based on the display order of the application, the display device 403 (e.g., the sub-display 252 in FIG. 2B) in the folded state 1402 may divide the display area into two areas, display information 1426 related to Application A and Application C in different areas, and display information 1428 related to Application B through the pop-up window, as illustrated in FIG. 14B. For example, when the Application C is selected to be displayed in the pop-up window based on the display order of the application, the display device 403 (e.g., the sub-display 252 in FIG. 2B) in the folded state 1402 may divide the display area into two areas, display information 1436 related to Application A and Application B in different areas, and display information 1438 related to Application C through the pop-up window, as illustrated in FIG. 14C.

Figure 14D:
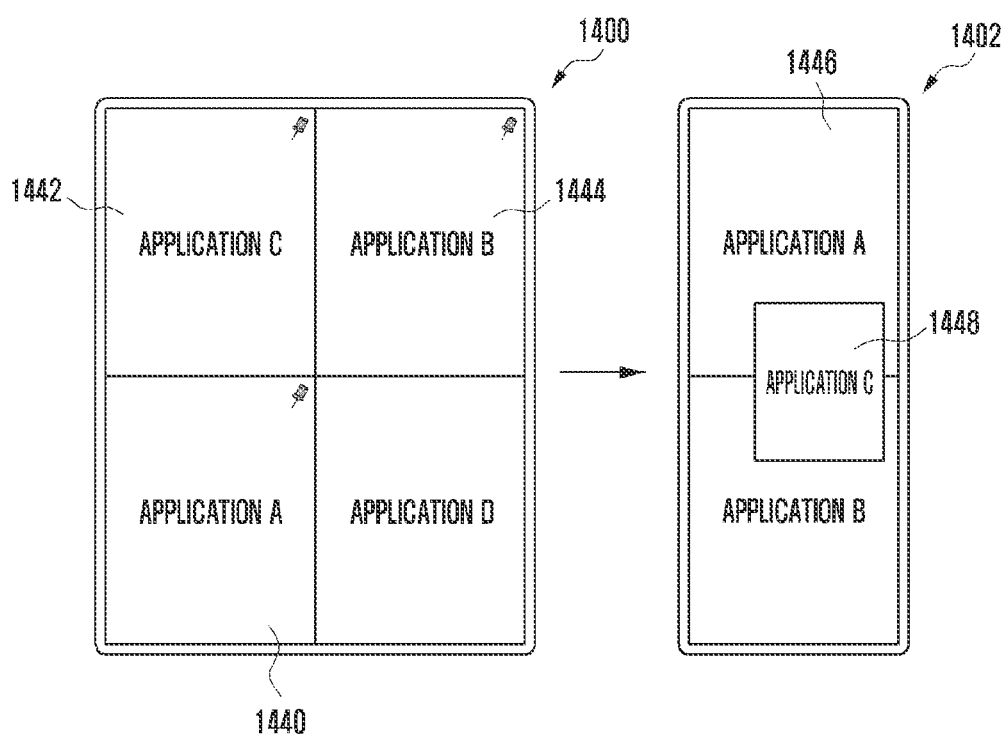
Figure 14E:
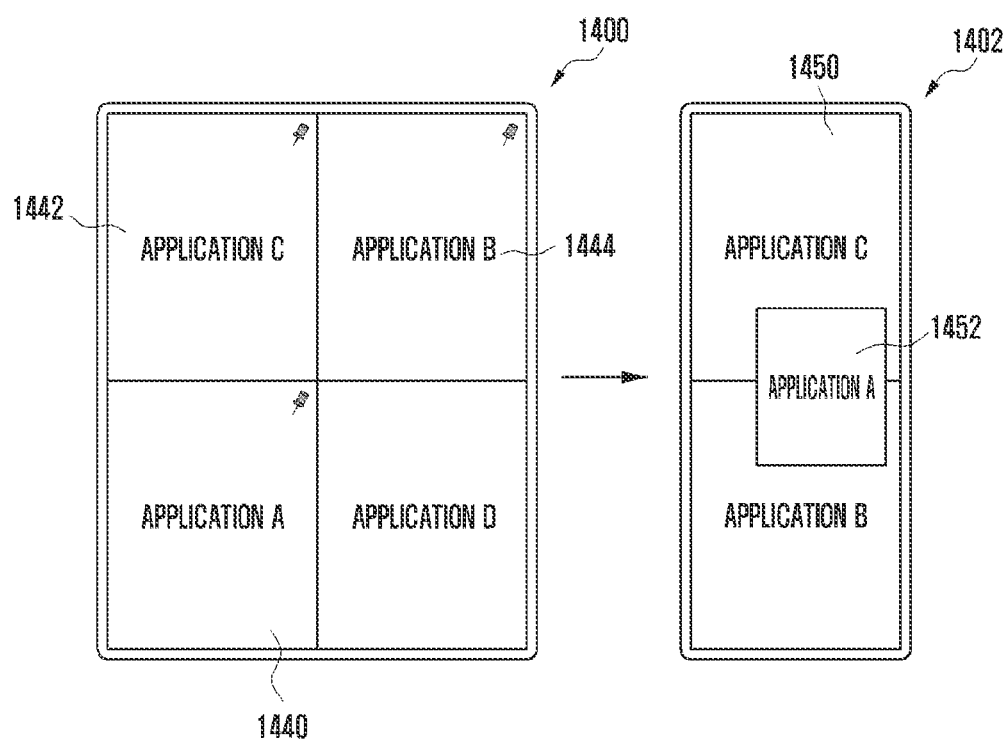

According to various embodiments, as illustrated in FIG. 14D or 14E, the display device 403 (e.g., the display 230 in FIG. 2A) in the unfolded state 1400 may display the multi-window divided into four areas. According to the embodiment, the display device 403 (e.g., the display 230 in FIG. 2A) in the unfolded state 1400 may divide the display area into four areas based on an input related to the screen division and display information related to Application A, Application B, Application C, and Application D in different divided areas.

According to the embodiment, as illustrated in FIG. 14D or 14E, when Application A 1440, Application B 1444, and Application C 1442 displayed in the multi-window in the unfolded state 1400 are set to be continuously used, the display device 403 (e.g., the sub-display 252 in FIG. 2B) in the folded state 1402 may check whether the display device may divide the display area and display information related to Application A, Application B, and Application C in different areas. For example, when it is determined that the information related to applications may be displayed, the display device 403 (e.g., the sub-display 252 in FIG. 2B) in the folded state 1402 may divide the display area into three areas and display information related to Application A, Application B, and Application C in different areas.

According to the embodiment, when it is determined that the information related to the applications cannot be displayed, the display device 403 (e.g., the sub-display 252 in FIG. 2B) in the folded state 1402 may select at least one application to be displayed through the pop-up window. For example, when the Application C is selected to be displayed in the pop-up window based on the priority of the application, the display device 403 (e.g., the sub-display 252 in FIG. 2B) in the folded state 1402 may divide the display area into two areas, display information 1446 related to Application A and Application B in different areas, and display information 1448 related to Application C through the pop-up window, as illustrated in FIG. 14D. For example, when the Application A is selected to be displayed in the pop-up window based on setting information of the application related to the pop-up window, the display device 403 (e.g., the sub-display 252 in FIG. 2B) in the folded state 1402 may divide the display area into two areas, display information 1450 related to Application C and Application B in different areas, and display information 1452 related to Application A through the pop-up window, as illustrated in FIG. 14E.

According to various embodiments, as illustrated in FIG. 15A, 15B, 15C, 15D, or 15E, the display device 403 (e.g., the display 230 in FIG. 2A) in the unfolded state 1500 may display the multi-window divided into five areas. According to the embodiment, the display device 403 (e.g., the display 230 in FIG. 2A) in the unfolded state 1500 may divide the display area into five areas based on an input related to the screen division and display information related to Application A, Application B, Application C, Application D, and Application E in different divided areas.

Figure 15A:
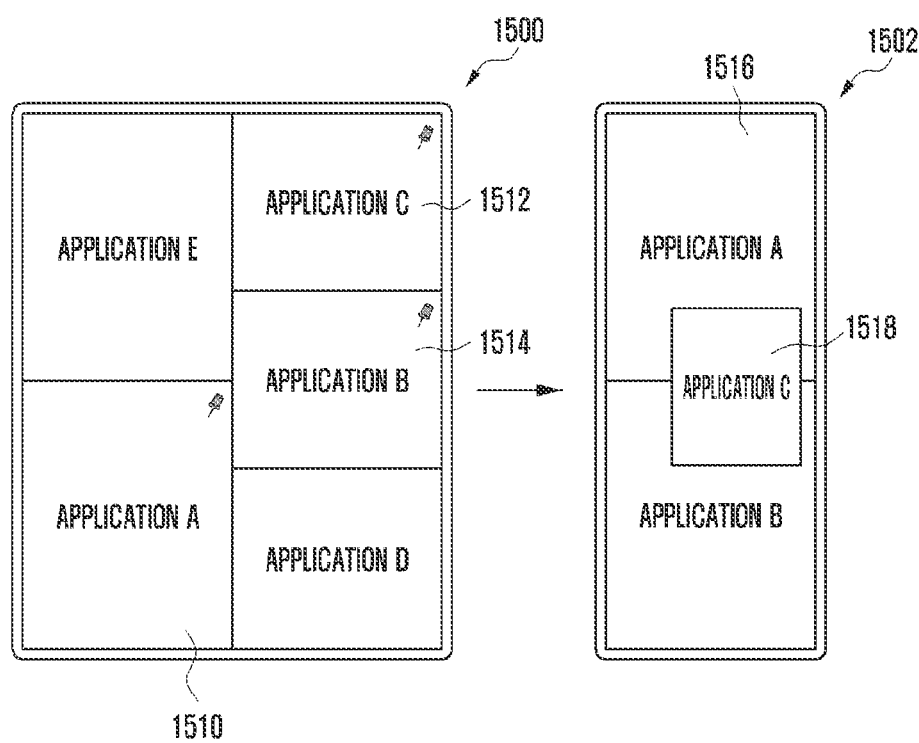
FIGS. 15A, 15B, 15C, 15D, and 15E are views illustrating screen constitutions for indicating a multi-window divided into five areas in an unfolded state by using a pop-up window in a folded state according to various example embodiments.
Figure 15B:
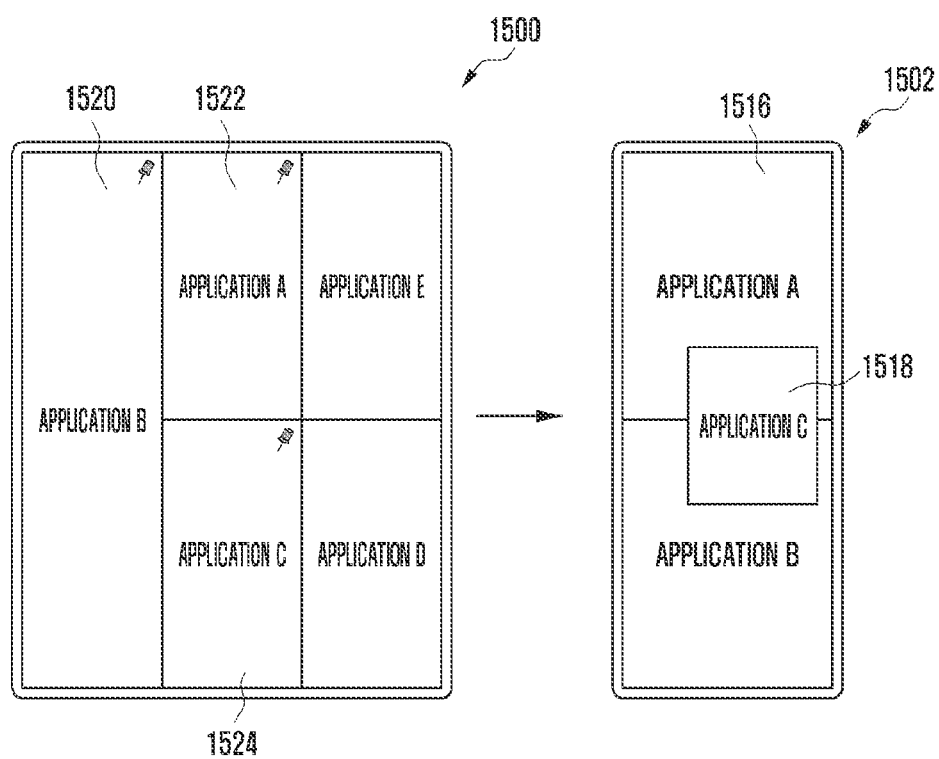
Figure 15C:
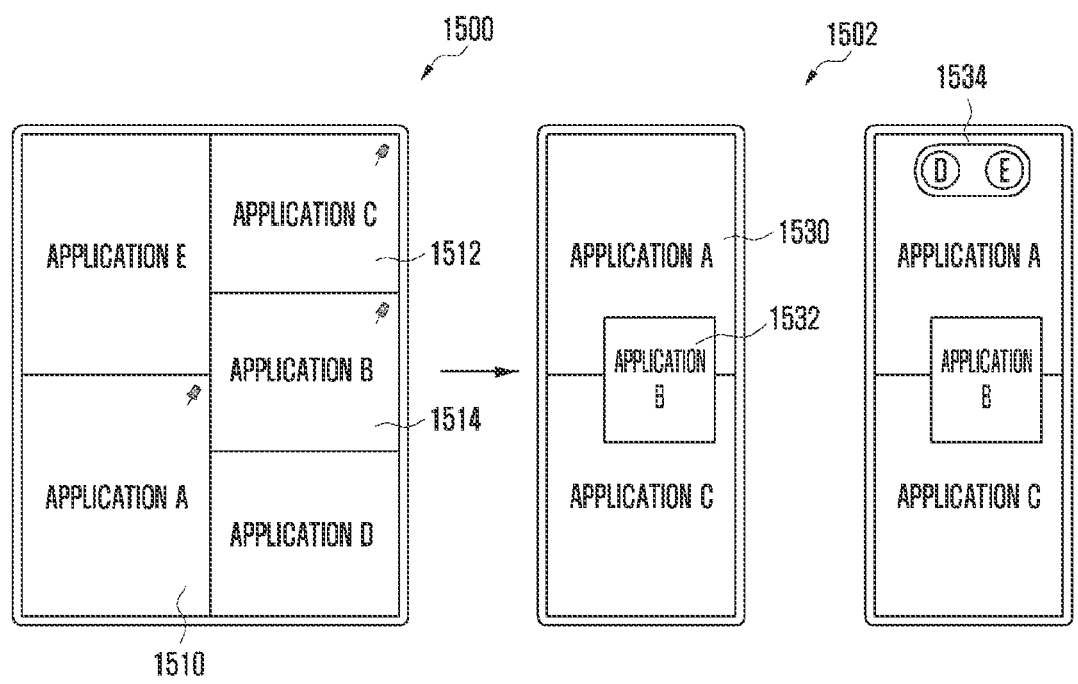

According to the embodiment, as illustrated in FIG. 15A, 15B, or 15C, when Application A 1510 or 1522, Application B 1514 or 1520, and Application C 1512 or 1524 displayed in the multi-window in the unfolded state 1400 are set to be continuously used, the display device 403 (e.g., the sub-display 252 in FIG. 2B) in the folded state 1502 may check whether the display device may divide the display area and display information related to Application A, Application B, and Application C in different areas. For example, when it is determined that the information related to applications may be displayed, the display device 403 (e.g., the sub-display 252 in FIG. 2B) in the folded state 1502 may divide the display area into three areas and display information related to Application A, Application B, and Application C in different areas.

According to the embodiment, when it is determined that the information related to the applications cannot be displayed, the display device 403 (e.g., the sub-display 252 in FIG. 2B) in the folded state 1502 may select at least one application to be displayed through the pop-up window. For example, when the Application C is selected to be displayed in the pop-up window, the display device 403 (e.g., the sub-display 252 in FIG. 2B) in the folded state 1502 may divide the display area into two areas, display information 1516 related to Application A and Application B in different areas, and display information 1518 related to Application C through the pop-up window, as illustrated in FIG. 15A or 15B. For example, when the Application B is selected to be displayed in the pop-up window, the display device 403 (e.g., the sub-display 252 in FIG. 2B) in the folded state 1502 may divide the display area into two areas, display information 1530 related to Application A and Application C in different areas, and display information 1532 related to Application B through the pop-up window, as illustrated in FIG. 15C. For example, the display device 403 in the folded state 1502 may display, in at least a partial area, an object 1534 indicating that Applications D and E, which have been displayed in the multi-window in the unfolded state 1500, are not displayed in the folded state.

Figure 15D:
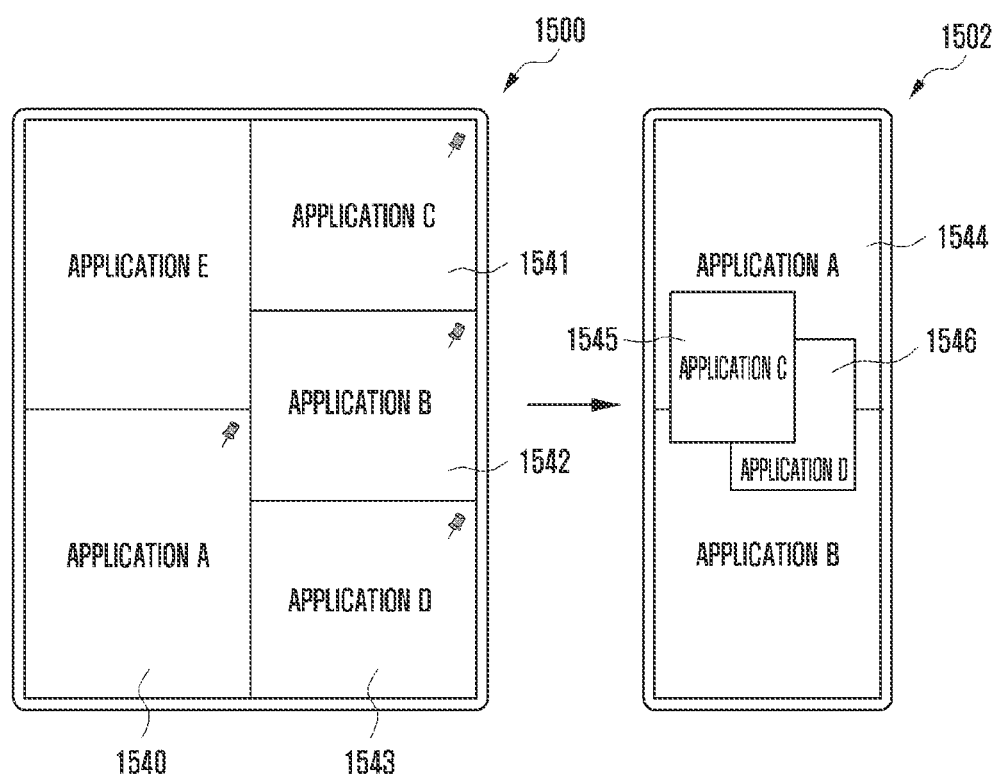
Figure 15E:
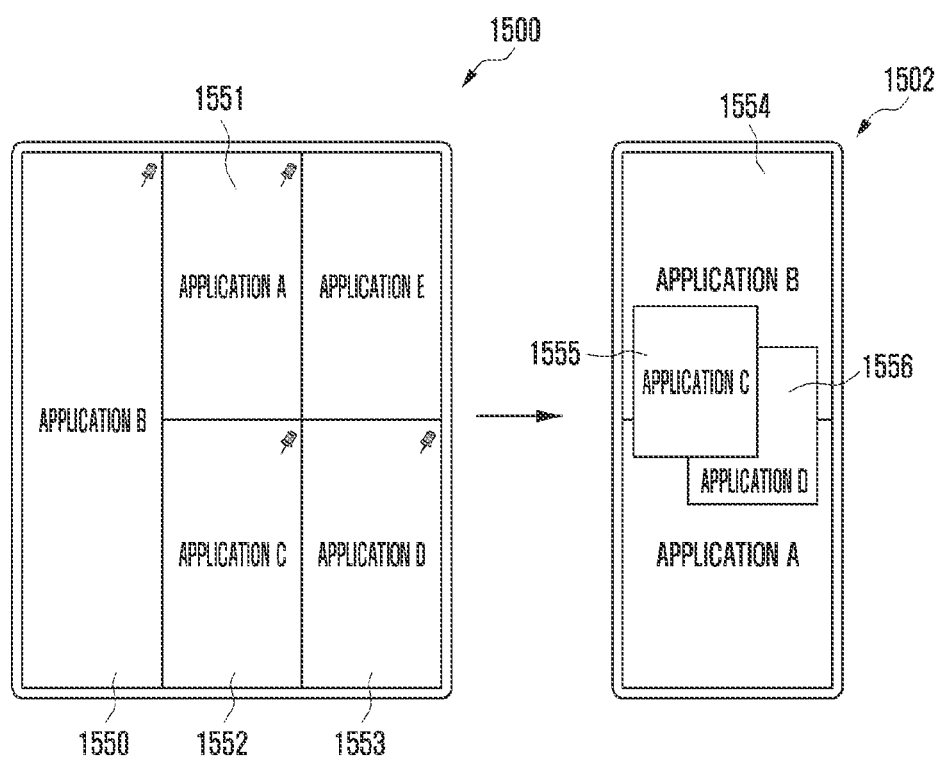

According to the embodiment, as illustrated in FIG. 15D or 15E, when Application A 1540 or 1552, Application B 1542 or 1550, Application C 1541 or 1552, and Application D 1543 or 1553 displayed in the multi-window in the unfolded state 1400 are set to be continuously used, the display device 403 (e.g., the sub-display 252 in FIG. 2B) in the folded state 1502 may check whether the display device may divide the display area and display information related to the applications in different areas. For example, when it is determined that the information related to applications may be displayed, the display device 403 (e.g., the sub-display 252 in FIG. 2B) in the folded state 1502 may divide the display area into fourth areas and display information related to Application A, Application B, Application C, and Application D in different areas.

According to the embodiment, when it is determined that the information related to the applications cannot be displayed, the display device 403 (e.g., the sub-display 252 in FIG. 2B) in the folded state 1502 may select at least one application to be displayed through the pop-up window. For example, when Application C and Application D are selected to be displayed in the pop-up window, the display device 403 (e.g., the sub-display 252 in FIG. 2B) in the folded state 1502 may divide the display area into two areas, display information 1544 or 1554 related to Application A and Application B in different areas, display information 1545 or 1555 related to Application C through a first pop-up window, and display information 1546 or 1556 related to Application D through a second pop-up window, as illustrated in FIG. 15D or 15E. For example, as illustrated in FIG. 15D, based on the display order of the applications, the display device 403 (e.g., the sub-display 252 in FIG. 2B) in the folded state 1502 may display information related to Application A in the first area (e.g., the upper end area) and display information related to Application B in the second area (e.g., the lower end area). For example, as illustrated in FIG. 15E, based on the display order of the applications, the display device 403 (e.g., the sub-display 252 in FIG. 2B) in the folded state 1502 may display information related to Application B in the first area (e.g., the upper end area) and display information related to Application A in the second area (e.g., the lower end area).

Figure 16:
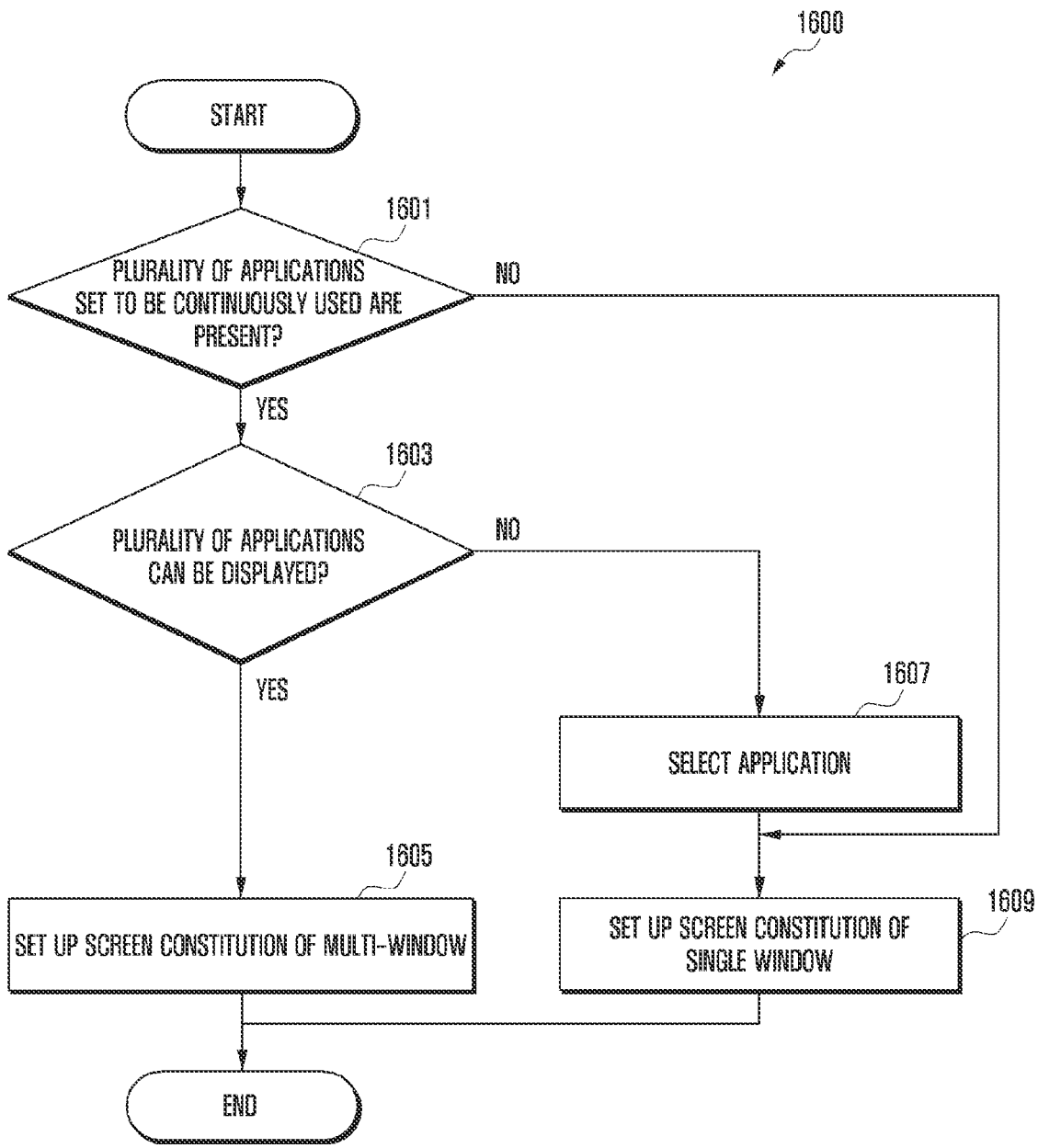
FIG. 16 is a flowchart for selectively displaying a multi-window in a folded state of the electronic device according to various example embodiments.
Figure 17A:
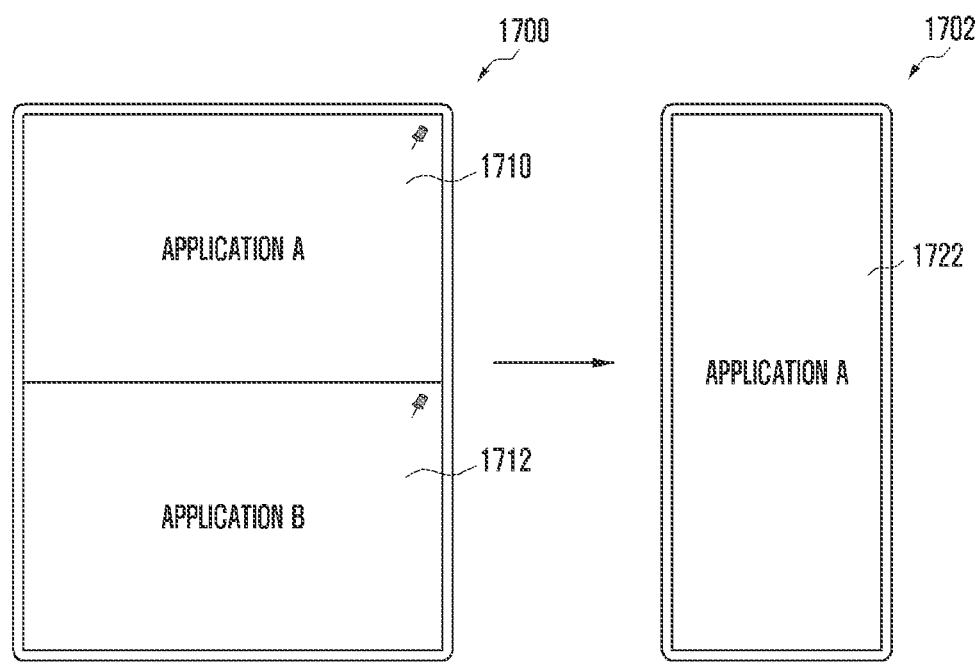
FIGS. 17A, 17B, and 17C are views illustrating screen constitutions in a folded state based on a priority according to various example embodiments.
Figure 17B:
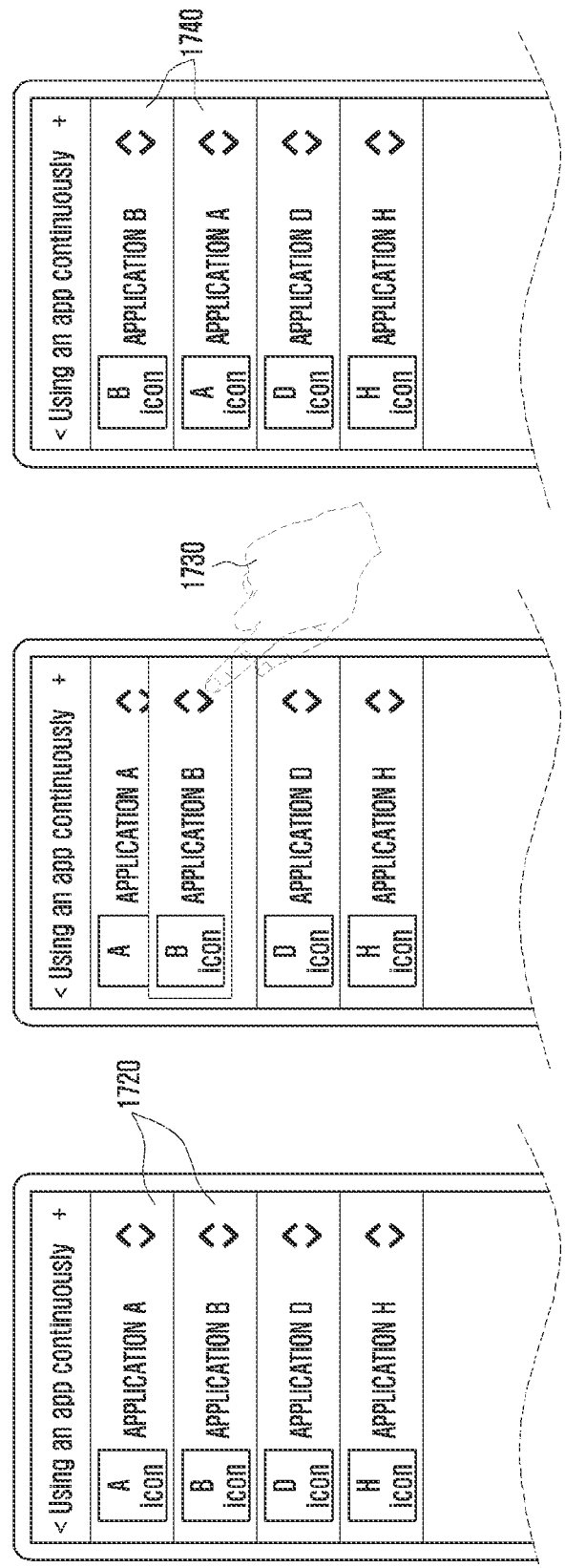
Figure 17C:
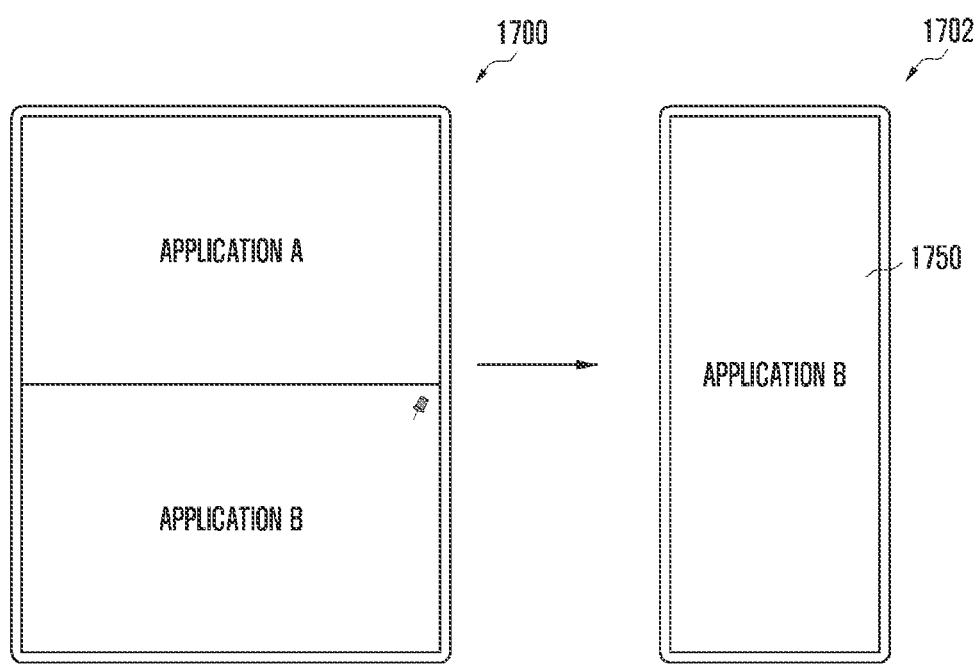

FIG. 16 is a flowchart for selectively displaying a multi-window in a folded state of the electronic device according to various embodiments. According to the embodiment, the operations illustrated in FIG. 16 may be one embodiment of operation 707 in FIG. 7. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 16 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 16 will be described with reference to FIGS. 17A to 17C. FIGS. 17A, 17B, and 17C are views illustrating screen constitutions in a folded state based on a priority according to various embodiments.

Referring to FIG. 16, according to various embodiments, in operation 1601, the electronic device (e.g., the processor 120 in FIG. 1 or the processor 401 in FIG. 4) may check whether the plurality of applications set to be continuously used is present. According to the embodiment, as illustrated in FIG. 17A, the display device 403 (e.g., the display 230 in FIG. 2A) in the unfolded state 1700 may display the multi-window divided into two areas. For example, the display device 403 (e.g., the display 230 in FIG. 2A) in the unfolded state 1700 may divide the display area into two areas based on an input related to the screen division and display information related to Application A and Application B in different divided areas. For example, Application A 1700 and Application B 1712 included in the multi-window may be set to be continuously used.

According to various embodiments, when the plurality of applications set to be continuously used is present (e.g., 'YES' in operation 1601), the electronic device (e.g., the processor 120 or 401) may check, in operation 1603, whether information related to the plurality of applications set to be continuously used may be displayed on the display device (e.g., the sub-display 252 in FIG. 2B) in the folded state. According to the embodiment, the processor 401 may determine whether information related to Application A 1700 and Application B 1712 set to be continuously used may be displayed on the display device in the folded state based on the size display device (e.g., the sub-display 252 in FIG. 2B) in the folded state.

According to various embodiments, when the plurality of applications set to be continuously used may be displayed (e.g., 'YES' in operation 1603), the electronic device (e.g., the processor 120 or 401) may set up, in operation 1605, a screen constitution of the multi-window for displaying information related to the plurality of applications set to be continuously used. According to the embodiment, the screen constitution of the multi-window may be set based on the type and/or the number of applications. For example, the screen constitution of the multi-window may include the number of areas for displaying the information related to the application, a size of the area, and/or an arrangement of the area.

According to various embodiments, when the plurality of applications set to be continuously used cannot be displayed (e.g., 'NO' in operation 1603), the electronic device (e.g., the processor 120 or 401) may select, in operation 1607, at least one application to be displayed on the display device (e.g., the sub-display 252 in FIG. 2B) in the folded state among the plurality of applications set to be continuously used. For example, the application to be displayed on the display device in the folded state may be selected based on a display order, an execution point in time, and a priority of the at least one application set to be continuously used, a size of the display area, and/or preset information of the application related to the pop-up window. According to the embodiment, as illustrated in FIG. 17B, when Application A includes relatively higher priority than Application B in an application list 1720 set up to be continuously used, the processor 401 may determine that Application A is to be displayed on the display device (e.g., the sub-display 252 in FIG. 2B) in the folded state.

According to various embodiments, when at least one application to be displayed on the display device (e.g., the sub-display 252 in FIG. 2B) in the folded state is selected (e.g., operation 1607) or when one application set to be continuously used is present (e.g., 'NO' in operation 1601), the electronic device (e.g., the processor 120 or 401) may set up, in operation 1609, a screen constitution of a single window for displaying information related to the application set to be continuously used. According to the embodiment, as illustrated in FIG. 17A, the processor 401 may set up a screen constitution for displaying information 1722 related to Application A on the display device (e.g., the sub-display 252 in FIG. 2B) in the folded state. For example, the screen constitution may include the size and/or position of the area for displaying information related to the application.

According to various embodiments, when the priority of the application is changed in the application list 1720 of the applications set to be continuously used, the electronic device 400 may change an application to be displayed on the display device (e.g., the sub-display 252 in FIG. 2B) in the folded state. According to the embodiment, as illustrated in FIG. 17B, the processor 401 may change the priority so that Application B has a relatively higher priority than Application A based on an input 1720 related to a change in priority in the application list 1720 displayed on the display device 403 (1740). In this case, the processor 401 may be determined as serving to display Application B on the display device (e.g., the sub-display 252 in FIG. 2B) in the folded state. As illustrated in FIG. 17C, the processor 401 may set up a screen constitution for displaying information 1750 related to Application B on the display device (e.g., the sub-display 252 in FIG. 2B) in the folded state.

Figure 18:
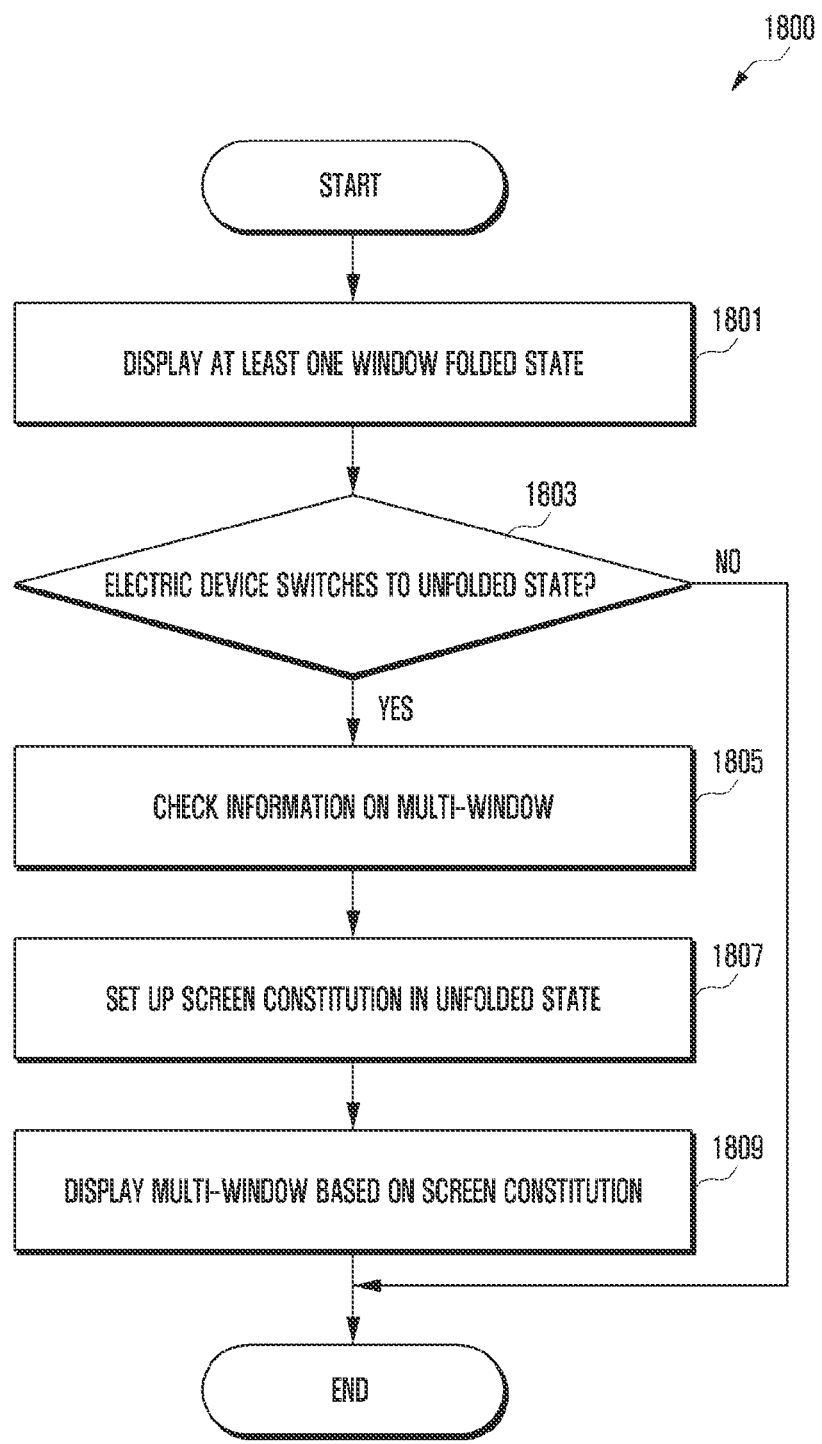
FIG. 18 is a flowchart for setting up a screen constitution in an unfolded state of the electronic device according to various example embodiments.

FIG. 18 is a flowchart for setting up a screen constitution in an unfolded state of the electronic device according to various embodiments. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 18 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 18 will be described with reference to FIGS. 19A to 19F. FIGS. 19A, 19B, 19C, 19D, 19E, and 19F are views illustrating screen constitutions for indicating, in an unfolded state, a window in a folded state according to various embodiments.

Referring to FIG. 18, according to various embodiments, in operation 1801, the electronic device (e.g., the processor 120 in FIG. 1, the display device 160, the processor 401 in FIG. 4, or the display device 403) may display at least one multi-window in the folded state of the electronic device. According to the embodiment, referring to FIG. 19A or 19B, the display device 403 (e.g., the sub-display 252 in FIG. 2B) in the folded state 1900 may display information 1910 related to Application A through a single window. According to the embodiment, referring to FIG. 19C or 19D, the display device 403 (e.g., the sub-display 252 in FIG. 2B) in the folded state 1900 may display information 1930 related to Application A and Application B in different areas through the multi-window. According to the embodiment, referring to FIG. 19E or 19F, the display device 403 (e.g., the sub-display 252 in FIG. 2B) in the folded state 1900 may display information 1950 related to Application A and Application B in different areas through the multi-window and display information 1952 related to Application C through the pop-up window.

According to various embodiments, in operation 1803, the electronic device (e.g., the processor 120 or 401 or the sensor module 176 or 403) may check whether the structure of the electronic device (e.g., the electronic device 400) switches to the unfolded state. According to the embodiment, the processor 401 may check whether the electronic device 400 switches to the unfolded state based on motion information of one surface (e.g., the third surface 221) of the first housing structure (e.g., the first housing structure 210 in FIG. 2A) and the second housing structure (e.g., the second housing structure 220 in FIG. 2A) provided through the sensor module 405. For example, the unfolded state may include a state in which the angle between one surface (e.g., the first surface 211) of the first housing structure (e.g., the first housing structure 210 in FIG. 2A) and one surface (e.g., the third surface 221) of the second housing structure (e.g., the second housing structure 220 in FIG. 2A) is a predetermined second angle or more. According to the embodiment, when the structure of the electronic device (e.g., the electronic device 400) is maintained in the folded state (e.g., 'NO' in operation 1803), the electronic device (e.g., the processor 120 or 401) may end the operation.

According to various embodiments, when the structure of the electronic device (e.g., the electronic device 400) switches to the unfolded state (e.g., 'YES' in operation 1803), the electronic device (e.g., the processor 120 or 401) may check, in operation 1805, information on the multi-window related to the display device (e.g., the display 230 in FIG. 2A) in the unfolded state. According to the embodiment, the information on the multi-window related to the display device (e.g., the display 230 in FIG. 2A) in the unfolded state is history information of the screen constitution related to the unfolded state stored in the memory 407 and may include information on at least one application included in the multi-window last stored in the memory 407. According to the embodiment, the information on the multi-window related to the display device (e.g., the display 230 in FIG. 2A) in the unfolded state is a use history of the application stored in the memory 407 and may include information on at least one application to be added to the multi-window displayed on the display device in the unfolded state.

According to various embodiments, in operation 1807, the electronic device (e.g., the processor 120 or 401) may set up the screen constitution of the multi-window to be displayed on the display device (e.g., the display 230 in FIG. 2A) in the unfolded state. According to the embodiment, the processor 401 may set up the screen constitution of the multi-window in the unfolded state based on the type and/or the number of applications included in the multi-window. For example, the screen constitution of the multi-window may include the number of areas for displaying the information related to the application, a size of the area, and/or an arrangement of the area.

Figure 19A:
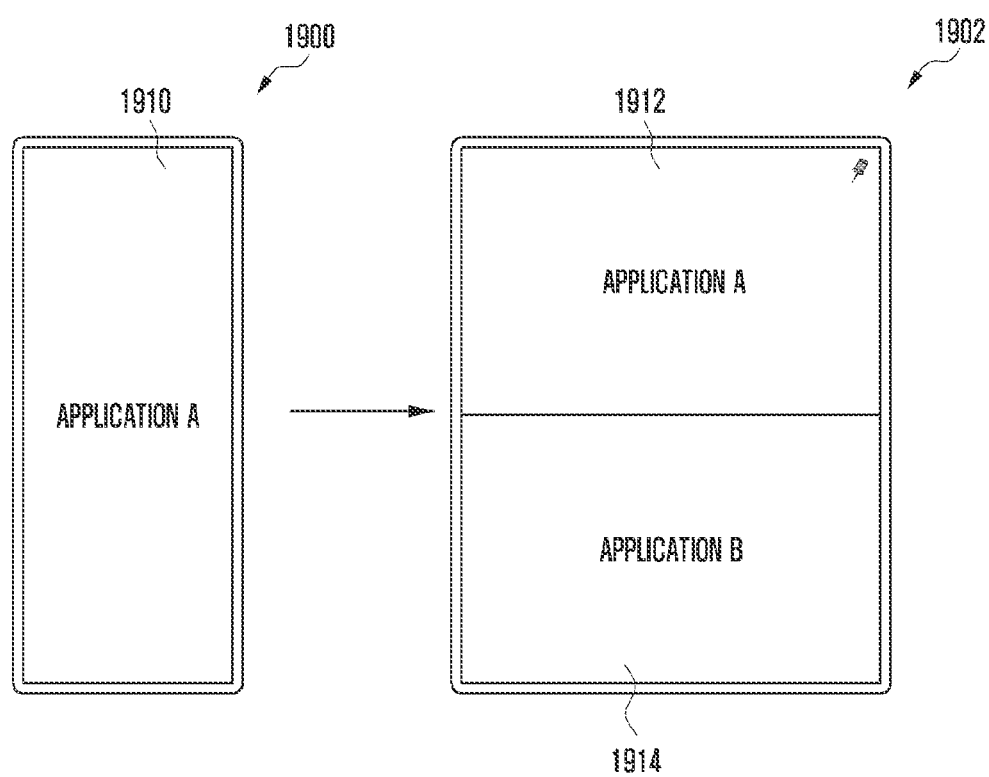
FIGS. 19A, 19B, 19C, 19D, 19E, and 19F are views illustrating screen constitutions for indicating, in an unfolded state, a window in a folded state according to various example embodiments.

According to various embodiments, in operation 1809, the electronic device (e.g., the processor 120 or 401) may display information related to at least one application based on the screen constitution of the multi-window in the unfolded state. According to the embodiment, as illustrated in FIG. 19A, the display device 403 (e.g., the display 230 in FIG. 2A) in the unfolded state 1902 may display information 1912 related to Application A, which has been displayed in the folded state, in different areas divided based on the screen constitution and display information 1914 related to Application B newly selected. For example, the information 1912 related to Application A may include a visual effect (e.g., an object) indicating that Application A is set to be continuously used. For example, the visual effect for indicating the setting of the continuous use may be selectively displayed based on the user's setting.

Figure 19B:
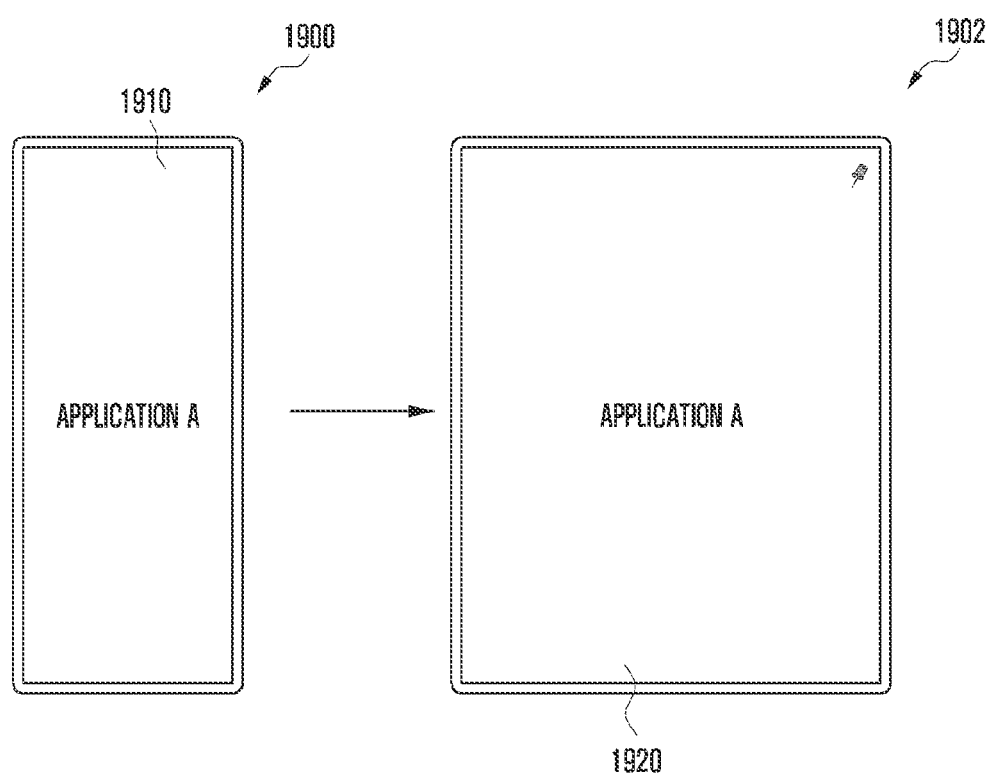

According to the embodiment, as illustrated in FIG. 19B, when it is determined that the multi-window is not supported in the unfolded state 1902, the display device 403 (e.g., the display 230 in FIG. 2A) in the unfolded state 1902 may display information 1920 related to Application A that has been displayed in the folded state.

Figure 19C:
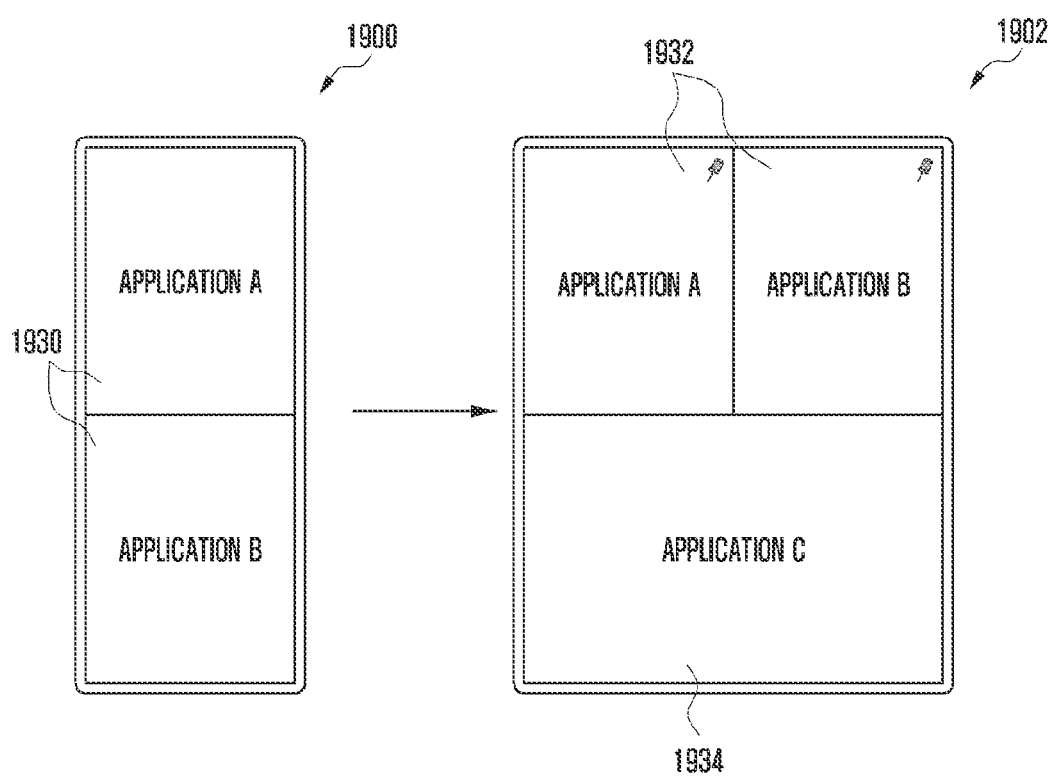

According to the embodiment, as illustrated in FIG. 19C, the display device 403 (e.g., the display 230 in FIG. 2A) in the unfolded state 1902 may display information 1932 related to Applications A and B, which have been displayed in the folded state, in different areas divided based on the screen constitution and display information 1934 related to Application C newly selected. For example, information 1932 related to Application A and Application B may include a visual effect (e.g., an object) indicating that Application A and Application B are set to be continuously used. For example, Application C may include an application selected to be additionally displayed on the display device in the unfolded state.

Figure 19D:
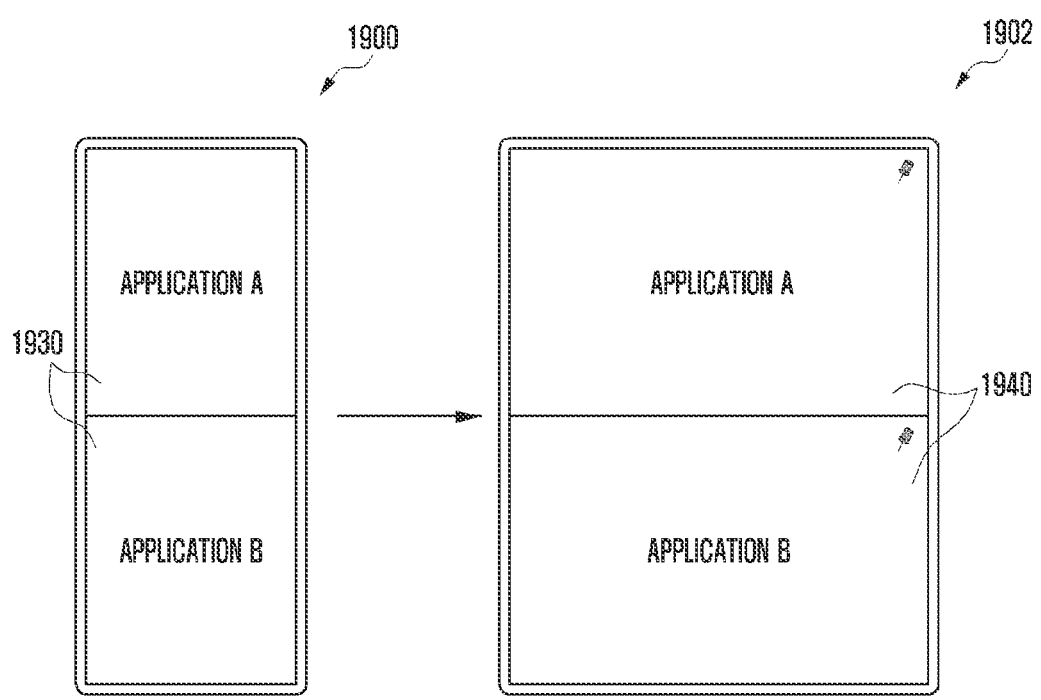

According to the embodiment, as illustrated in FIG. 19D, the display device 403 (e.g., the display 230 in FIG. 2A) in the unfolded state 1902 may display information 1940 related to Application A and Application B, which have been displayed in the folded state, in different areas divided based on the screen constitution.

Figure 19E:
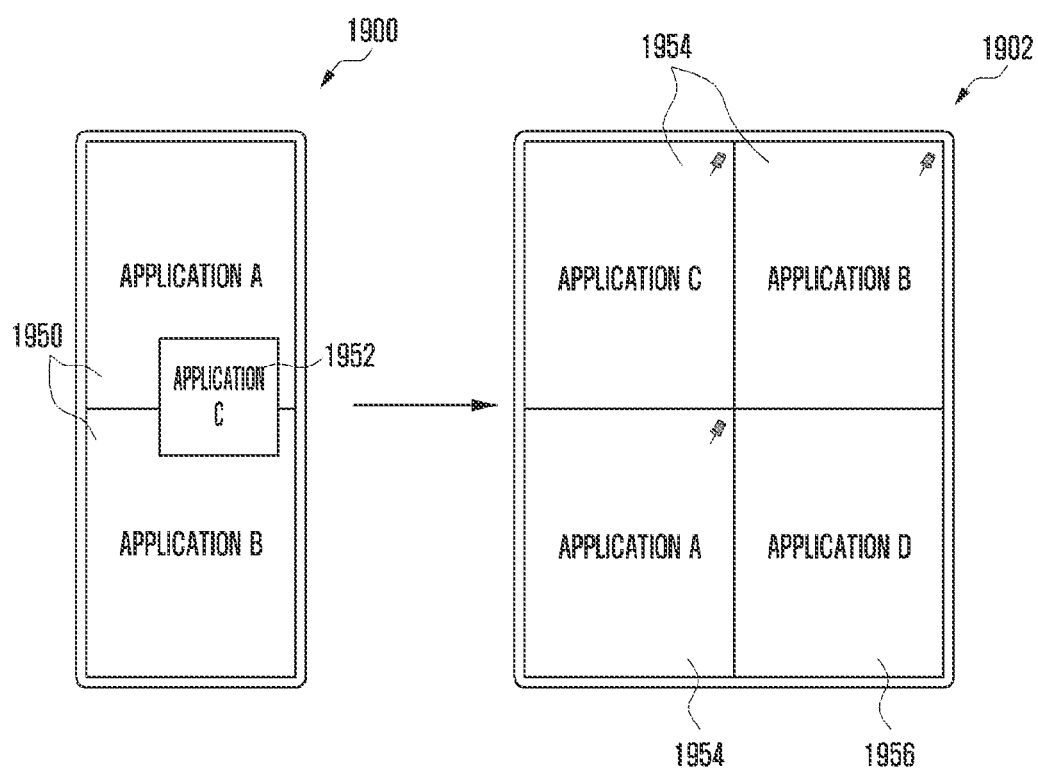

According to the embodiment, as illustrated in FIG. 19E, the display device 403 (e.g., the display 230 in FIG. 2A) in the unfolded state 1902 may display information 1954 related to Applications A, B, and C, which have been displayed in the folded state, in different areas divided based on the screen constitution and display information 1956 related to Application D newly selected. For example, the information 1954 related to Application A, Application B, and Application C may include a visual effect (e.g., an object) indicating that Application A, Application B, and Application C are set to be continuously used. For example, Application D may include an application selected to be additionally displayed on the display device in the unfolded state.

Figure 19F:
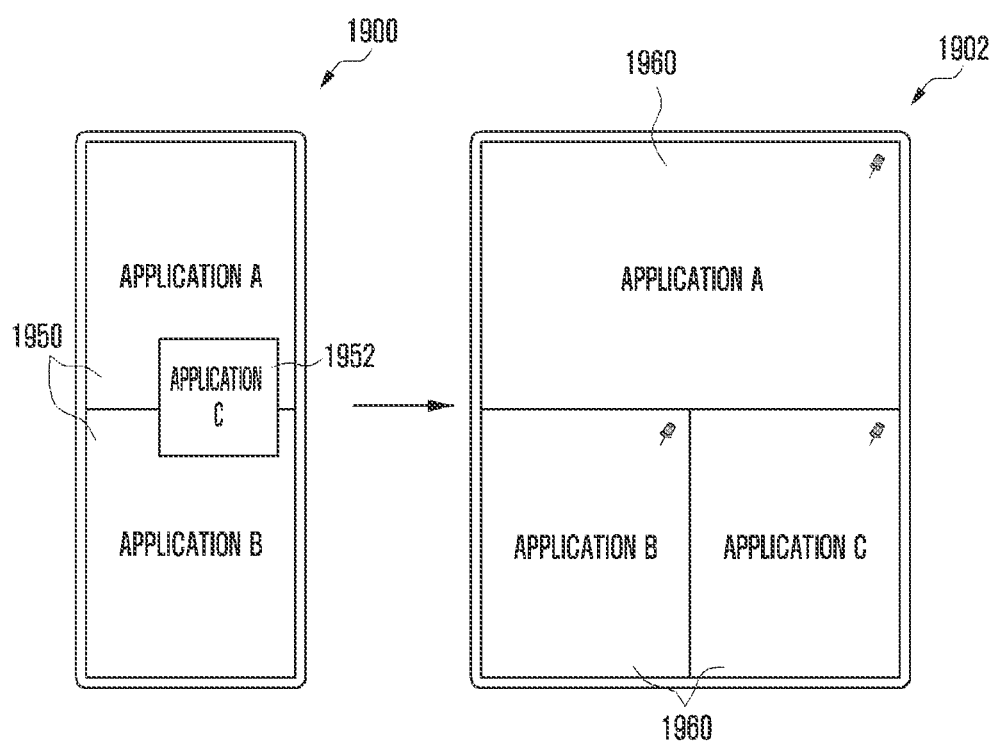

According to the embodiment, as illustrated in FIG. 19F, the display device 403 (e.g., the display 230 in FIG. 2A) in the unfolded state 1902 may display information 1960 related to Applications A, B, and C, which have been displayed in the folded state, in different areas divided based on the screen constitution.

Figure 20:
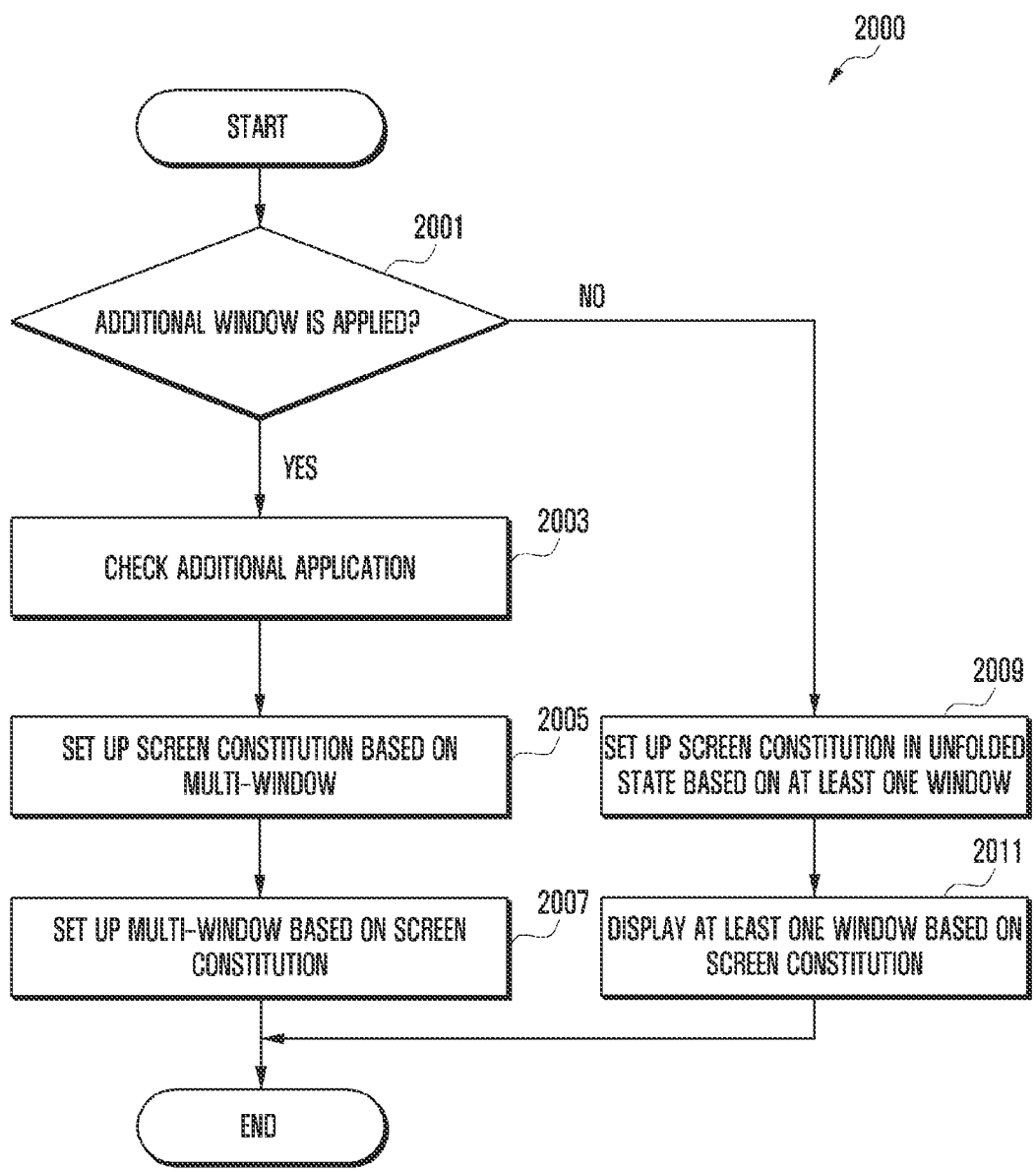
FIG. 20 is a flowchart for setting up a screen constitution of a multi-window in an unfolded state of the electronic device according to various example embodiments.
Figure 21A:
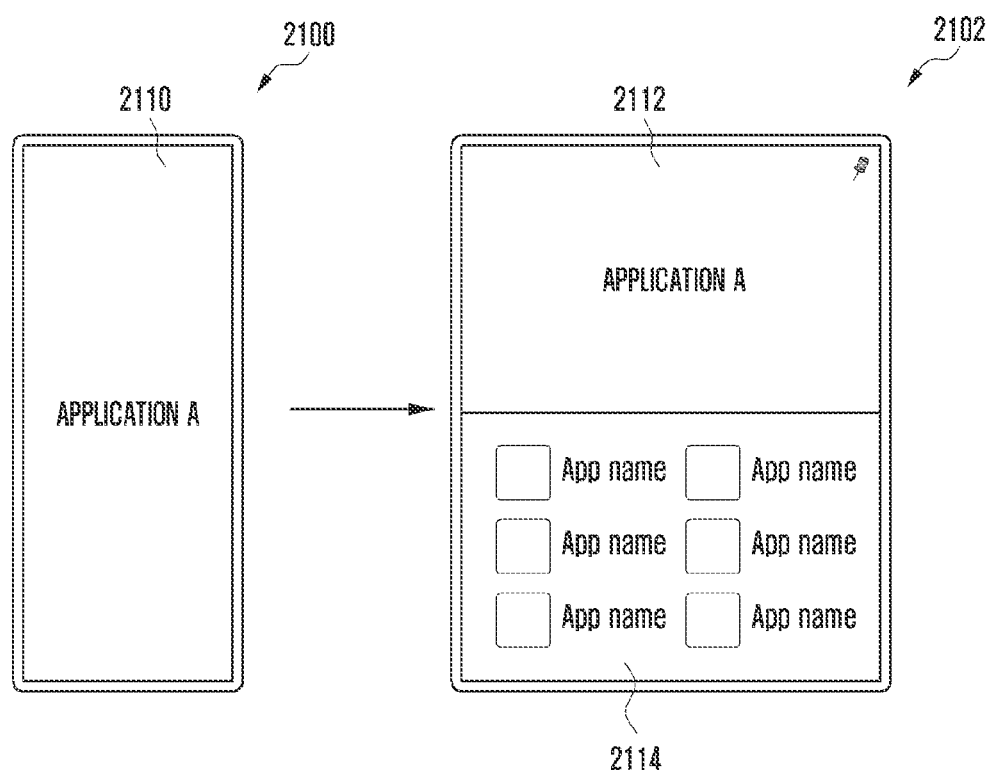
FIGS. 21A, 21B, and 21C are views illustrating screen constitutions for selecting an application to be additionally displayed in an unfolded state according to various example embodiments.
Figure 21B:
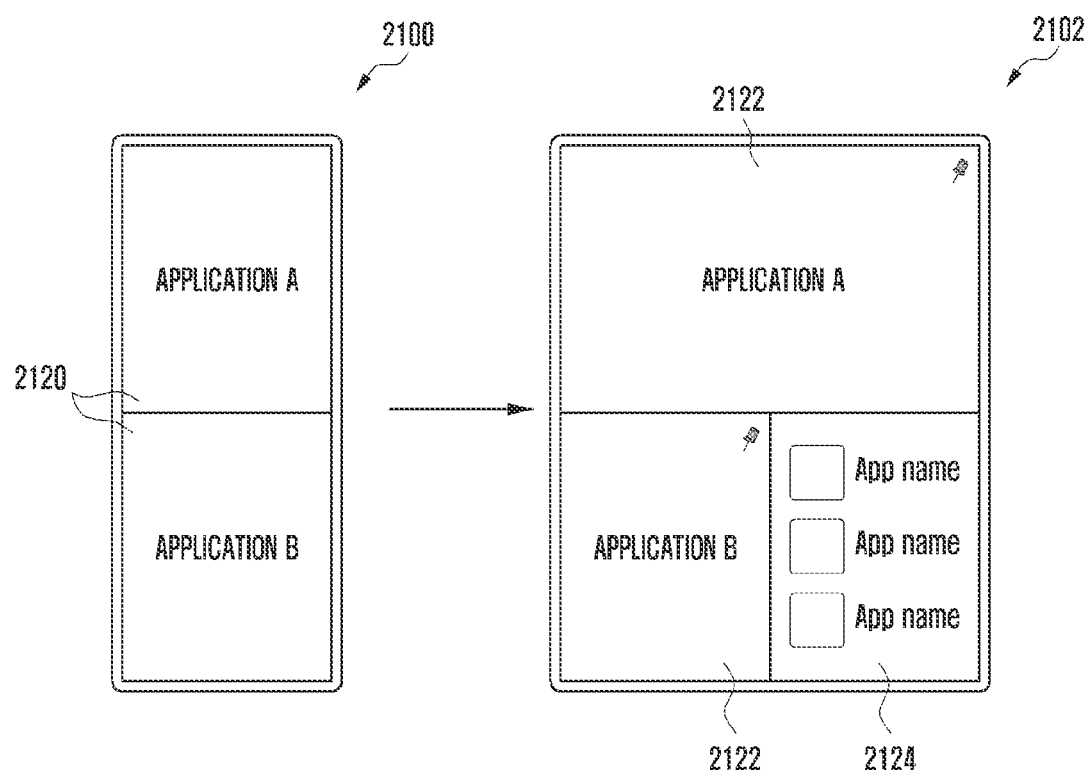
Figure 21C:
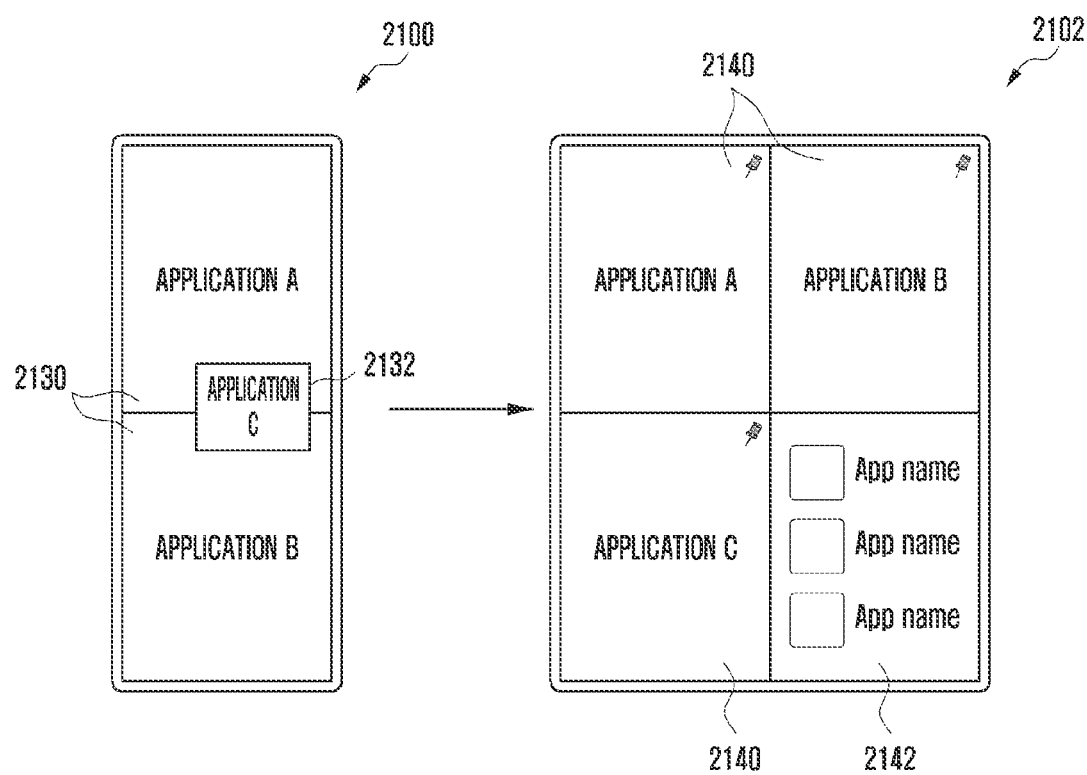

FIG. 20 is a flowchart for setting up a screen constitution of a multi-window in an unfolded state of the electronic device according to various embodiments. According to the embodiment, the operations illustrated in FIG. 20 may be one embodiment of operations 1805 to 1809 in FIG. 18. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 20 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 20 will be described with reference to FIGS. 21A to 21C. FIGS. 21A, 21B, and 21C are views illustrating screen constitutions for selecting an application to be additionally displayed in an unfolded state according to various embodiments.

Referring to FIG. 20, according to various embodiments, when the structure of the electronic device (e.g., the electronic device 400) switches to the unfolded state (e.g., 'YES' in operation 1803 in FIG. 18), the electronic device (e.g., the processor 120 in FIG. 1 or the processor 401 in FIG. 4) may determine, in operation 2001, whether to apply an additional window to the display device (e.g., the display 230 in FIG. 2A) in the unfolded state. According to the embodiment, based on a history of the screen constitution that has been used by the electronic device 400 in the previous unfolded state, the processor 401 may determine whether to apply an additional window to at least one window that has been displayed on the display device (e.g., the sub-display 252 in FIG. 2B) in the folded state. For example, in the case in which the multi-window divided into three areas has been applied in the previous unfolded state and the multi-window having the display area divided into two areas in the folded state is applied, the processor 401 may determine, based on the history of the screen constitution, that the single window is additionally applied. According to the embodiment, the processor 401 may determine whether to apply an additional window based on the user's preset information related to the unfolded state. For example, when the use of the multi-window divided into four areas in the unfolded state is set even though the multi-window having the display area divided into two areas has been applied in the folded state, the processor 401 may determine that two windows are additionally applied. According to the embodiment, the processor 401 may determine whether to apply the additional window based on the user's use pattern related to the unfolded state. For example, when the processor 401 determines, based on the user's use pattern, that the multi-window divided into five areas is applied in the unfolded state even though the multi-window having the display area divided into two areas has been applied in the folded state, the processor 401 may determine that three windows are additionally applied.

According to various embodiments, when it is determined that the additional window is applied (e.g., 'YES' in operation 2001), the electronic device (e.g., the processor 120 or 401) may check the additional application in operation 2003. According to the embodiment, the processor 401 may check the additional application to be displayed on the additional window based on the history of the screen constitution that has been used by the electronic device 400 in the previous unfolded state. According to the embodiment, the processor 401 may select the application, which has been most recently used, as the additional application to be displayed on the additional window based on the use history of the application installed in the electronic device 400. According to the embodiment, the processor 401 may check the additional application to be displayed in the additional window based on the user's use pattern in the unfolded state.

According to various embodiments, in operation 2005, the electronic device (e.g., the processor 120 or 401) may set up the screen constitution of the multi-window to be displayed on the display device (e.g., the display 230 in FIG. 2A) in the unfolded state. According to the embodiment, the processor 401 may set up the size and/or arrangement for displaying the at least one window and the additional window displayed in the folded state.

According to various embodiments, in operation 2007, the electronic device (e.g., the processor 120 or 401) may display information related to at least one application based on the screen constitution of the multi-window in the unfolded state.

According to various embodiments, when it is determined that no additional window is applied (e.g., 'NO' in operation 2001), the electronic device (e.g., the processor 120 or 401) may set up, in operation 2009, the screen constitution of the at least one window, which has been displayed in the folded state, based on the size of the display device (e.g., the display 230 in FIG. 2A) in the unfolded state.

According to various embodiments, in operation 2011, the electronic device (e.g., the processor 120 or 401) may display information related to at least one application based on the screen constitution of the at least one window.

According to various embodiments, the electronic device 400 may select the additional application after displaying the multi-window on the display device 403 (e.g., the display 230 in FIG. 2A) in the unfolded state.

According to the embodiment, referring to FIG. 21A, the display device 403 (e.g., the sub-display 252 in FIG. 2B) in the folded state 2100 may display information 2110 related to Application A through a single window. According to the embodiment, referring to FIG. 21A, the display device 403 (e.g., the display 230 in FIG. 2A) in the unfolded state 2102 may divide the display area into two areas based on the screen constitution of the multi-window, display information 2112 related to Application A in the first area, and display an application list 2114 in the second area. The display device 403 (e.g., the display 230 in FIG. 2A) in the unfolded state 2102 may display, in the second area, information related to the additional application selected from the application list 2114. For example, the application list 2114 may include at least one application that may be displayed in the second area.

According to the embodiment, referring to FIG. 21B, the display device 403 (e.g., the sub-display 252 in FIG. 2B) in the folded state 2100 may display information 2120 related to Application A and Application B in different areas through the multi-window. According to the embodiment, referring to FIG. 21B, the display device 403 (e.g., the display 230 in FIG. 2A) in the unfolded state 2102 may divide the display area into three areas based on the screen constitution of the multi-window, display information 2122 related to Application A and Application B in the first and second areas, and display an application list 2124 in the third area. The display device 403 (e.g., the display 230 in FIG. 2A) in the unfolded state 2102 may display, in the third area, information related to the additional application selected from the application list 2124.

According to the embodiment, referring to FIG. 21C, the display device 403 (e.g., the sub-display 252 in FIG. 2B) in the folded state 2100 may display information 2230 related to Application A and Application B in different areas through the multi-window and display information 2232 related to Application C through the pop-up window. According to the embodiment, referring to FIG. 21C, the display device 403 (e.g., the display 230 in FIG. 2A) in the unfolded state 2102 may divide the display area into four areas based on the screen constitution of the multi-window, display information 2140 related to Application A, Application B, and Application C in the first, second, and third areas, and display an application list 2142 in the fourth area. The display device 403 (e.g., the display 230 in FIG. 2A) in the unfolded state 2102 may display, in the fourth area, information related to the additional application selected from the application list 2142.

According to various embodiments, the electronic device 400 may reduce the number of windows used in the unfolded state so that the number of windows used in the unfolded state is smaller than the number of windows used in the folded state. According to the embodiment, when the number of windows in the unfolded state is smaller than the number of windows in the folded state based on the history of the screen constitution that has been used by the electronic device 400 in the previous unfolded state, the processor 401 may reduce the number of windows used in the unfolded state. According to the embodiment, the processor 401 may reduce the number of windows used in the unfolded state based on the user's preset information related to the unfolded state. According to the embodiment, the processor 401 may reduce the number of windows used in the unfolded state based on the user's use pattern related to the unfolded state.

Figure 22:
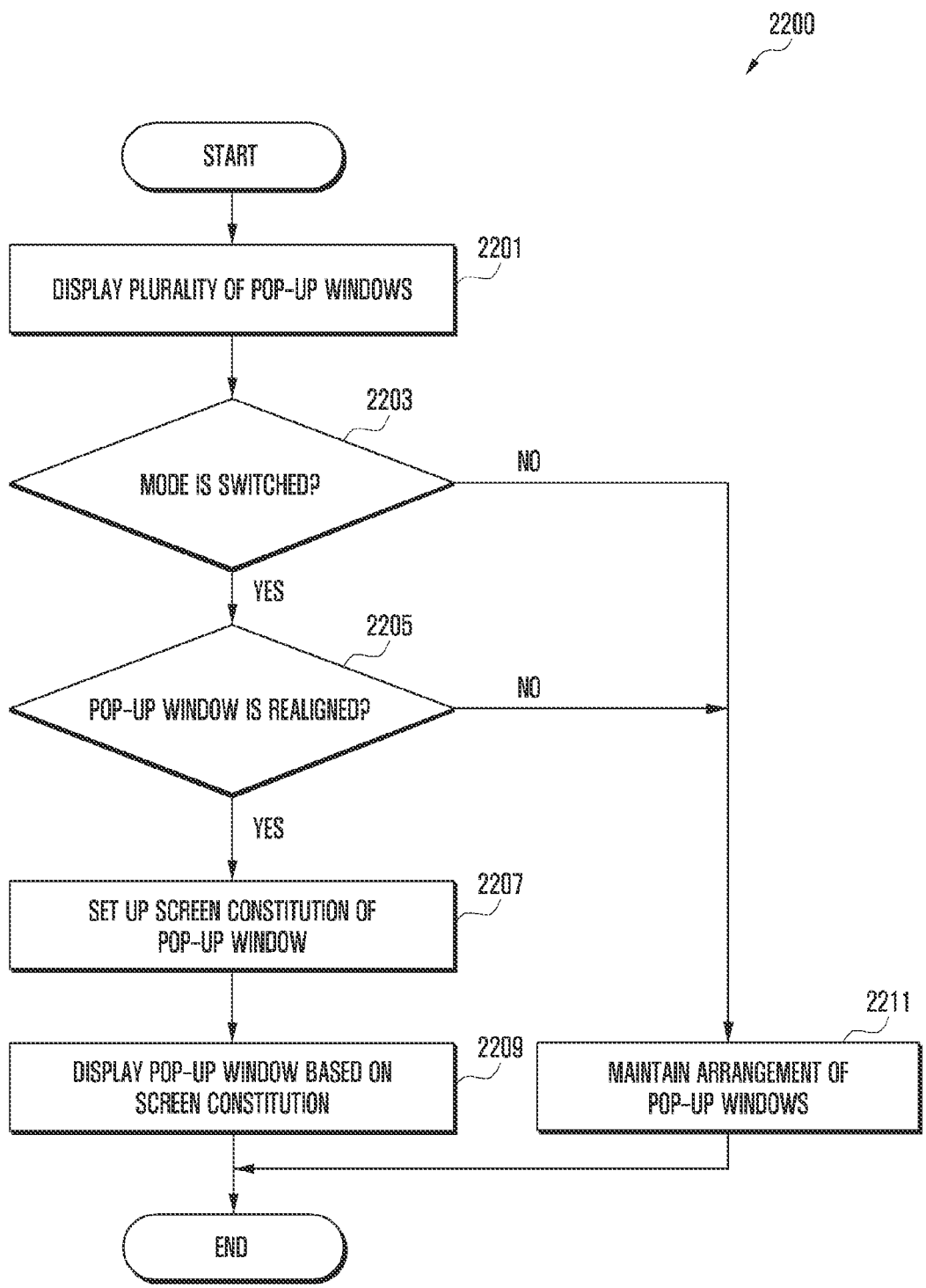
FIG. 22 is a flowchart for realigning a pop-up window on the electronic device according to various example embodiments.
Figure 23:
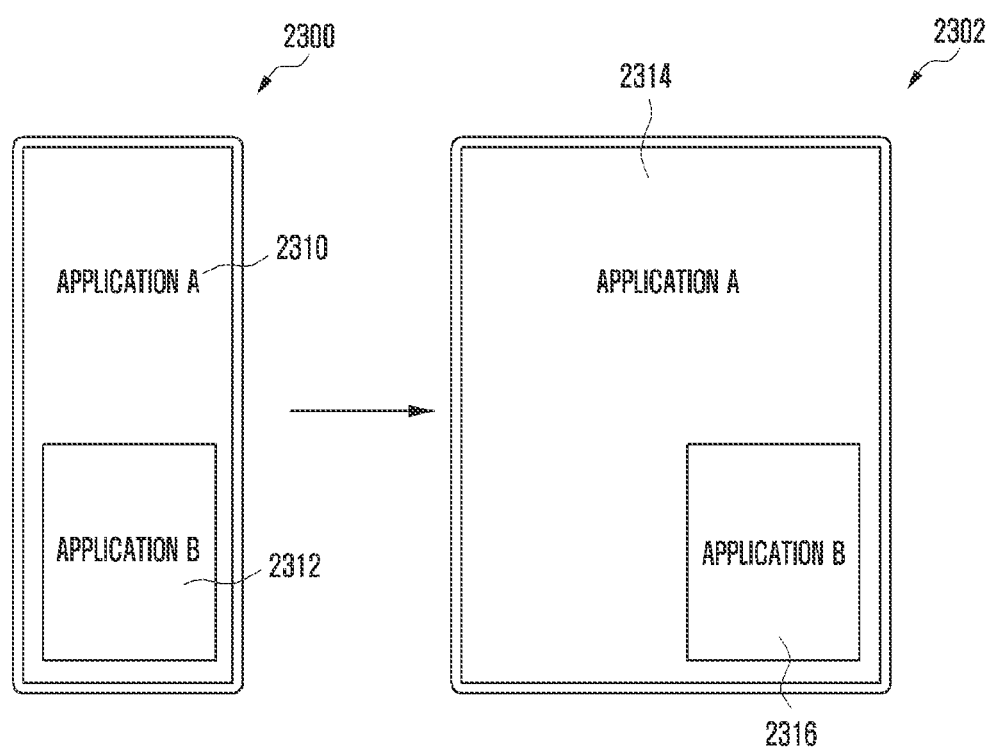
FIG. 23 is a view illustrating a screen constitution for displaying a single pop-up window according to various example embodiments.
Figure 24A:
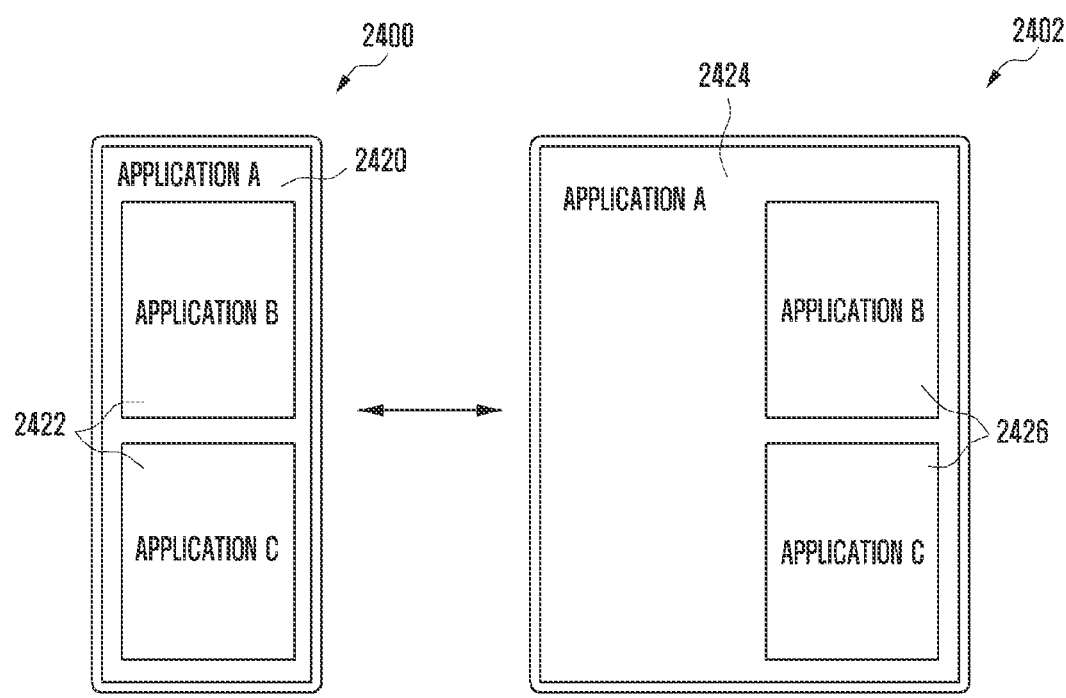
FIGS. 24A, 24B, and 24C are views illustrating screen constitutions for realigning a pop-up window according to various example embodiments.
Figure 24B:
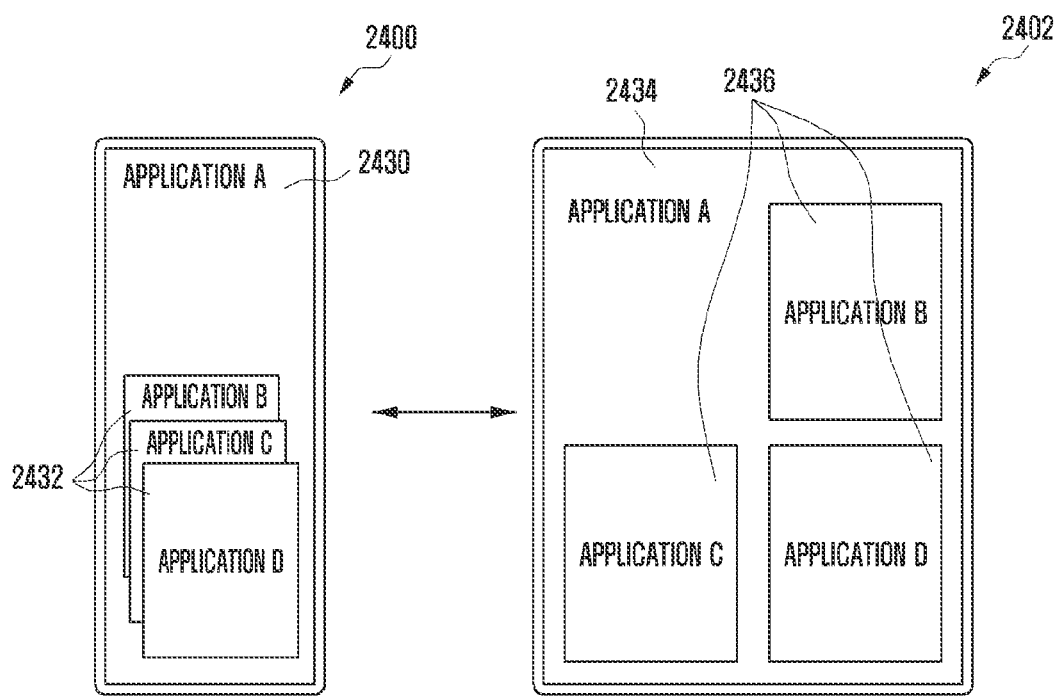
Figure 24C:
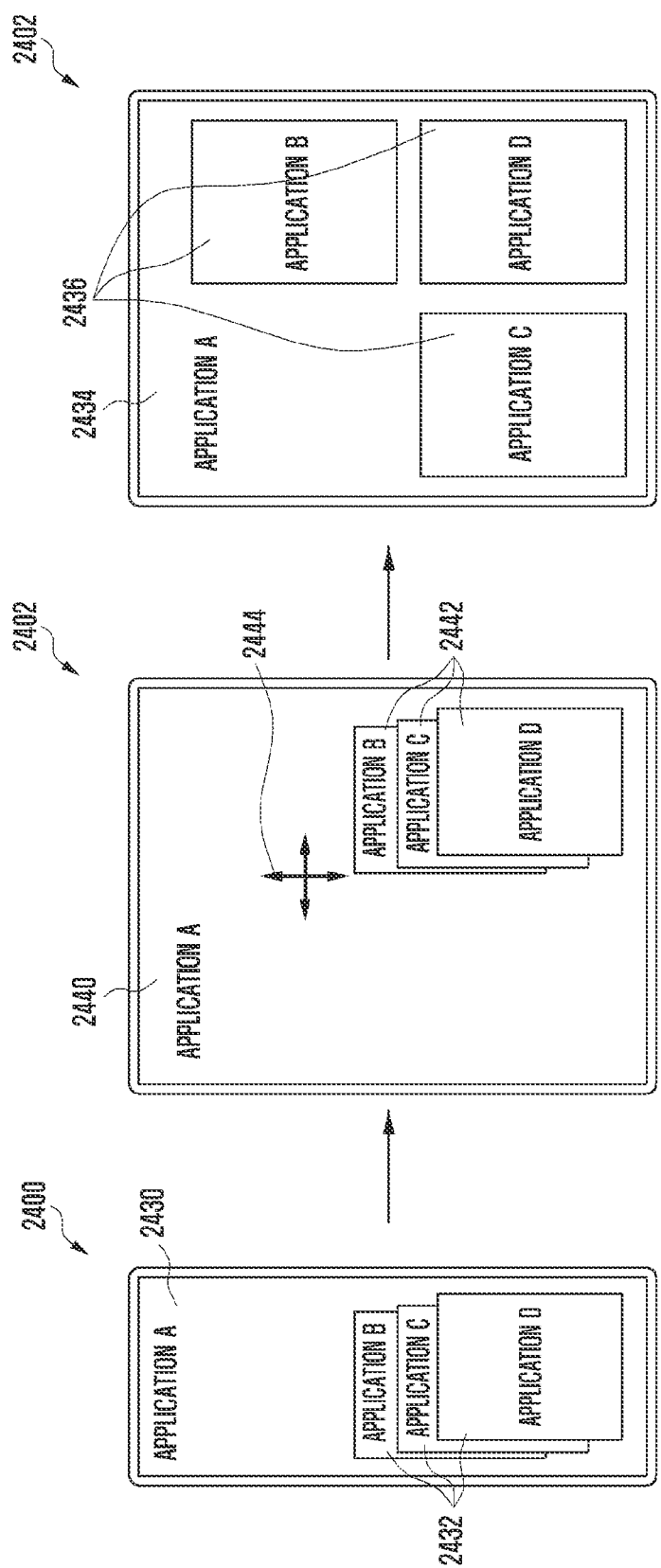

FIG. 22 is a flowchart for realigning a pop-up window on the electronic device according to various embodiments. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 22 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 22 will be described with reference to FIGS. 23 and 24A to 24C. FIG. 23 is a view illustrating a screen constitution for displaying a single pop-up window according to various embodiments. FIGS. 24A, 24B, and 24C are views illustrating screen constitutions for realigning a pop-up window according to various embodiments.

Referring to FIG. 22, according to various embodiments, in operation 2201, the electronic device (e.g., the processor 120 in FIG. 1, the display device 160, the processor 401 in FIG. 4, or the display device 403) may display a plurality of pop-up windows on the display device (e.g., the display device 403). According to the embodiment, as illustrated in FIG. 23, the display device 403 (e.g., the sub-display 252 in FIG. 2B) in the folded state 2300 may display information 2310 related to Application A through the single window and display information 2412 related to Application B through the pop-up window. According to the embodiment, as illustrated in FIG. 24A, the display device 403 (e.g., the sub-display 252 in FIG. 2B) in the folded state 2400 may display information 2420 related to Application A through the single window and display information 2422 related to Application B and Application C through the first and second pop-up windows. For example, the first and second pop-up windows may be displayed without overlapping each other. According to the embodiment, referring to FIG. 24B, the display device 403 (e.g., the sub-display 252 in FIG. 2B) in the folded state 2400 may display information 2430 related to Application A through the single window and display information 2432 related to Application B, Application C, and Application D through the first, second, and third pop-up windows. For example, the first, second, and third pop-up windows may be displayed while at least partially overlapping one another.

According to various embodiments, the electronic device (e.g., the processor 120 or 401 or the sensor module 176 or 403) may check, in operation 2203, whether a mode is switched based on the structural change of the electronic device (e.g., the electronic device 400). According to the embodiment, the switching of the mode may include the switching from the unfolded state to the folded state, the switching from the folded state to the unfolded state, the switching from the unfolded state to the intermediate state, the switching from the folded state to the intermediate state, the switching from the intermediate state to the folded state, and/or the switch from the intermediate state to the unfolded state.

According to various embodiments, when the mode is switched (e.g., 'YES' in operation 2203), the electronic device (e.g., the processor 120 or 401) may determine, in operation 2205, whether to realign the pop-up window. According to the embodiment, the processor 401 may determine whether to realign the pop-up window based on the size and/or ratio of the display deformed based on the switching of the mode. According to the embodiment, the processor 401 may determine whether to realign the pop-up window in the switched mode (e.g., the folded state, the intermediate state, or the unfolded state) based on the history of the screen constitution that has been used by the electronic device 400. For example, based on the history of the screen constitution, the processor 401 may display the plurality of pop-up windows so that the plurality of pop-up windows at least partially overlaps one another in the folded state, and the plurality of pop-up windows does not overlap one another in the unfolded state, and the processor 401 may determine whether to realign the pop-up window based on the switching of the mode. According to the embodiment, the processor 401 may determine whether to realign the pop-up window based on the user's setting related to the realignment of the pop-up window when the mode is switched.

According to various embodiments, when it is determined that the pop-up window is to be realigned (e.g., 'YES' in operation 2205), the electronic device (e.g., the processor 120 or 401) may set up, in operation 2207, the screen constitution of the pop-up window. According to the embodiment, the processor 401 may set up the arrangement of the plurality of pop-up windows based on the size and/or ratio of the display changed based on the switched mode.

According to various embodiments, in operation 2209, the electronic device (e.g., the processor 120 or 401) may display information related to at least one application through the plurality of pop-up windows realigned based on the screen constitution of the pop-up window. According to the embodiment, as illustrated in FIG. 24B, the display device 403 (e.g., the sub-display 252 in FIG. 2B) in the folded state 2400 may display the plurality of pop-up windows so that the plurality of pop-up windows at least partially overlaps one another. As illustrated in FIG. 24B, the display device 403 (e.g., the display 230 in FIG. 2A) in the unfolded state 2402 may realign the plurality of pop-up windows so that the plurality of pop-up windows does not overlap one another. According to the embodiment, as illustrated in FIG. 24B, the display device 403 (e.g., the display 230 in FIG. 2A) in the unfolded state 2402 may display the plurality of pop-up windows so that the plurality of pop-up windows does not overlap one another. As illustrated in FIG. 24B, the display device 403 (e.g., the sub-display 252 in FIG. 2B) in the folded state 2400 may realign the plurality of pop-up windows so that the plurality of pop-up windows at least partially overlaps one another.

According to various embodiments, when it is determined that the mode is not switched (e.g., 'NO' in operation 2203) or the pop-up window is not realigned (e.g., 'NO' in operation 2205), the electronic device (e.g., the processor 120 or 401) may maintain, in operation 2211, the arrangement of the pop-up windows. According to the embodiment, as illustrated in FIG. 24A, the display device 403 (e.g., the sub-display 252 in FIG. 2B) in the folded state 2400 may display the first and second pop-up windows so that the first and second pop-up windows do not overlap each other. As illustrated in FIG. 24A, the display device 403 (e.g., the display 230 in FIG. 2A) in the unfolded state 2402 may maintain the arrangement of the first and second pop-up windows that are displayed without overlapping each other.

According to various embodiments, the electronic device 400 may provide an object for realigning the pop-up window. According to the embodiment, as illustrated in FIG. 24C, the display device 403 (e.g., the sub-display 252 in FIG. 2B) in the folded state 2400 may display the plurality of pop-up windows so that the plurality of pop-up windows at least partially overlaps one another. When the mode is switched to the unfolded state 2402 based on the structural change of the electronic device 400, the processor 401 may control the display device 403 to maintain the arrangement of the plurality of pop-up windows displayed while at least partially overlapping one another, as illustrated in FIG. 24C (2442). For example, the display device 403 may display an object 2444 for realigning the pop-up window in at least a part of the display area. For example, when the processor 401 receives an input related to the object 2444 for realigning the pop-up window, the processor 401 may control the display device 403 to realign the plurality of pop-up windows in the unfolded state 2402 so that the plurality of pop-up windows does not overlap one another, as illustrated in FIG. 24C (2436). For example, when the mode is switched to the folded state 2400 based on the structural change of the electronic device 400, the processor 401 may control the display device 403 to realign the plurality of pop-up windows in the folded state 2400 so that the plurality of pop-up windows at least partially overlaps one another.

Figure 25:
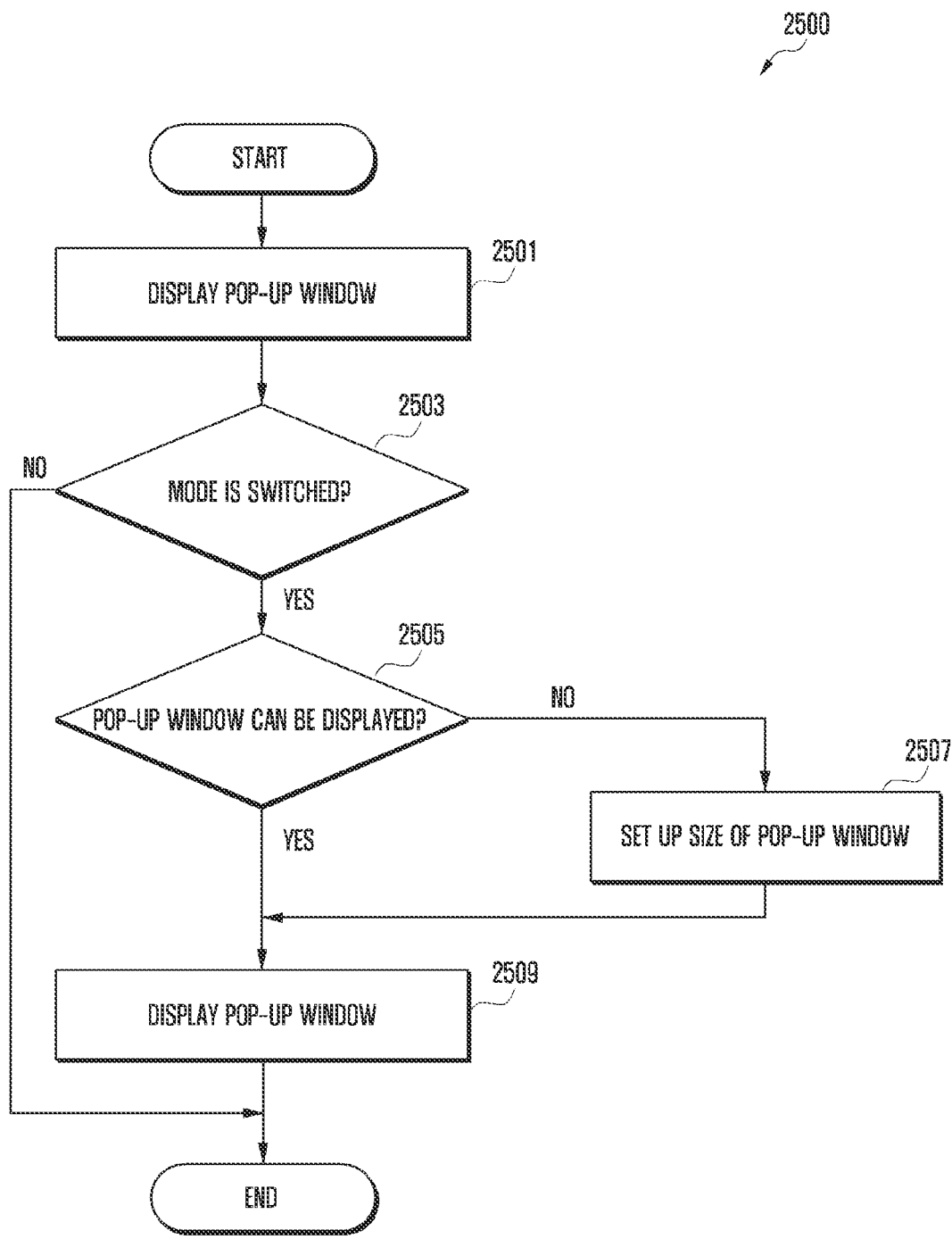
FIG. 25 is a flowchart for setting up a size of a pop-up window on the electronic device according to various example embodiments.
Figure 26A:
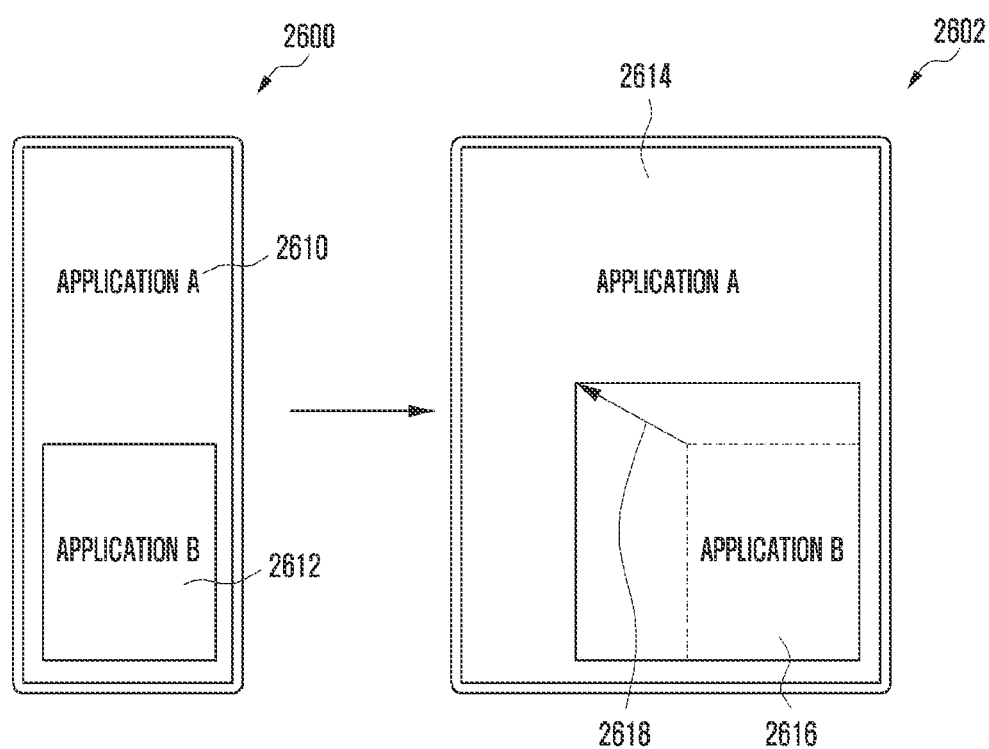
FIGS. 26A and 26B are views illustrating screen constitutions for changing a size of a pop-up window according to various example embodiments.
Figure 26B:
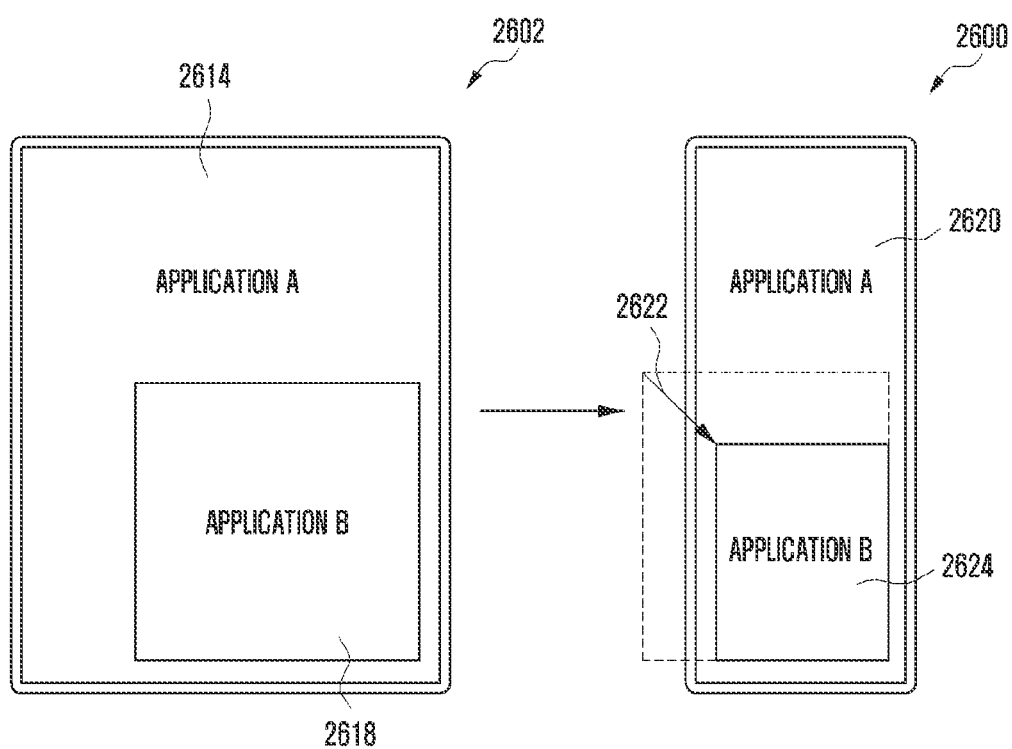

FIG. 25 is a flowchart for setting up a size of a pop-up window on the electronic device according to various embodiments. In the embodiment to be described below, the operations may be sequentially performed. However, the operations need not be necessarily performed sequentially. For example, the order of the operations may be changed, and at least two operations may be performed in parallel. For example, the electronic device illustrated in FIG. 25 may be the electronic device 100 illustrated in FIG. 1, the electronic device 200 illustrated in FIGS. 2A and 2B, the electronic device 300 illustrated in FIGS. 3A, 3B, and 3C, or the electronic device 400 illustrated in FIG. 4. For example, at least some components illustrated in FIG. 25 will be described with reference to FIGS. 26A and 26B. FIGS. 26A and 26B are views illustrating screen constitutions for changing a size of a pop-up window according to various embodiments.

Referring to FIG. 25, according to various embodiments, in operation 2501, the electronic device (e.g., the processor 120 in FIG. 1, the display device 160, the processor 401 in FIG. 4, or the display device 403) may display at least one pop-up window on the display device (e.g., the display device 403). According to the embodiment, as illustrated in FIG. 26A, the display device 403 (e.g., the sub-display 252 in FIG. 2B) in the folded state 2600 may display information 2610 related to Application A through the single window and display information 2612 related to Application B through the pop-up window. According to the embodiment, referring to FIG. 26A, the display device 403 (e.g., the display 230 in FIG. 2A) in the unfolded state 2602 may display information 2614 related to Application A through the single window and display information 2616 related to Application B through the pop-up window. For example, when the processor 401 receives an input related to the adjustment of the size of the pop-up window, the processor 401 may control the display device to adjust (e.g., increase) the size of the pop-up window to a first size 2618, as illustrated in FIG. 26A.

According to various embodiments, the electronic device (e.g., the processor 120 or 401 or the sensor module 176 or 403) may check, in operation 2503, whether a mode is switched based on the structural change of the electronic device (e.g., the electronic device 400). According to the embodiment, the processor 401 may check whether the structure of the electronic device 400 is changed based on motion information of one surface (e.g., the third surface 221) of the first housing structure (e.g., the first housing structure 210 in FIG. 2A) and the second housing structure (e.g., the second housing structure 220 in FIG. 2A) provided through the sensor module 405. For example, the switching of the mode based on the structural change of the electronic device 400 may include the switching from the unfolded state to the folded state, the switching from the folded state to the unfolded state, the switching from the unfolded state to the intermediate state, the switching from the folded state to the intermediate state, the switching from the intermediate state to the folded state, and/or the switching from the intermediate state to the unfolded state. According to the embodiment, when no mode is switched (e.g., 'NO' in operation 2203), the electronic device (e.g., the processor 120 or 401) may end the operation.

According to various embodiments, when the mode is switched (e.g., 'YES' in operation 2503), the electronic device (e.g., the processor 120 or 401) may check, in operation 2505, whether the pop-up window may be displayed based on the size and/or ratio of the display deformed based on the switching of the mode. According to the embodiment, as illustrated in FIG. 26B, the display device 403 (e.g., the display 230 in FIG. 2A) in the unfolded state 2602 may display information 2614 related to Application A through the single window and display information related to Application B through the pop-up window 2618 having the first size. For example, when the mode is switched to the folded state based on the structural change of the electronic device 400, the processor 401 may check whether the pop-up window having the first size may be changed based on the size of the display (e.g., the sub-display 252 in FIG. 2B) in the folded state.

According to various embodiments, when it is determined that the pop-up window cannot be displayed (e.g., 'NO' in operation 2505), the electronic device (e.g., the processor 120 or 401) may adjust, in operation 2507, the size of the pop-up window. According to the embodiment, the processor 401 may adjust the size of the pop-up window based on the size and/or ratio of the display changed based on the switched mode.

According to various embodiments, when it is determined that the pop-up window can be displayed (e.g., 'YES' in operation 2505) or the size of the pop-up window is adjusted (e.g., operation 2507), the electronic device (e.g., the processor 120 or 401) may display, in operation 2509, information related to at least one application through the pop-up window. According to the embodiment, when the mode is switched to the folded state based on the structural change of the electronic device 400, the processor 401 may adjust the size of the pop-up window based on the size and/or ratio of the display device 403 (e.g., the sub-display 252 in FIG. 2B) in the folded state 2600, as illustrated in FIG. 26B (2622). As illustrated in FIG. 26B, the display device 403 (e.g., the sub-display 252 in FIG. 2B) in the folded state 2600 may display information 2624 related to Application B through the pop-up window with the adjusted size.

According to various example embodiments, the electronic device 400 may selectively adjust the size of the pop-up window based on the user's setting up related to the size of the pop-up window or the history of the screen constitution that has been used by the electronic device 400.

According to various embodiments, a method of operating the foldable electronic device may include an operation of dividing the first type display area into the plurality of areas and displaying information related to the plurality of applications when the electronic device is in the unfolded state, an operation of checking at least one application set to be continuously used among the plurality of applications when the electronic device switches to the folded state, an operation of setting up the screen constitution in the folded state based on the at least one application, and an operation of outputting information related to the at least one application through the second type display area based on the screen constitution.

According to various embodiments, the first type display area may include the display area of the first display disposed in the space defined by the first and second housing structures connected, directly or indirectly, via the hinge structure.

According to various embodiments, the second type display area may include at least a partial area of the first display based on the folded state of the electronic device.

According to various embodiments, the second type display area may include the display area of the second display disposed in the space defined by the first housing structure or the second housing structure connected, directly or indirectly, via the hinge structure.

According to various embodiments, the operation of setting up the screen constitution may include an operation of setting the number of times the display area is divided in the folded state, a size of the divided area, and/or an arrangement of the divided areas based on the number of one or more applications.

According to various embodiments, the operation of outputting the information related to the application may include an operation of dividing the second type display area into the plurality of sub-areas when the plurality of applications is set to be continuously used, and an operation of displaying information related to the application set to be continuously used through the sub-areas.

According to various embodiments, the operation of outputting information related to the application may include an operation of selecting at least one application to be displayed through the pop-up window among the plurality of applications set to be continuously used when the plurality of applications is set to be continuously used, an operation of dividing the second type display area into at least one sub-area based on the number of one or more applications remaining except for at least one application to be displayed through the pop-up window, and an operation of displaying information related to at least one remaining application through the sub-areas and displaying at least one pop-up window including information related to the at least one application.

According to various embodiments, the method may further include an operation of realigning the at least one pop-up window when the electronic device switches to the unfolded state.

According to various embodiments, the operation of selecting the application may include an operation of selecting at least one application to be displayed through the pop-up window based on a display order, an execution point in time, and a priority of the application, a size of the display area, and/or preset information of the application related to the pop-up window.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a foldable housing comprising a hinge structure comprising a hinge, a first housing structure, comprising a first housing, connected to the hinge structure, and a second housing structure, comprising a second housing, connected to the hinge structure and configured to be folded with respect to the first housing structure via the hinge structure;
   a display device comprising a display area with a shape configured to vary depending on the first housing structure and the second housing structure; and
   a processor operatively connected to the display device, wherein the processor is configured to:
   divide a first type display area into a plurality of areas and control to display information related to a plurality of applications based on the electronic device being in an unfolded state,
   identify at least one application set to be continuously used among the plurality of applications based on the electronic device switching to a folded state,
   set up a screen constitution in the folded state based on the at least one application,
   control to output information related to the at least one application through a second type display area based on the screen constitution in the folded state,
   based on the plurality of applications set up to be continuously used, select at least one application to be displayed through a pop-up window among the plurality of applications set to be continuously used,
   control to divide the second type display area into at least one sub-area based on a number of one or more applications remaining except for at least one application to be displayed through the pop-up window,
   control to display information related to at least one remaining application through the sub-areas, and
   control to display at least one pop-up window including information related to the at least one application.

2. The electronic device of claim 1, wherein the display device comprises a first display disposed in a space defined by at least the first housing structure and the second housing structure based on the unfolded state of the electronic device, and the first type display area comprises a display area of the first display.

3. The electronic device of claim 2, wherein the second type display area comprises at least a partial area of the first display based on the folded state of the electronic device.

4. The electronic device of claim 1, wherein the display device comprises a second display disposed in a space defined by at least the first housing structure and/or the second housing structure based on the folded state of the electronic device, and the second type display area comprises a display area of the second display.

5. The electronic device of claim 1, wherein the processor is further configured to set up at least one of: a number of times the display area is divided in the folded state, a size of the divided area, or an arrangement of the divided areas based on a number of the at least one application set to be continuously used among the plurality of applications.

6. The electronic device of claim 1, wherein the processor is further configured to:
   based on the plurality of applications set to be continuously used, divide the second type display area into a plurality of sub-areas, and
   control to display information related to the plurality of applications set to be continuously used through the sub-areas.

7. The electronic device of claim 1, wherein the processor is further configured to realign the at least one pop-up window based on the electronic device switching to the unfolded state.

8. The electronic device of claim 1, wherein the processor is further configured to select at least one application to be displayed through the pop-up window based on at least one of: a display order, an execution point in time, a priority of the application, a size of the display area, or preset information of the application related to the pop-up window.

9. The electronic device of claim 1, wherein the processor is further configured to:
   determine whether to use a multi-window when the electronic device is switched to the unfolded state,
   set up a screen constitution of the multi-window when the processor determines that the multi-window is to be used, and
   divide the first type display area into the plurality of areas based on the screen constitution of the multi-window and outputs information related to the plurality of applications.

10. A method of operating an electronic device comprising (1) a foldable housing comprising a hinge, a first housing connected to the hinge, and a second housing connected to the hinge and configured to be folded with respect to the first housing via the hinge, and (2) a display device comprising a display area with a shape configured to vary depending on the first housing and the second housing, the method comprising:

dividing a first type display area into a plurality of areas and displaying information related to a plurality of applications when the electronic device is in an unfolded state;

identifying at least one application set to be continuously used among the plurality of applications when the electronic device switches to a folded state;

setting up a screen constitution in the folded state based on the at least one application; and outputting information related to the at least one application through a second type display area based on the screen constitution, wherein the outputting of the information related to the at least one application comprises:

selecting at least one application to be displayed through a pop-up window among the plurality of applications set to be continuously used when the plurality of applications is set to be continuously used;

dividing the second type display area into at least one sub-area based on a number of one or more applications remaining except for at least one application to be displayed through the pop-up window; and displaying information related to at least one remaining application through the sub-areas and displaying at least one pop-up window including information related to the at least one application.

11. The method of claim 10, wherein the setting up of the screen constitution comprises setting up at least one of: a number of times the display area is divided in the folded state, a size of the divided area, or an arrangement of the divided areas based on a number of the at least one application set to be continuously used among the plurality of applications.

12. The method of claim 10, wherein the outputting of the information related to the at least one application comprises:

dividing the second type display area into a plurality of sub-areas when the plurality of applications is set to be continuously used; and displaying information related to the plurality of applications set to be continuously used through the sub-areas.

13. The method of claim 10, wherein the selecting of the application comprises selecting at least one application to be displayed through the pop-up window based on at least one of: a display order, an execution point in time, and a priority of the application, a size of the display area, or preset information of the application related to the pop-up window.

14. The method of claim 10, wherein the display device comprises a first display disposed in a space defined by at least the first housing and the second housing based on the unfolded state of the electronic device and the first type display area comprises a display area of the first display disposed in a space defined by at least the first housing and the second housing connected via the hinge.

15. The method of claim 14, wherein the display device comprises a first display disposed in a space defined by at least the first housing and the second housing based on the unfolded state of the electronic device and the second type display area comprises at least a partial area of the first display based on the folded state of the electronic device.

16. The method of claim 10, wherein the display device comprises a second display disposed in a space defined by at least the first housing and/or the second housing based on the folded state of the electronic device, and the second type display area comprises a display area of the second display disposed in a space defined by at least the first housing and/or the second housing connected via the hinge.

\* \* \* \* \*